(12) United States Patent
Varkey et al.

(10) Patent No.: US 11,776,712 B2
(45) Date of Patent: *Oct. 3, 2023

(54) COMPRESSION AND STRETCH RESISTANT COMPONENTS AND CABLES FOR OILFIELD APPLICATIONS

(71) Applicant: Schlumberger Technology Corporation, Sugar Land, TX (US)

(72) Inventors: Joseph Varkey, Richmond, TX (US); David Kim, Katy, TX (US); Maria Grisanti, Missouri City, TX (US); Burcu Unal Altintas, Richmond, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/724,808

(22) Filed: Apr. 20, 2022

(65) Prior Publication Data

US 2022/0246327 A1   Aug. 4, 2022

Related U.S. Application Data

(60) Continuation of application No. 16/724,432, filed on Dec. 23, 2019, now Pat. No. 11,335,478, which is a
(Continued)

(51) Int. Cl.
*G02B 6/44* (2006.01)
*H01B 9/00* (2006.01)
(Continued)

(52) U.S. Cl.
CPC ........... *H01B 9/005* (2013.01); *G02B 6/4416* (2013.01); *G02B 6/4483* (2013.01);
(Continued)

(58) Field of Classification Search
CPC .... H01B 9/005; H01B 7/0225; H01B 7/0275; H01B 13/14; G02B 6/44; G02B 6/4416; G02B 6/4483; G02B 6/4486; G02B 6/504
See application file for complete search history.

(56) References Cited

U.S. PATENT DOCUMENTS 1,921,606 A    8/1933  Carl
1,937,054 A   11/1933  Carl
(Continued)

FOREIGN PATENT DOCUMENTS

CN    2609127 Y    3/2004
CN    2631012 Y    8/2004
(Continued)

OTHER PUBLICATIONS

Second Office Action issued in the related CN Application 201410383942.4, dated Sep. 12, 2017, 7 pages.
(Continued)

*Primary Examiner* — Jennifer Doan

(57) ABSTRACT

An opto-electrical cable may include an opto-electrical cable core and a polymer layer surrounding the opto-electrical cable core. The opto-electrical cable core may include a wire, one or more channels extending longitudinally along the wire, and one or more optical fibers extending within each channel. The opto-electrical cable may be made by a method that includes providing a wire having a channel, providing optical fibers within the channel to form an opto-electrical cable core, and applying a polymer layer around the opto-electrical cable core. A multi-component cable may include one or more electrical conductor cables and one or more opto-electrical cables arranged in a coax, triad, quad configuration, or hepta configuration. Deformable polymer may surround the opto-electrical cables and electrical conductor cables.

7 Claims, 53 Drawing Sheets

Related U.S. Application Data continuation-in-part of application No. 16/100,423, filed on Aug. 10, 2018, now Pat. No. 10,522,271, which is a division of application No. 15/177,616, filed on Jun. 9, 2016, now Pat. No. 10,049,789.

(51) Int. Cl.
- *H01B 7/02* (2006.01)
- *H01B 13/14* (2006.01)
- *H01B 13/00* (2006.01)
- *G02B 6/50* (2006.01)

(52) U.S. Cl.
CPC ........... *G02B 6/4486* (2013.01); *G02B 6/504* (2013.01); *H01B 7/0225* (2013.01); *H01B 7/0275* (2013.01); *H01B 13/0036* (2013.01); *H01B 13/14* (2013.01)

(56) References Cited

U.S. PATENT DOCUMENTS

| | | |
|---|---|---|
| 1,987,041 A | 1/1935 | Wood |
| 2,261,742 A | 11/1941 | Matsumoto |
| 2,604,509 A | 7/1952 | Andre |
| 2,927,954 A | 3/1960 | Ellsworth |
| 3,115,542 A | 12/1963 | Giuseppe |
| 3,217,083 A | 11/1965 | Gore |
| 3,602,632 A | 8/1971 | Ollis |
| 3,639,674 A | 2/1972 | Stier |
| 3,784,732 A | 1/1974 | Whitfill, Jr. |
| 4,131,757 A | 12/1978 | Felkel |
| 4,131,758 A | 12/1978 | Felkel |
| 4,160,872 A | 7/1979 | Lundberg et al. |
| 4,183,621 A | 1/1980 | Kao et al. |
| 4,227,770 A | 10/1980 | Gunn |
| 4,341,440 A | 7/1982 | Frezeguet et al. |
| 4,375,313 A | 3/1983 | Anderson et al. |
| 4,389,645 A | 6/1983 | Wharton |
| 4,408,828 A | 10/1983 | Le Noane et al. |
| 4,422,718 A | 12/1983 | Nakagome et al. |
| 4,440,974 A | 4/1984 | Naudet |
| 4,491,386 A | 1/1985 | Negishi et al. |
| 4,504,112 A | 3/1985 | Gould et al. |
| 4,522,464 A | 6/1985 | Thompson et al. |
| 4,523,804 A | 6/1985 | Thompson |
| 4,524,436 A | 6/1985 | Hall et al. |
| 4,563,757 A | 1/1986 | Decorps et al. |
| 4,575,831 A | 3/1986 | Decorps et al. |
| 4,577,925 A | 3/1986 | Winter et al. |
| 4,579,420 A | 4/1986 | Winter et al. |
| 4,623,218 A | 11/1986 | Laurette et al. |
| 4,645,298 A | 2/1987 | Gartside, III |
| 4,648,919 A | 3/1987 | Diaz et al. |
| 4,654,476 A | 3/1987 | Barnicol-Ottler et al. |
| 4,657,342 A | 4/1987 | Bauer |
| 4,658,089 A | 4/1987 | Guzy et al. |
| 4,675,474 A | 6/1987 | Rath |
| 4,678,274 A | 7/1987 | Fuller |
| 4,690,497 A | 9/1987 | Occhini et al. |
| 4,696,542 A | 9/1987 | Thompson |
| 4,705,353 A | 11/1987 | Wagoner |
| 4,878,733 A | 11/1989 | Winter et al. |
| 4,915,490 A | 4/1990 | Ramsay et al. |
| 4,976,509 A | 12/1990 | Bachmann et al. |
| 4,979,795 A | 12/1990 | Mascarenhas |
| 5,086,196 A | 2/1992 | Brookbank et al. |
| 5,115,485 A | 5/1992 | Gandy |
| 5,202,944 A | 4/1993 | Riordan |
| 5,222,178 A | 6/1993 | Betker et al. |
| 5,275,038 A | 1/1994 | Sizer et al. |
| 5,283,852 A | 2/1994 | Gibler et al. |
| 5,329,605 A | 7/1994 | Wargotz |
| 5,431,759 A | 7/1995 | Rath |
| 5,493,626 A | 2/1996 | Schultz et al. |
| 5,495,547 A | 2/1996 | Rafie et al. |
| 5,590,803 A | 1/1997 | Kaempen |
| 5,673,352 A | 9/1997 | Bauer et al. |
| 5,761,361 A | 6/1998 | Pfandl et al. |
| 5,787,217 A | 7/1998 | Traut et al. |
| 5,982,965 A | 11/1999 | Cheron et al. |
| 6,009,216 A | 12/1999 | Pruett et al. |
| 6,030,255 A | 2/2000 | Konishi et al. |
| 6,060,662 A | 5/2000 | Rafie et al. |
| 6,192,983 B1 | 2/2001 | Neuroth et al. |
| 6,195,487 B1 | 2/2001 | Anderson et al. |
| 6,201,191 B1 | 3/2001 | Yorta et al. |
| 6,211,467 B1 | 4/2001 | Berelsman et al. |
| 6,236,789 B1 | 5/2001 | Fitz |
| 6,255,592 B1 | 7/2001 | Pennington et al. |
| 6,255,593 B1 | 7/2001 | Reede |
| 6,260,656 B1 | 7/2001 | Orban et al. |
| 6,262,009 B1 | 7/2001 | Rogers et al. |
| 6,278,825 B1 | 8/2001 | Casiraghi et al. |
| 6,281,489 B1 | 8/2001 | Tubel et al. |
| 6,287,455 B1 | 9/2001 | Whitmore |
| 6,297,455 B1 | 10/2001 | Wijnberg et al. |
| 6,343,173 B2 | 1/2002 | Hordvik et al. |
| 6,392,151 B1 | 5/2002 | Rafie |
| 6,400,873 B1 | 6/2002 | Gimblet et al. |
| 6,403,889 B1 | 6/2002 | Mehan et al. |
| 6,404,961 B1 | 6/2002 | Bonja et al. |
| 6,445,859 B1 | 9/2002 | Witt |
| 6,463,199 B1 | 10/2002 | Quinn et al. |
| 6,472,614 B1 | 10/2002 | Dupont et al. |
| 6,496,627 B1 | 12/2002 | Tuminaro |
| 6,531,694 B2 | 3/2003 | Tubel et al. |
| 6,555,752 B2 | 4/2003 | Dalrymple et al. |
| 6,600,108 B1 | 7/2003 | Mydur |
| 6,621,964 B2 | 9/2003 | Quinn et al. |
| 6,714,708 B2 | 3/2004 | McAlpine et al. |
| 6,727,828 B1 | 4/2004 | Malone et al. |
| 6,779,927 B2 | 8/2004 | Cens et al. |
| 6,924,436 B2 | 8/2005 | Varkey et al. |
| 6,960,724 B2 | 11/2005 | Orlet et al. |
| 6,968,106 B2 | 11/2005 | Chastain et al. |
| 6,973,246 B2 | 12/2005 | Bocanegra et al. |
| 6,978,077 B2 | 12/2005 | Park |
| 7,005,583 B2 | 2/2006 | Varkey et al. |
| 7,009,113 B2 | 3/2006 | Varkey |
| 7,015,395 B2 | 3/2006 | Goldsworthy et al. |
| 7,119,283 B1 | 10/2006 | Varkey et al. |
| 7,140,435 B2 | 11/2006 | Defretin et al. |
| 7,170,007 B2 | 1/2007 | Varkey et al. |
| 7,179,019 B2 | 2/2007 | Seto et al. |
| 7,188,406 B2 | 3/2007 | Varkey et al. |
| 7,208,855 B1 | 4/2007 | Floyd |
| 7,235,743 B2 | 6/2007 | Varkey |
| 7,259,331 B2 | 8/2007 | Sridhar et al. |
| 7,288,721 B2 | 10/2007 | Varkey et al. |
| 7,294,787 B2 | 11/2007 | Varkey |
| 7,324,730 B2 | 1/2008 | Varkey et al. |
| 7,326,854 B2 | 2/2008 | Varkey |
| 7,402,753 B2 | 7/2008 | Varkey et al. |
| 7,438,971 B2 | 10/2008 | Bryant et al. |
| 7,462,781 B2 | 12/2008 | Varkey et al. |
| 7,465,876 B2 | 12/2008 | Varkey |
| 7,603,011 B2 | 10/2009 | Varkey et al. |
| 7,763,802 B2 | 7/2010 | Varkey et al. |
| 7,860,362 B2 | 12/2010 | Varkey et al. |
| 7,912,333 B2 | 3/2011 | Varkey et al. |
| 8,213,756 B2 | 7/2012 | Herbst |
| 8,861,911 B2 | 10/2014 | Shin et al. |
| 8,870,858 B2 | 10/2014 | Zerfas |
| 8,929,701 B2 | 1/2015 | Lowell et al. |
| 8,929,702 B2 | 1/2015 | Varkey et al. |
| 9,093,191 B2 | 7/2015 | Hiel et al. |
| 9,201,207 B2 | 12/2015 | Varkey et al. |
| 9,488,793 B2 | 11/2016 | Register, III |
| 9,631,224 B2 | 4/2017 | Ohga et al. |
| 10,049,789 B2 | 8/2018 | Varkey et al. |
| 11,335,478 B2 * | 5/2022 | Varkey ............... H01B 13/14 |
| 2001/0020675 A1 | 9/2001 | Tubel et al. |
| 2001/0023614 A1 | 9/2001 | Tubel et al. |
| 2001/0040041 A1 | 11/2001 | Pennington et al. |

(56) References Cited

U.S. PATENT DOCUMENTS

| | | |
|---|---|---|
| 2002/0007948 A1 | 1/2002 | Bayne et al. |
| 2002/0085819 A1 | 7/2002 | Stottlemyer et al. |
| 2002/0159726 A1 | 10/2002 | Brown et al. |
| 2003/0042019 A1 | 3/2003 | Harkins et al. |
| 2003/0081917 A1 | 5/2003 | Bussear |
| 2003/0099443 A1 | 5/2003 | Kamik et al. |
| 2003/0099446 A1 | 5/2003 | Witt et al. |
| 2003/0165309 A1 | 9/2003 | Moon et al. |
| 2004/0045735 A1 | 3/2004 | Varkey et al. |
| 2004/0091215 A1 | 5/2004 | Bamoski et al. |
| 2004/0109650 A1 | 6/2004 | Kim et al. |
| 2004/0118590 A1 | 6/2004 | Head |
| 2004/0262027 A1 | 12/2004 | Kaczmarski |
| 2005/0117858 A1 | 6/2005 | Lee et al. |
| 2005/0194578 A1 | 9/2005 | Morris |
| 2005/0236161 A1 | 10/2005 | Gay et al. |
| 2005/0263281 A1 | 12/2005 | Lovell et al. |
| 2005/0281517 A1 | 12/2005 | Wessels, Jr. et al. |
| 2006/0045442 A1 | 3/2006 | Varkey et al. |
| 2006/0182398 A1 | 8/2006 | Dowd et al. |
| 2006/0193572 A1 | 8/2006 | Mjelstad |
| 2006/0280412 A1 | 12/2006 | Varkey |
| 2008/0024297 A1 | 1/2008 | Maki et al. |
| 2008/0031578 A1 | 2/2008 | Varkey et al. |
| 2008/0118209 A1 | 5/2008 | Varkey et al. |
| 2008/0289851 A1 | 11/2008 | Varkey et al. |
| 2009/0046983 A1 | 2/2009 | Varkey et al. |
| 2009/0145610 A1 | 6/2009 | Varkey et al. |
| 2009/0196557 A1 | 8/2009 | Varkey et al. |
| 2010/0074583 A1 | 3/2010 | Varkey et al. |
| 2010/0116510 A1 | 5/2010 | Varkey et al. |
| 2011/0005795 A1 | 1/2011 | Deighton et al. |
| 2011/0139447 A1 | 6/2011 | Ramos et al. |
| 2011/0234421 A1 | 9/2011 | Smith |
| 2011/0240312 A1 | 10/2011 | Varkey et al. |
| 2012/0222869 A1 | 9/2012 | Varkey |
| 2013/0084044 A1 | 4/2013 | Ertel et al. |
| 2014/0367121 A1 | 12/2014 | Varkey et al. |
| 2015/0013975 A1 | 1/2015 | McColpin |
| 2015/0170799 A1 | 6/2015 | Varkey et al. |
| 2016/0222736 A1 | 8/2016 | Varkey et al. |
| 2019/0006065 A1 | 1/2019 | Varkey et al. |
| 2020/0126691 A1 | 4/2020 | Varkey |

FOREIGN PATENT DOCUMENTS

| | | |
|---|---|---|
| CN | 2653528 Y | 11/2004 |
| CN | 2762296 Y | 3/2006 |
| CN | 201188137 Y | 1/2009 |
| CN | 202196616 U | 4/2012 |
| DE | 2818656 A1 | 10/1979 |
| DE | 29816469 U1 | 12/1998 |
| EP | 0203249 A2 | 12/1986 |
| EP | 0241724 A2 | 10/1987 |
| EP | 0342855 A2 | 11/1989 |
| EP | 0405851 A1 | 1/1991 |
| EP | 0853249 A1 | 7/1998 |
| EP | 1004914 A1 | 5/2000 |
| EP | 2097609 A1 | 9/2009 |
| EP | 2520962 A1 | 11/2012 |
| GB | 2177231 A | 1/1987 |
| GB | 2275953 A | 9/1994 |
| GB | 2299868 A | 10/1996 |
| GB | 2444362 A | 6/2008 |
| JP | 547186 A | 1/1979 |
| JP | S6029715 A | 2/1985 |
| JP | 61013208 A | 1/1986 |
| JP | H03145014 A | 6/1991 |
| JP | 492110 A | 3/2002 |
| JP | 2216710 A | 6/2008 |
| NL | 1019447 C2 | 6/2003 |
| RU | 2066871 C1 | 9/1996 |
| WO | 9601219 A1 | 1/1996 |
| WO | 9641066 A1 | 12/1996 |
| WO | 9948111 A1 | 9/1999 |
| WO | 0005612 A1 | 2/2000 |
| WO | 2006131871 A2 | 12/2006 |
| WO | 2006135513 A1 | 12/2006 |
| WO | 2007066146 A2 | 6/2007 |
| WO | 2012012679 A2 | 1/2012 |
| WO | 2012015868 A2 | 2/2012 |
| WO | 2012071101 A1 | 5/2012 |
| WO | 2012170080 A1 | 12/2012 |
| WO | 2014004026 A1 | 1/2014 |
| WO | 2016122446 A1 | 8/2016 |

OTHER PUBLICATIONS

Third Office Action issued in the related CN Application 201410383942.4, dated Apr. 11, 2018, 8 pages.

Fourth Office Action issued in the related CN Application 201410383942.4, dated Jan. 3, 2019, 3 pages. No Translation Provided.

Rejection decision issued in the related CN Application 201410383942.4, dated Apr. 26, 2019, 4 pages. No Translation Provided.

First Office Action and Search Report issued in CN Application 201610825946.0 dated Feb. 2, 2019, 8 pages. No Translation Provided.

Second Office Action and Search Report issued in CN Application 201610825946.0 dated Oct. 12, 2019, 12 pages with English Translaiton.

Third Office Action and Search Report issued in CN Application 201610825946.0 dated Apr. 23, 2020, 14 pages with English Translation.

Office Action issued in U.S. Appl. No. 14/408,022 dated Jan. 21, 2016, , 13 pages.

Office Action issued in U.S. Appl. No. 14/408,022 dated Jun. 10, 2016, 11 pages.

Office Action issued in U.S. Appl. No. 14/408,022 dated Oct. 23, 2016, 11 pages.

Office Action issued in U.S. Appl. No. 14/408,022 dated Mar. 7, 2017, 11 pages.

Office Action issued in U.S. Appl. No. 14/408,022 dated Jun. 23, 2017, 13 pages.

Office Action issued in U.S. Appl. No. 14/408,022 dated Nov. 24, 2017, 11 pages.

Office Action issued in U.S. Appl. No. 14/352,394 dated Apr. 3, 2017, 11 pages.

Office Action issued in U.S. Appl. No. 15/546,207 dated Oct. 15, 2018, 16 pages.

Office Action issued in U.S. Appl. No. 15/546,207 dated Jul. 5, 2019, 10 pages.

Office Action issued in U.S. Appl. No. 15/546,207 dated Nov. 20, 2019, 10 pages.

Office Action issued in U.S. Appl. No. 15/546,207 dated Mar. 9, 2020, 10 pages.

Office Action issued in U.S. Appl. No. 15/546,207 dated Sep. 11, 2020, 10 pages.

Office Action issued in U.S. Appl. No. 15/546,207 dated Dec. 3, 2020, 10 pages.

Office Action issued in U.S. Appl. No. 10/931,736 dated Jun. 5, 2007, 9 pages.

Office Action issued in U.S. Appl. No. 11/461,943 dated Oct. 19, 2007, 7 pages.

Office Action issued in U.S. Appl. No. 11/461,943 dated Apr. 30, 2008, 8 pages.

Office Action issued in U.S. Appl. No. 11/461,943 dated Aug. 22, 2008, 7 pages.

Office Action issued in U.S. Appl. No. 11/461,943 dated Feb. 26, 2009, 9 pages.

Office Action issued in U.S. Appl. No. 11/461,943 dated Aug. 11, 2009, 9 pages.

Office Action issued in U.S. Appl. No. 11/461,943 dated Oct. 28, 2009, 7 pages.

Office Action issued in U.S. Appl. No. 12/623,059 dated Jun. 11, 2010, 6 pages.

Office Action issued in U.S. Appl. No. 12/623,059 dated Nov. 17, 2010, 6 pages.

(56) References Cited

OTHER PUBLICATIONS

Office Action issued in U.S. Appl. No. 12/623,059 dated Jun. 13, 2011, 12 pages.
Office Action issued in U.S. Appl. No. 12/623,059 dated Jan. 6, 2012, 13 pages.
Office Action issued in U.S. Appl. No. 12/365,200 dated Jul. 14, 2010, 7 pages.
Office Action issued in U.S. Appl. No. 11/751,349 dated Apr. 7, 2009, 8 pages.
Office Action issued in U.S. Appl. No. 11/751,349 dated Nov. 16, 2009, 9 pages.
Office Action issued in U.S. Appl. No. 11/751,349 dated Jun. 25, 2010, 7 pages.
Office Action issued in U.S. Appl. No. 11/751,349 dated Mar. 7, 2011, 10 pages.
Office Action issued in U.S. Appl. No. 11/751,349 dated Dec. 20, 2012, 10 pages.
Office Action issued in U.S. Appl. No. 11/751,349 dated Sep. 9, 2013, 10 pages.
Office Action issued in U.S. Appl. No. 11/751,349 dated Mar. 4, 2014, 8 pages.
Office Action issued in U.S. Appl. No. 15/177,616 dated Jul. 3, 2017, 12 pages.
International Preliminary Report on Patentability issued in the related PCT Application PCT/US2013/044545, dated Dec. 31, 2014 (4 pages).
Office action issued in the related MX application MX/a/2014/016011, dated Sep. 22, 2016 (7 pages).
Office action issued in the related MX application MX/a/2014/016011, dated Feb. 10, 2017 (8 pages).
International Search Report and Written Opinion issued in the related PCT Application PCT/US2012/060608, dated Jan. 24, 2013 (9 pages).
International Preliminary Report on Patentability issued in the related PCT Application PCT/US2012/060608, dated Apr. 22, 2014 (5 pages).
European Search Report issued in the related EP Application 12841787.0, dated Jan. 19, 2016 (4 pages).
Office action issued in the related EP Application 12841787.0, dated May 9, 2016 (6 pages).
International Search Report and Written Opinion issued in the related PCT Application PCT/US2015/012918, dated Sep. 11, 2015 (17 pages).
International Preliminary Report on Patentability issued in the related PCT Application PCT/US2015/012918, dated Aug. 1, 2017 (13 pages).
International Search Report and Written Opinion issued in the related PCT Application PCT/IB2005/051607, dated Aug. 4, 2005 (8 pages).
International Preliminary Report on Patentability issued in the related PCT Application PCT/IB2005/051607, dated Nov. 21, 2006 (6 pages).
International Search Report and Written Opinion issued in the related PCT Application PCT/IB2008/051589, dated Jan. 14, 2009 (14 pages).
International Preliminary Report on Patentability issued in the related PCT Application PCT/IB2008/051589, dated Nov. 24, 2009 (10 pages).
Second Office Action issued in the related CN Application 200810085459.0, dated Mar. 20, 2012 (4 pages).
Third Office Action issued in the related CN Application 200810085459.0, dated Dec. 7, 2012 (6 pages).
Fourth Office Action issued in the related CN Application 200810085459.0, dated Jul. 1, 2013 (6 pages).
Fifth Office Action issued in the related CN Application 200810085459.0, dated Dec. 25, 2013 (6 pages).
Rejection Decision issued in the related CN Application 200810085459.0, dated Apr. 15, 2014 (6 pages).
First Office Action issued in the related CN Application 201410383942.4, dated Jan. 13, 2017 (4 pages).
Office Action issued in the related CN Application 201410383942.4, dated Jul. 7, 2016 (3 pages) Jan. 13, 2017, 4 pages.
Lebedev et al., The Breakdown Strenghth of Two-Layer Dielectrics, Tomsk Polytechnic University, Tomsk, Russia #4.304.P2, High VoltageEngineering Symposium, Aug. 22-27, 1999.
Salama et al., Instructional Design of Multi-Layer Insulation of Power Cables, Transactions on Power systems, vol. 7, No. 1, Feb. 1992, pp. 377-382.
Office action issued in the related CA appliation 2594959 dated Feb. 26, 2015 (3 pages).
Office action issued in the related CA appliation 2594959 dated Mar. 1, 2016 (3 pages).
Office action issued in the related FR appliation 2594959 dated Oct. 20, 2011 (2 pages).
Office action issued in the related FR appliation 2594959 dated Dec, 28, 2011 (1 pages).
Office action issued in the related CA application 2652502, dated Aug. 7, 2015 (3 pages).
Third Office Action issued in the related MX Application MX/a/2014/016011, dated Oct. 6, 2017 (9 pages).
Office Action issued in U.S. Appl. No. 16/100,423 dated Nov. 5, 2018, 11 pages.
Office Action issued in U.S. Appl. No. 15/546,207 dated Oct. 15, 2018, 49 pages.
Office Action issued in U.S. Appl. No. 15/546,207 dated Jul. 5, 2019, 11 pages.
Examination Report issued in related Canadian Patent Application 2851877 dated Aug. 27, 2019, 5 pages.
Exam Report issued in related EP Patent Application No. 15880350.2 dated Oct. 17, 2019, 5 pages.
Exam Report issued in related EP Patent Application No. 12841787.0 dated Oct. 2, 2020, 7 pages.
Exam Report issued in related EP Patent Application No. 15880350.2 dated Feb. 22, 2021, 5 pages.
Office Action Issue in U.S. Appl. No. 15/546,207 dated Apr. 5, 2021, 20 pages.
Combined Search and Examination Report under Sections 17 18(3) of United Kingdom Patent Application GB2020483.0 dated Apr. 16, 2021, 2 pages.
Office Action issued in U.S. Appl. No. 15/546,207 dated Jul. 28, 2021, 14 pages.
Search and Exam Report issued in EP Patent Application No. 15880350.2 dated Aug. 9, 2018, 3 pages.
Examination Report under Sections 18(3) of United Kingdom Patent Application GB1422687.2 dated Aug. 1, 2019, 38 pages.
Exam Report issued in related EP Patent Application No. 12841787.0 dated Feb. 12, 2018.
Exam Report issued in related EP Patent Application No. 12841787.0 dated Mar. 13, 2019, 6 pages.
Exam Report issued in related EP Patent Application No. 12841787.0 dated Feb. 24, 2020, 5 pages.
Exam Report issued in Canadian Patent Application 2851877 dated Aug. 23, 2018, 4 pages.
Exam Report issued in EP Patent Application No. 15880350.2 dated May 19, 2020, pages.
Summons to attend Oral Proceedings issued in European Patent Application No. 12841787.0 dated Jul. 12, 2022, 8 pages.

* cited by examiner

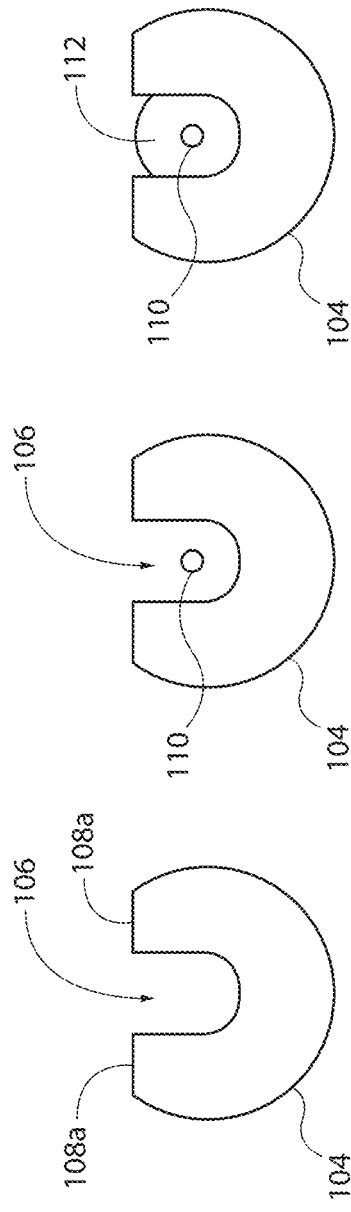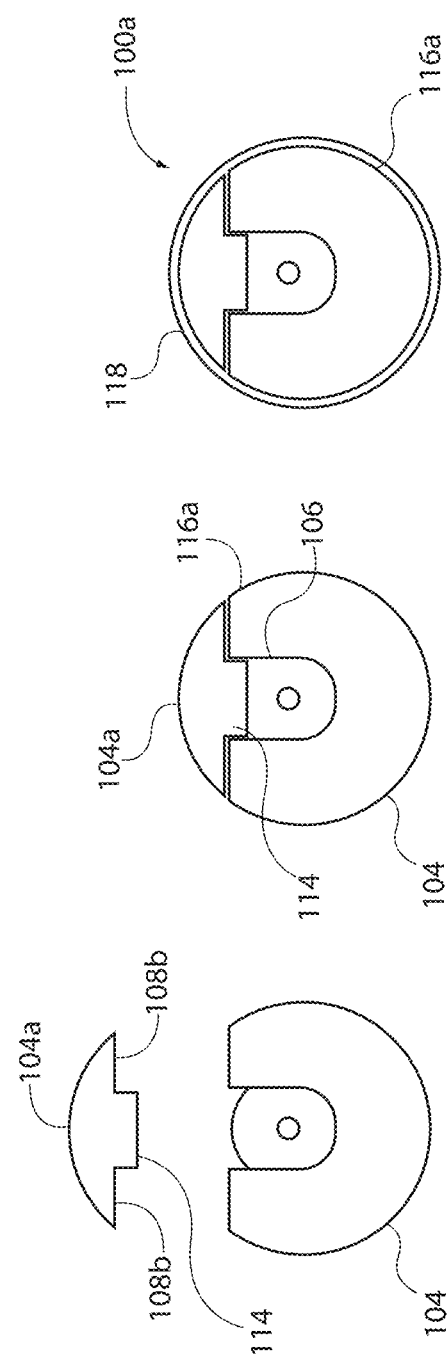

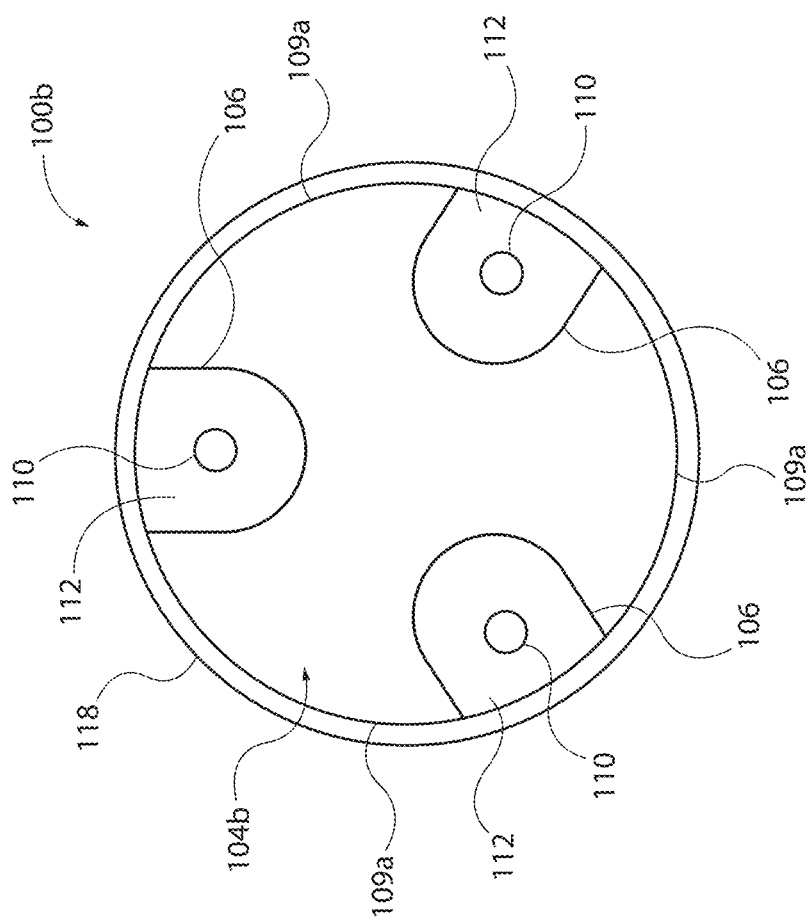

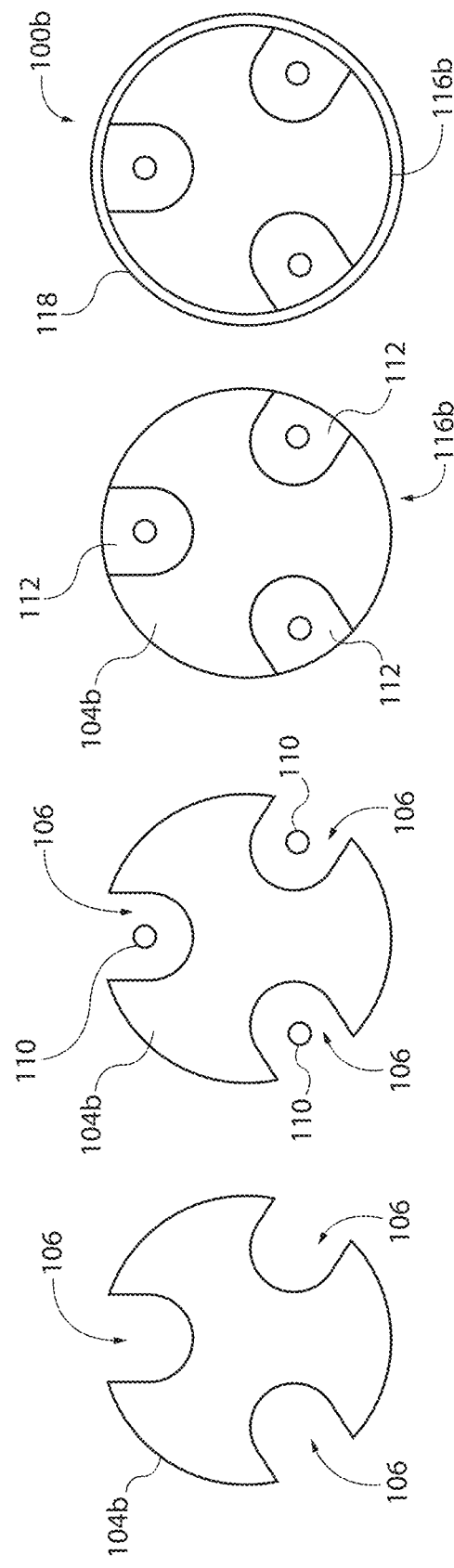

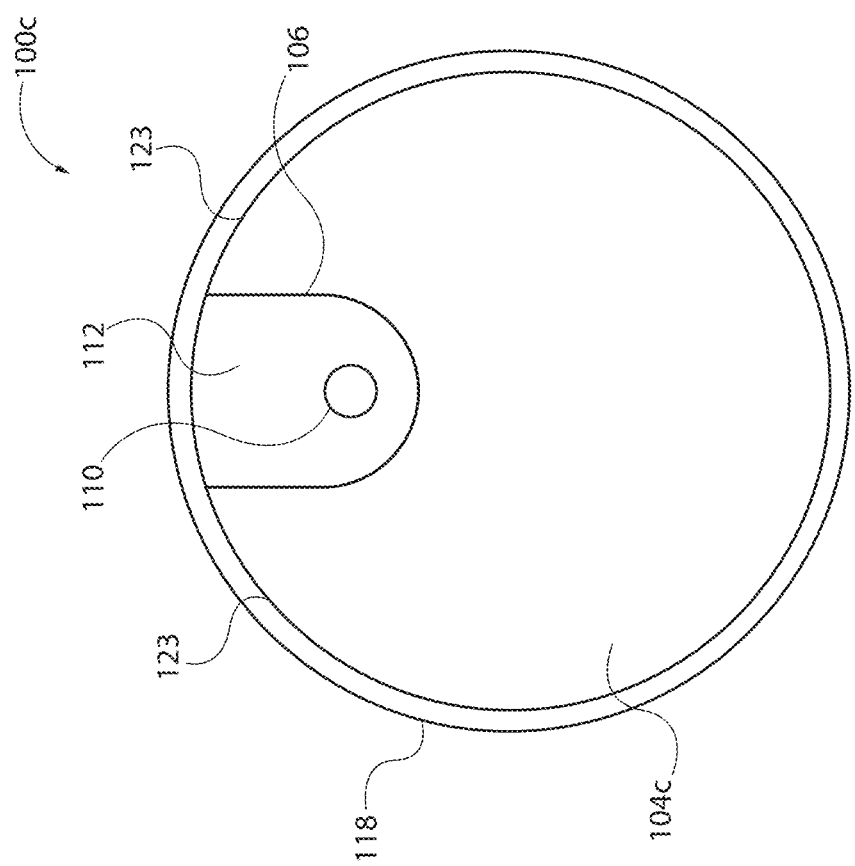

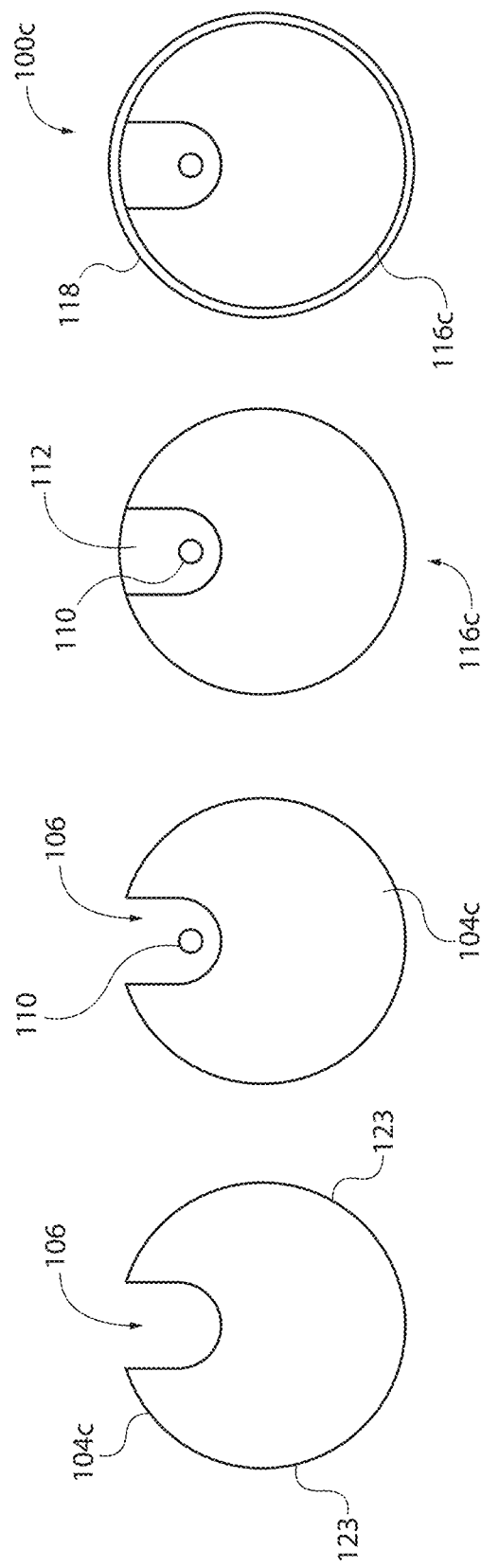

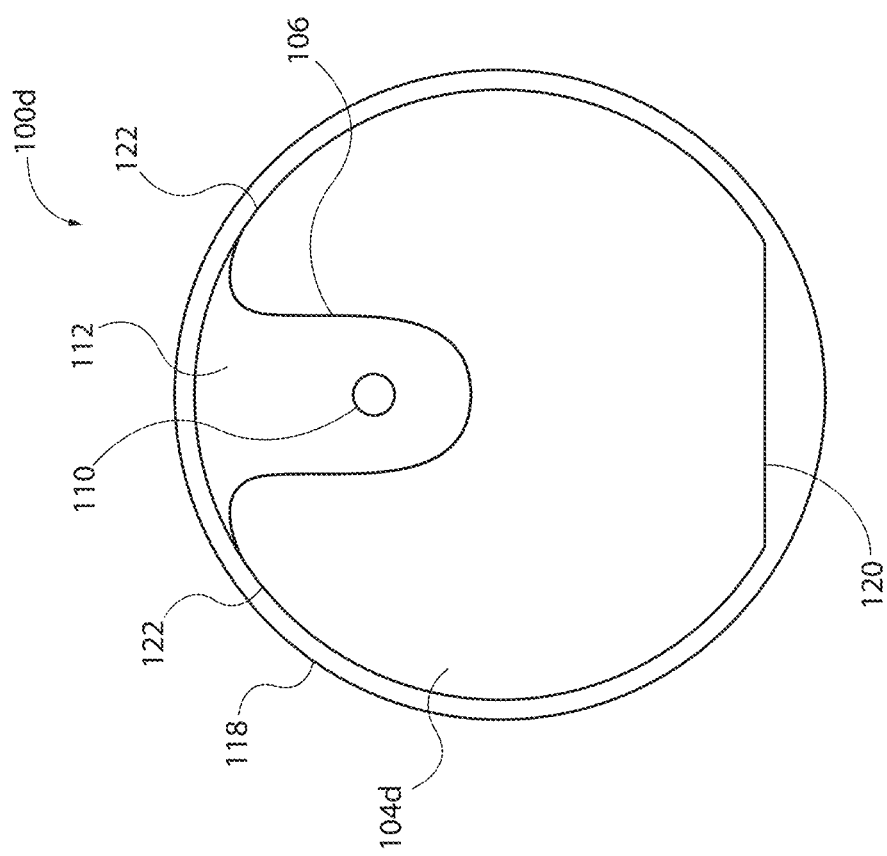

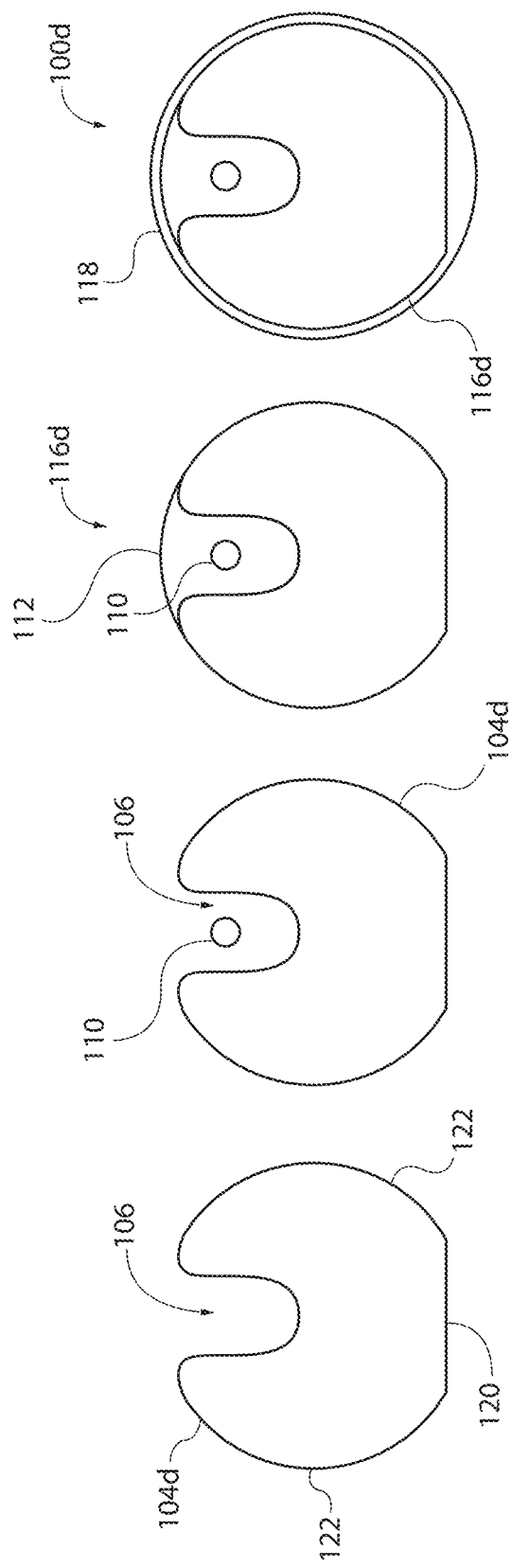

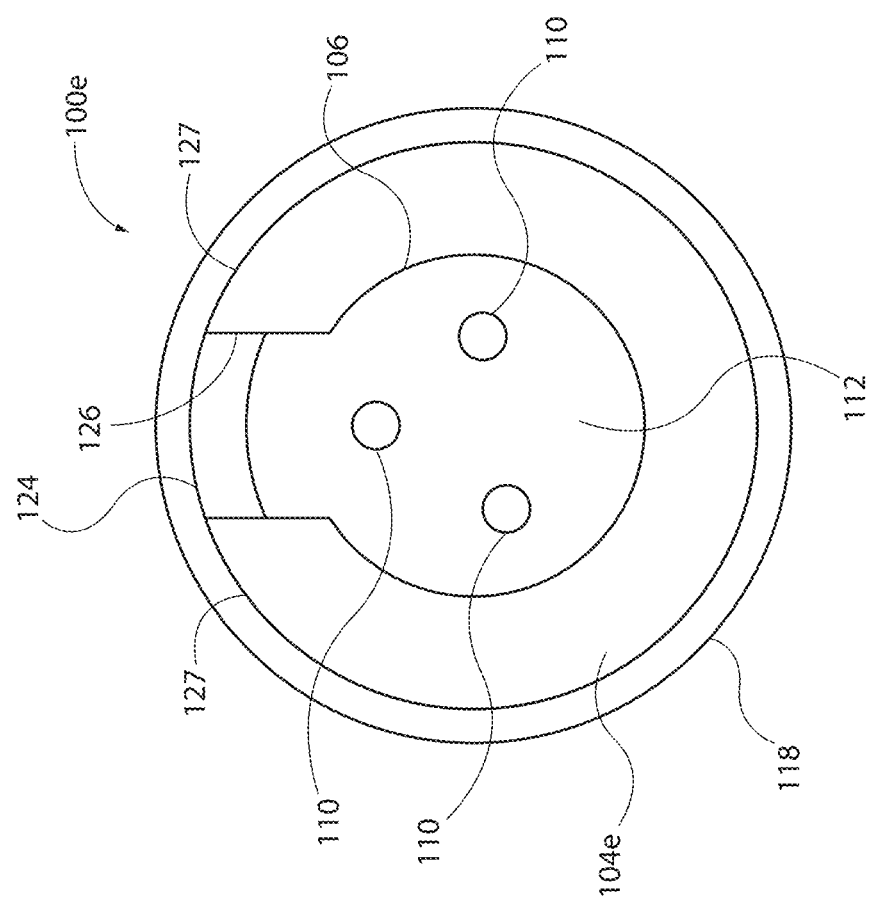

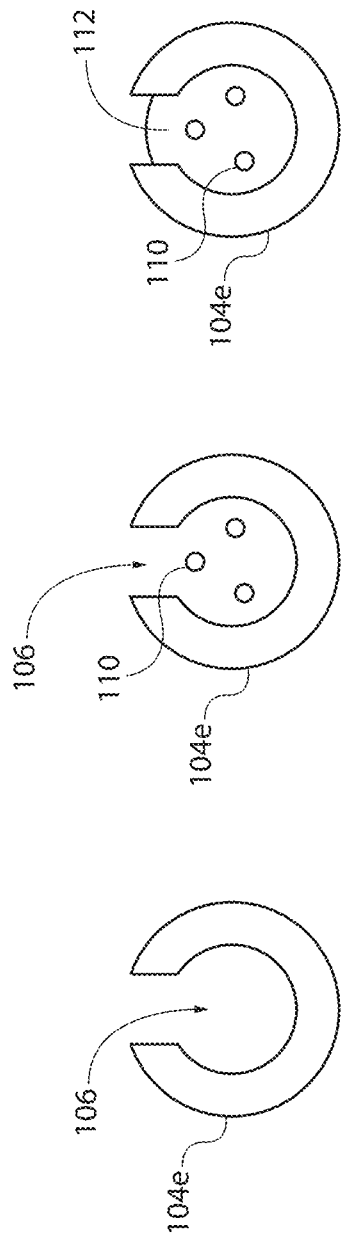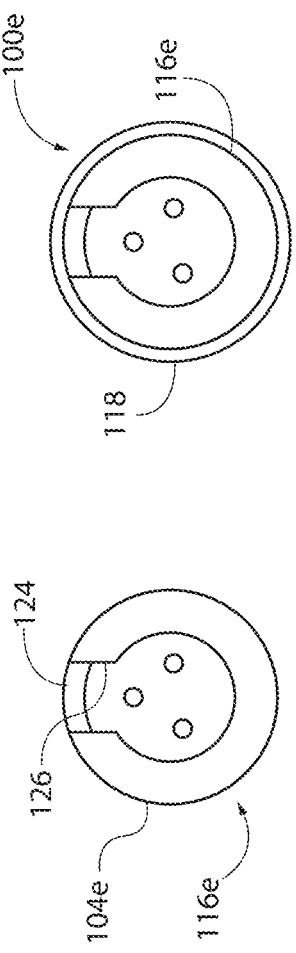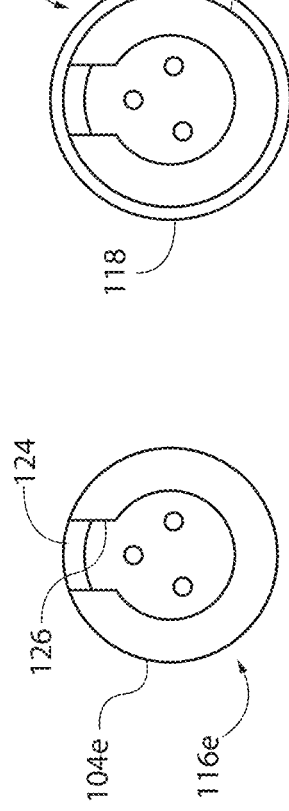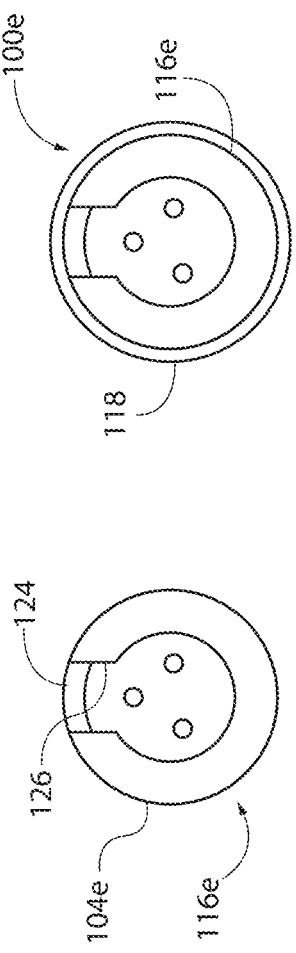

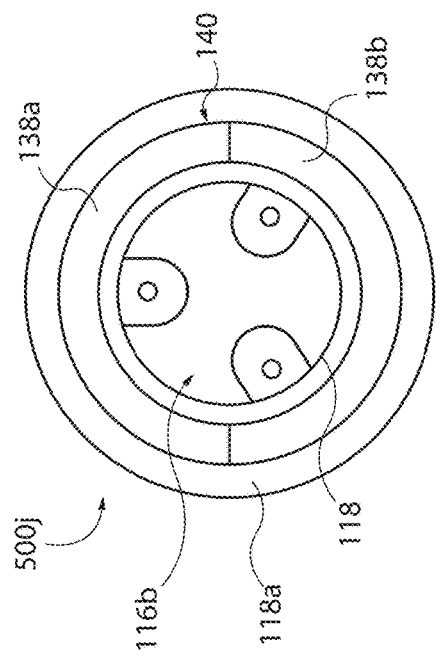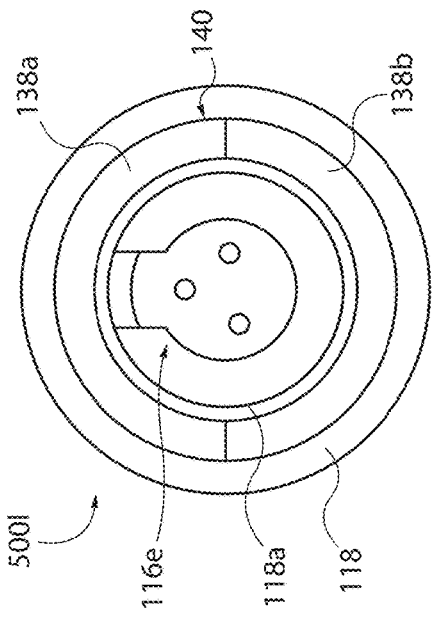
FIG. 8A
FIG. 8B
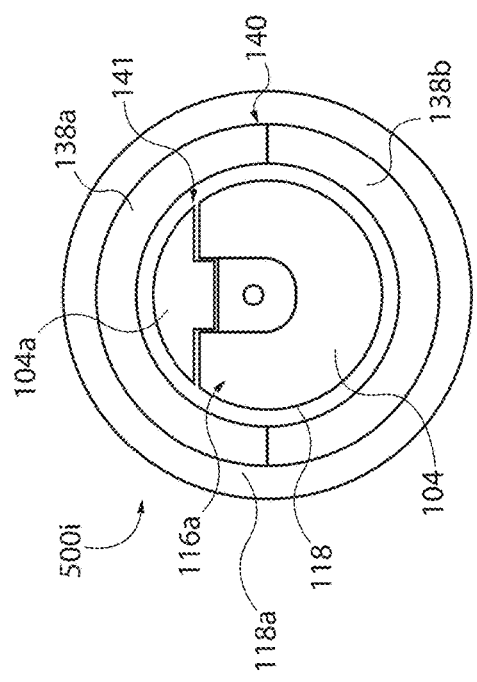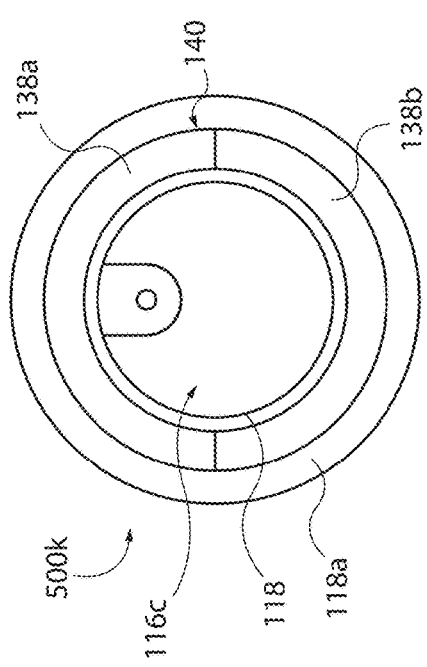
FIG. 8C
FIG. 8D

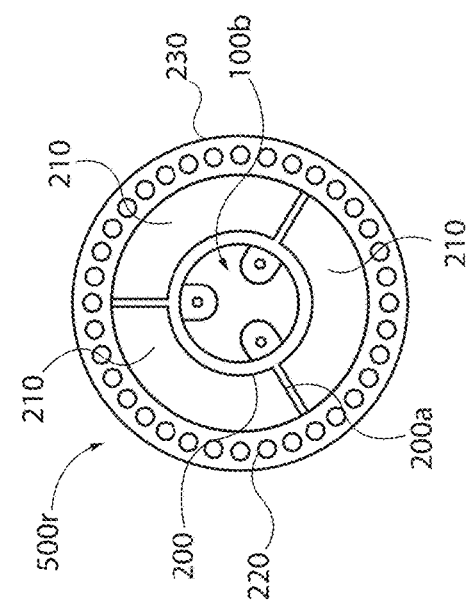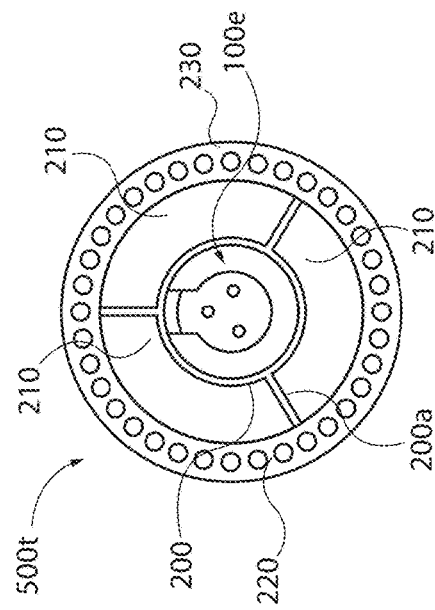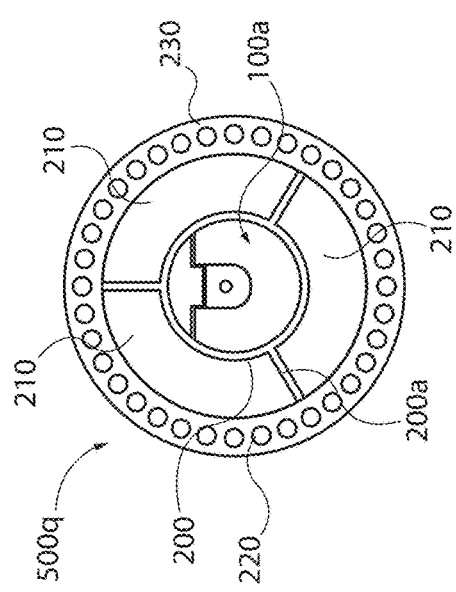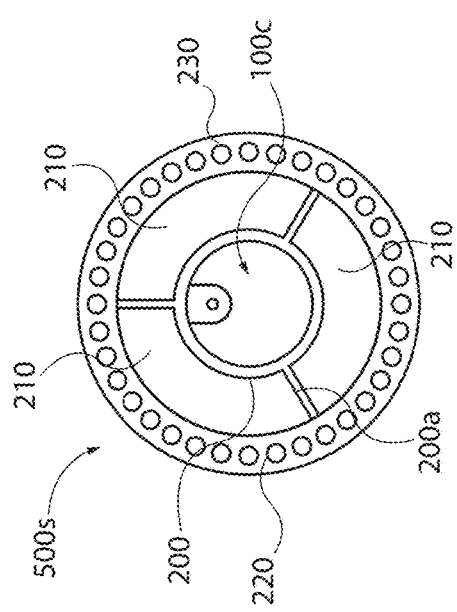

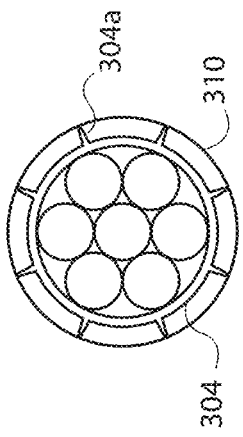
FIG. 14C
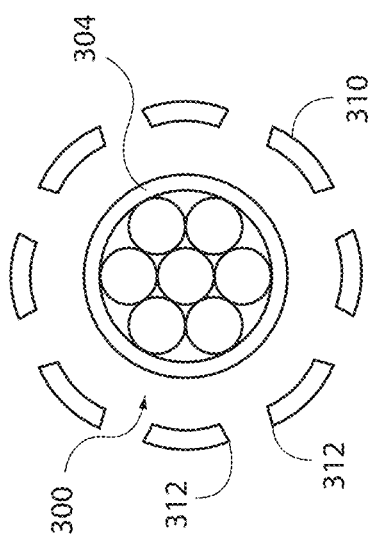
FIG. 14B
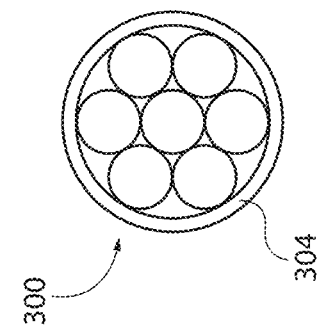
FIG. 14A
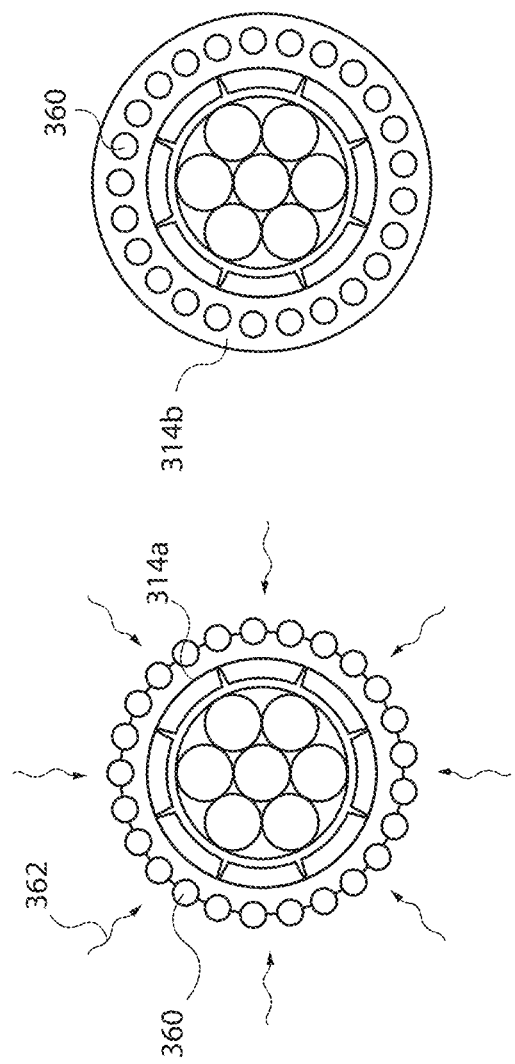
FIG. 14F
FIG. 14E
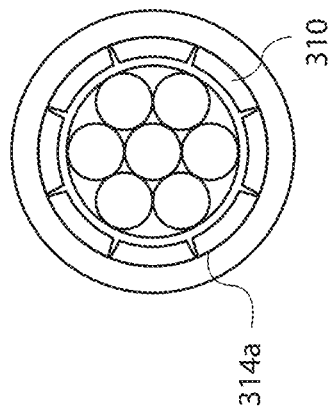
FIG. 14D

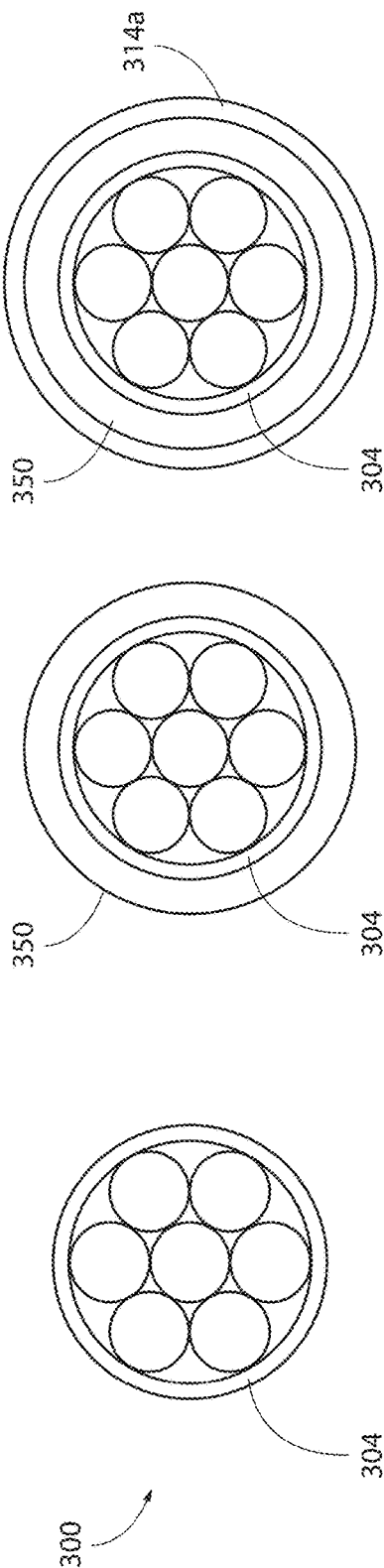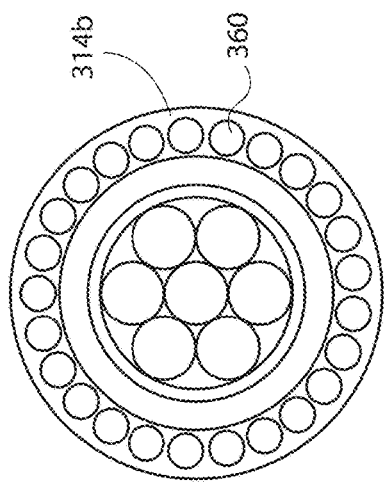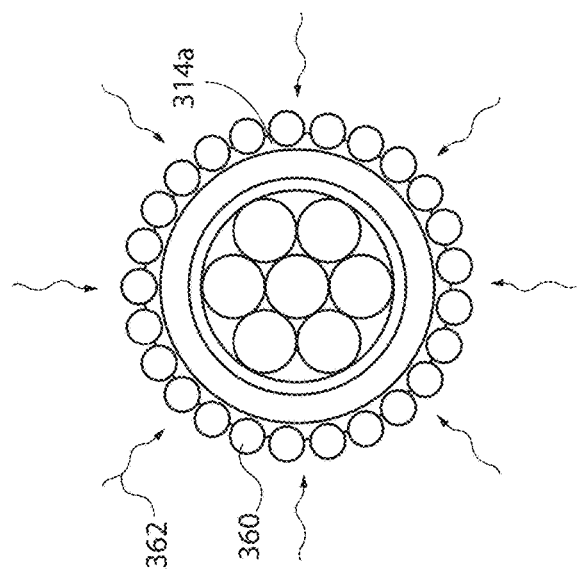

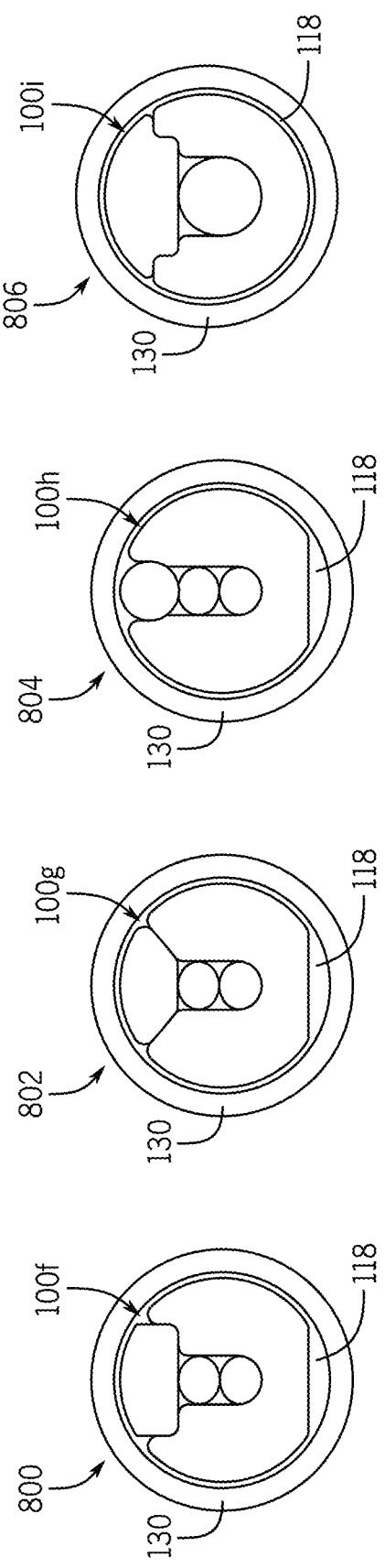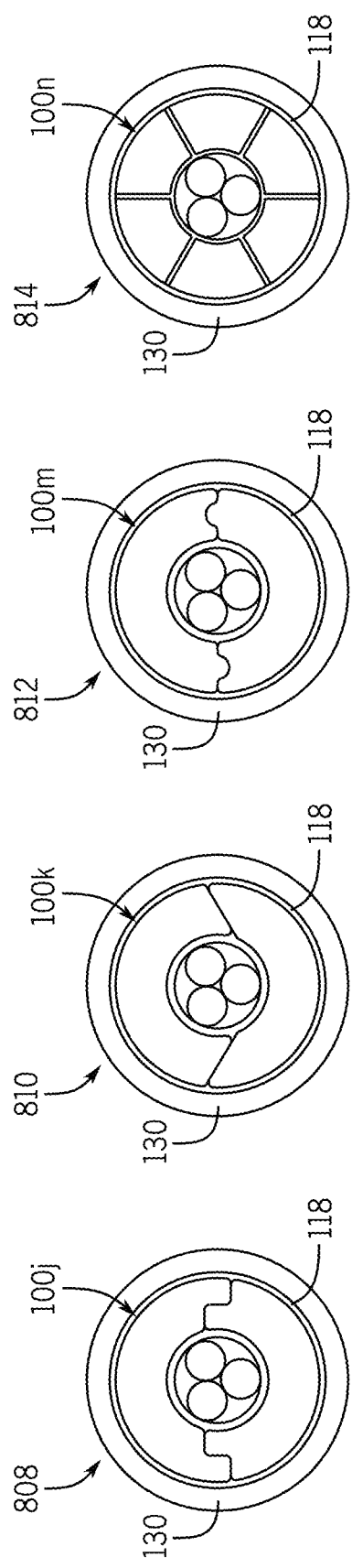

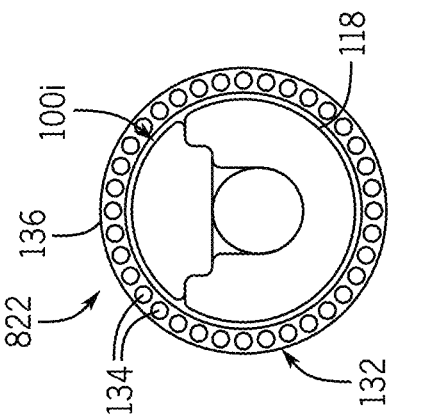
FIG. 30D
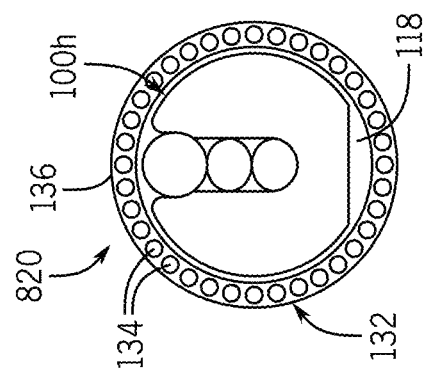
FIG. 30C
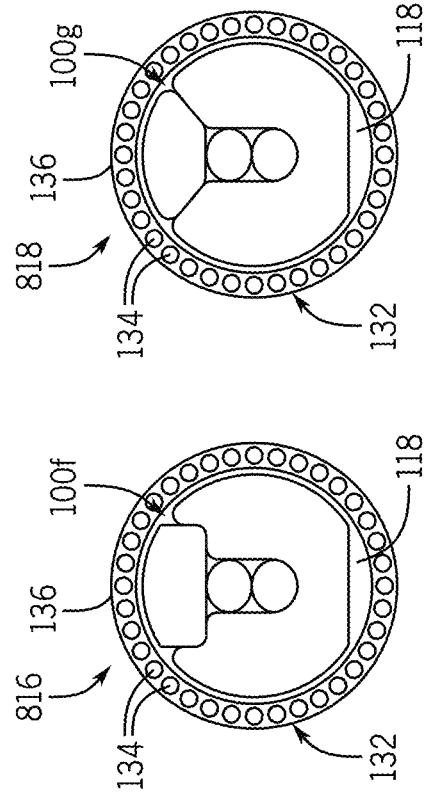
FIG. 30B
FIG. 30A
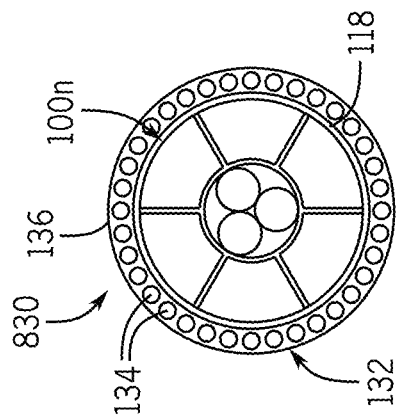
FIG. 30H
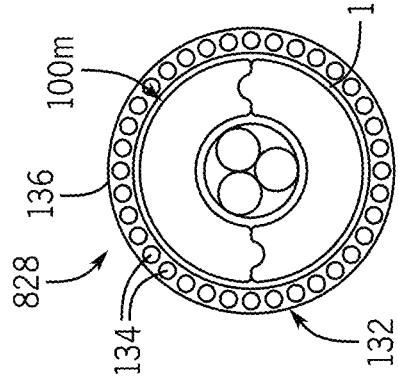
FIG. 30G
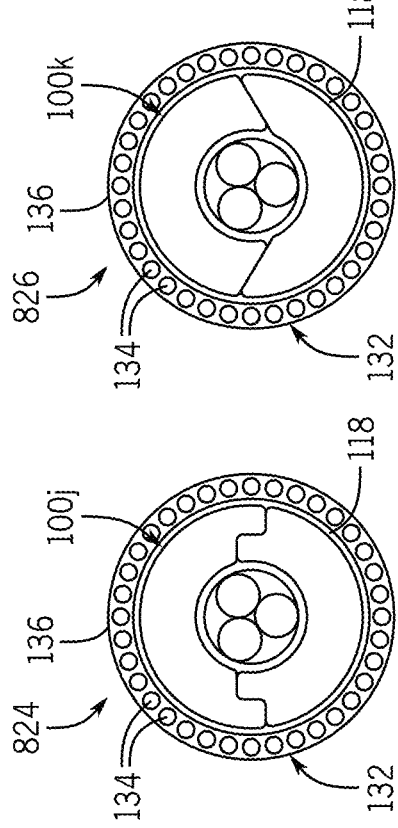
FIG. 30F
FIG. 30E

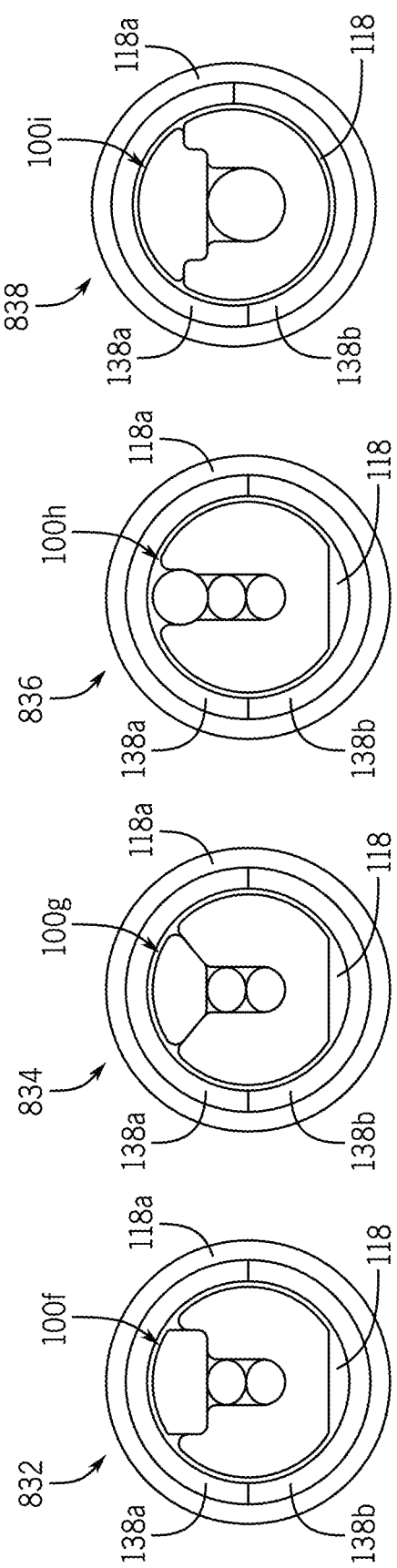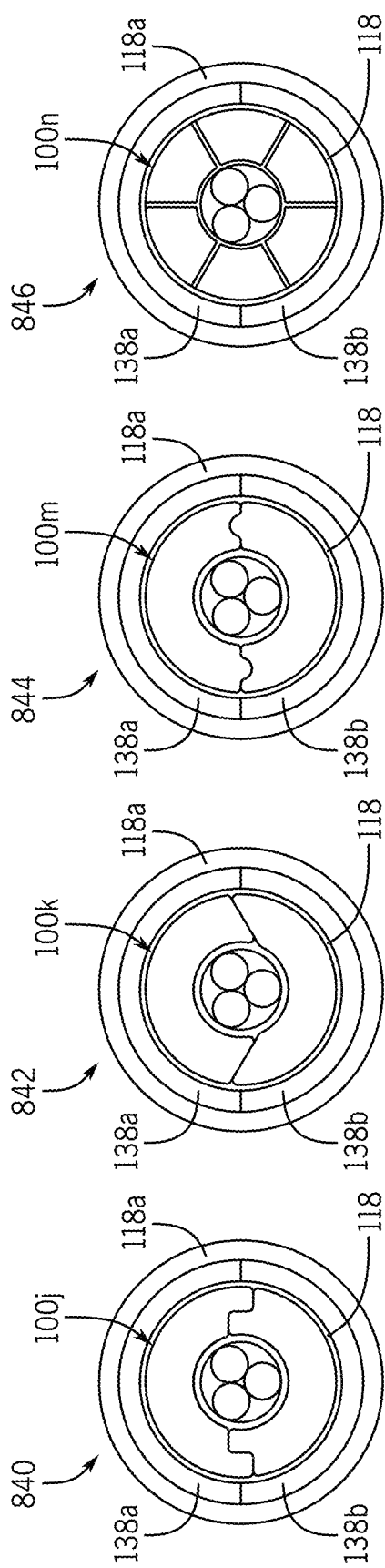

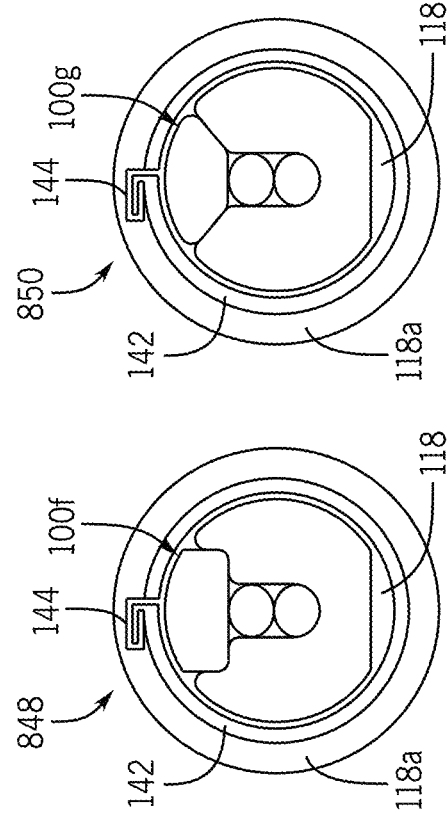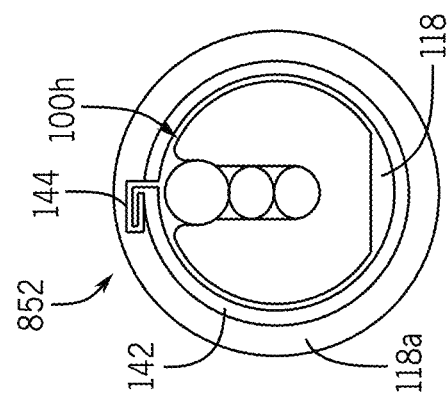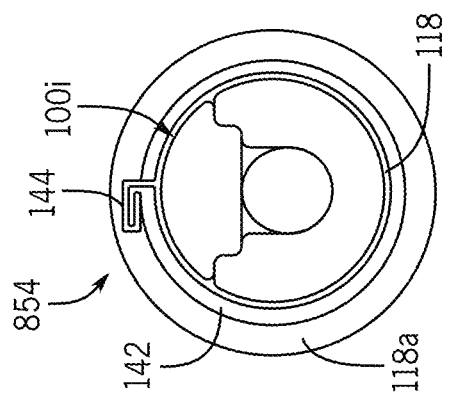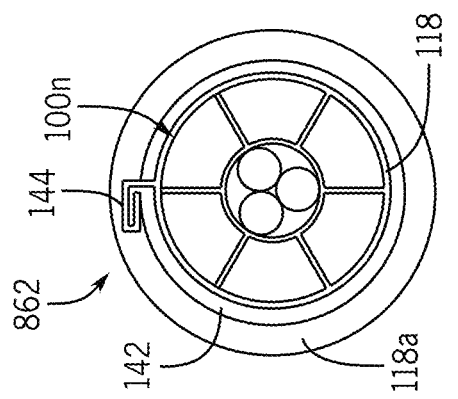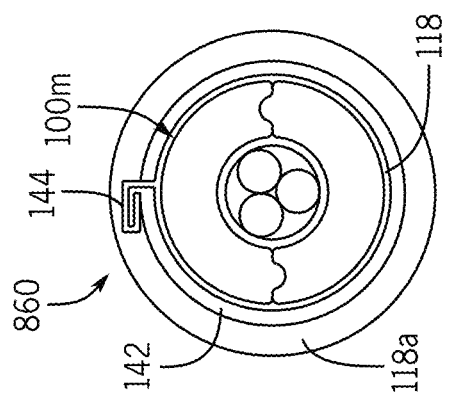

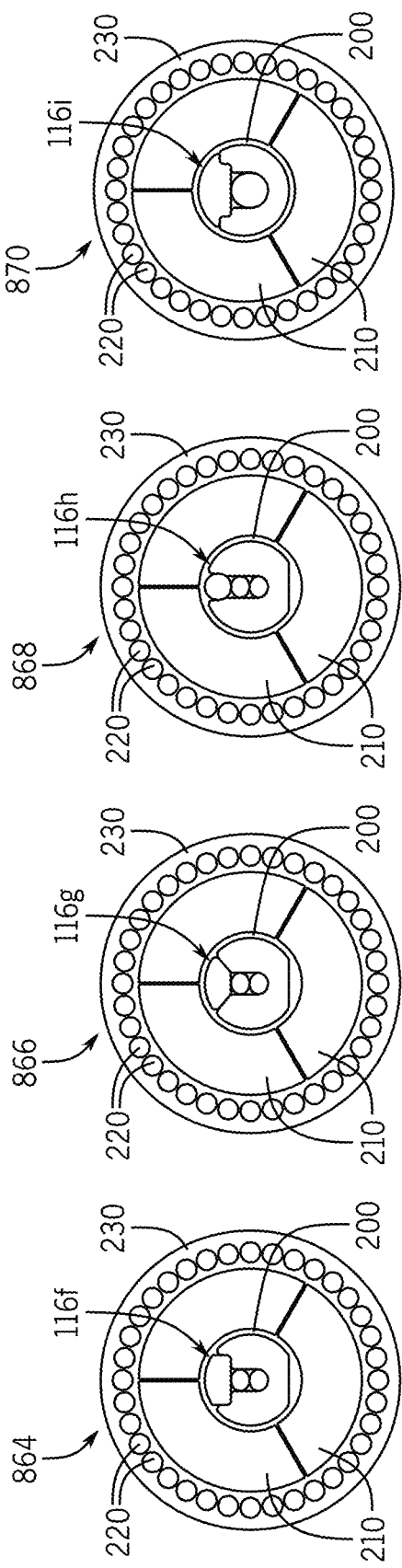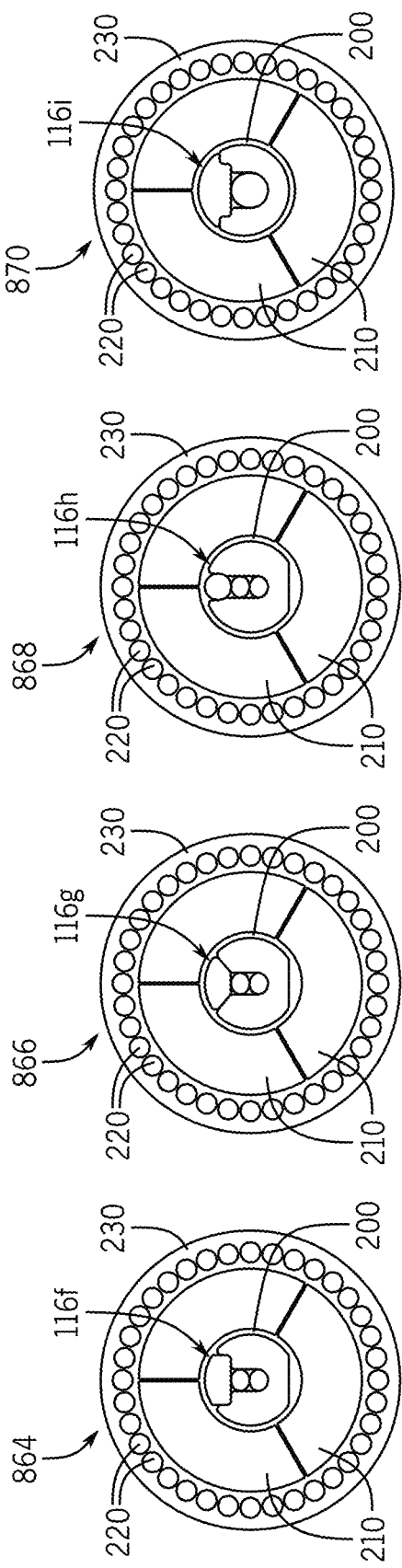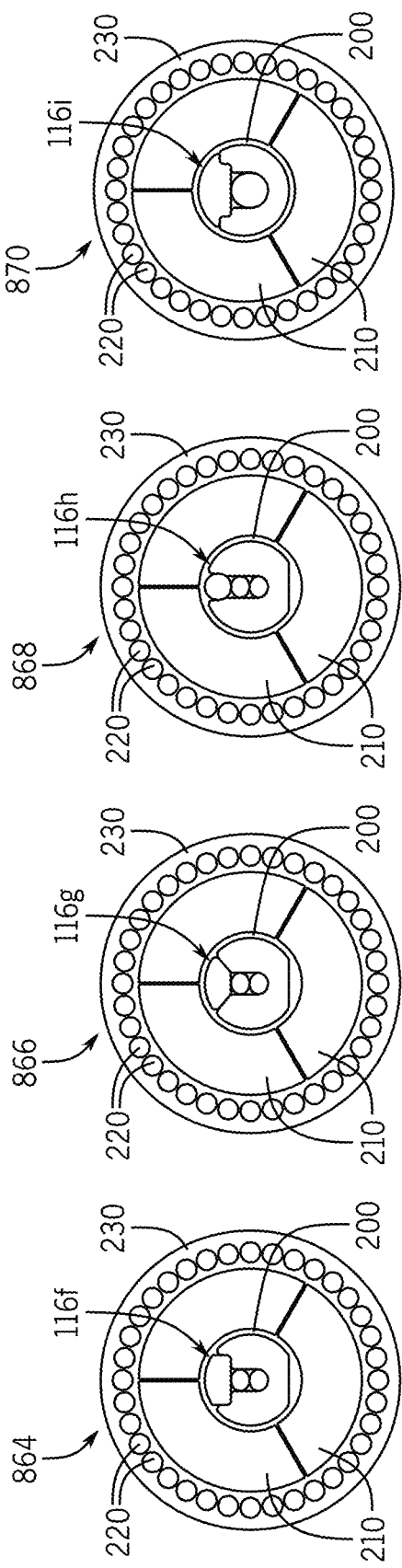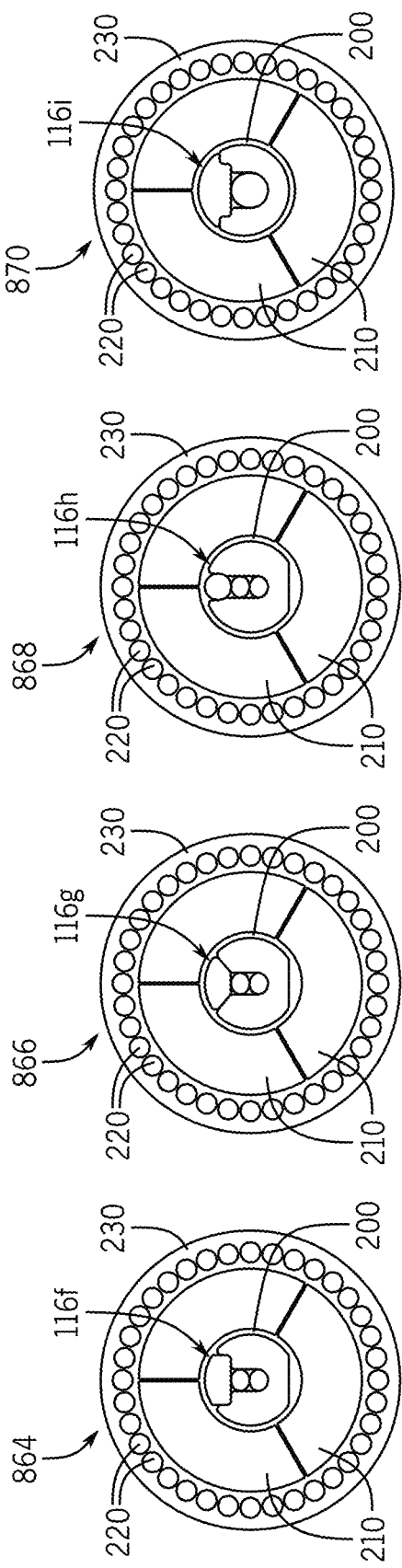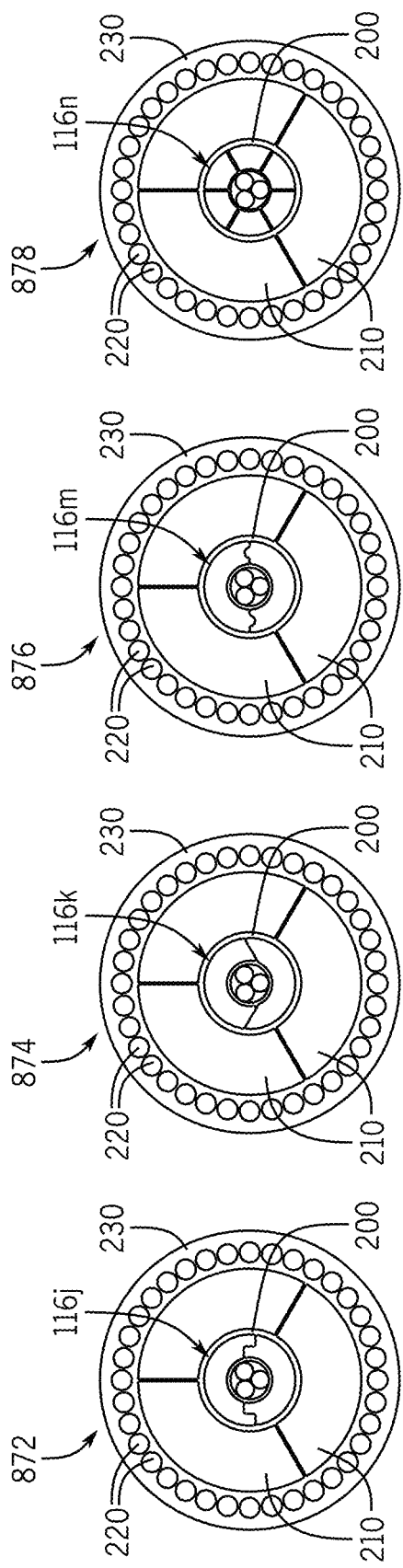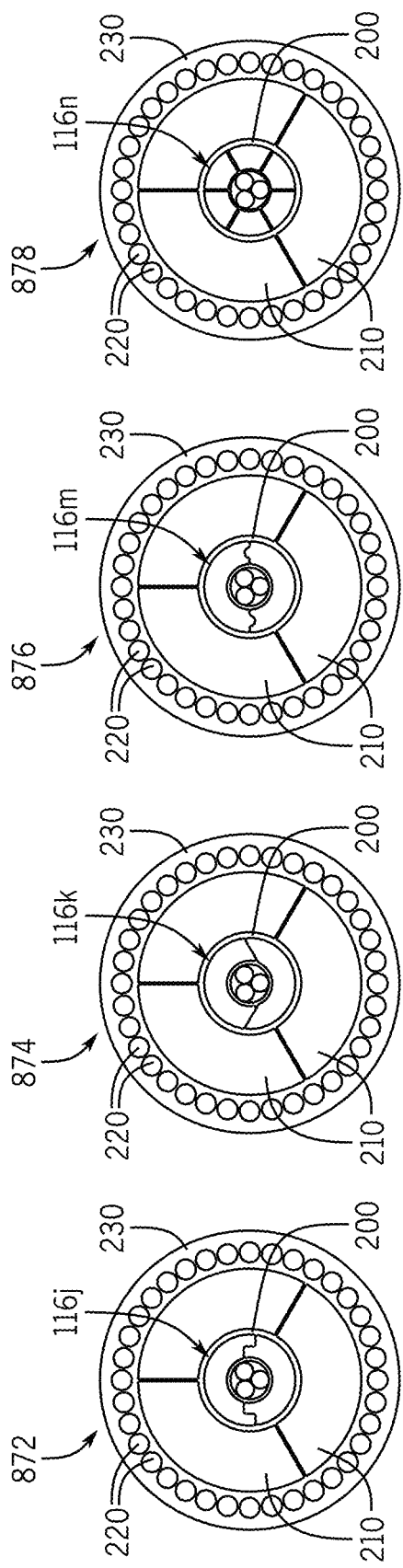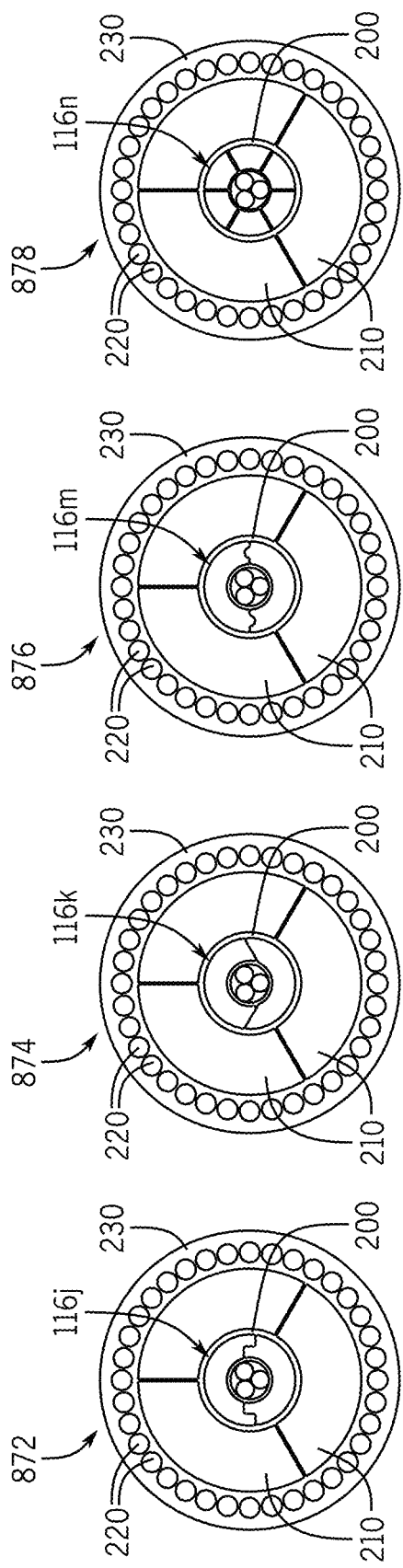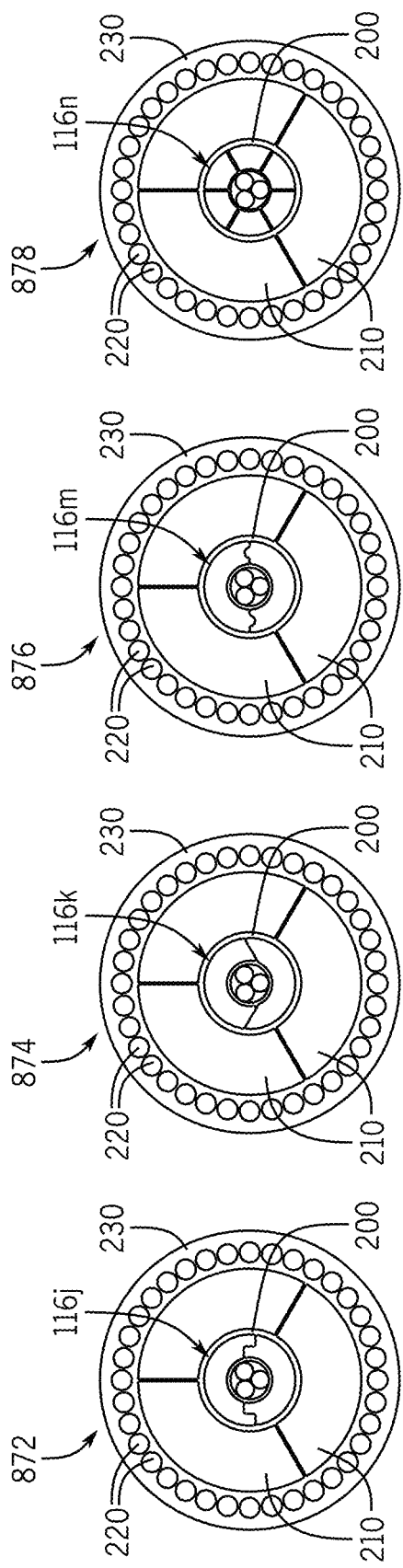

COMPRESSION AND STRETCH RESISTANT COMPONENTS AND CABLES FOR OILFIELD APPLICATIONS

CROSS-REFERENCE TO RELATED APPLICATIONS

This application is a continuation of U.S. patent application Ser. No. 16/724,432, entitled "COMPRESSION AND STRETCH RESISTANT COMPONENTS AND CABLES FOR OILFIELD APPLICATIONS," filed Dec. 23, 2019, which is a continuation-in-part of U.S. patent application Ser. No. 16/100,423, entitled "COMPRESSION AND STRETCH RESISTANT COMPONENTS AND CABLES FOR OILFIELD APPLICATIONS," filed Aug. 10, 2018, which is a divisional of U.S. patent application Ser. No. 15/177,616, entitled "COMPRESSION AND STRETCH RESISTANT COMPONENTS AND CABLES FOR OILFIELD APPLICATIONS," filed Jun. 9, 2016, which are incorporated by reference herein in their entireties for all purposes.

FIELD

Embodiments of the present disclosure generally relate to cables for providing electrical power and telemetry to downhole tools.

BACKGROUND

Certain opto-electrical cables for providing both electrical power and telemetry to downhole tools include a tube formed of semicircular-profile wires that surround optical fibers. Traditionally, such opto-electrical cables, when subjected to longitudinal strain and/or compressive forces, are subject to "milking," where filler gel and/or optical fibers within the tube are squeezed out of the tube. Manufacturing imperfections may increase the occurrence of milking.

SUMMARY

The present disclosure provides for an opto-electrical cable. The opto-electrical cable includes an opto-electrical cable core, and a polymer layer longitudinally and circumferentially surrounding the opto-electrical cable core. The opto-electrical cable core includes a wire, at least one channel formed within the wire and extending longitudinally along the wire, and optical fibers extending longitudinally within each channel.

The present disclosure provides for a multi-component cable. The multi-component cable includes electrical conductor cables and opto-electrical cables. Deformable polymer longitudinally and circumferentially surrounds the opto-electrical cables and the electrical conductor cables. The opto-electrical cables and the electrical conductor cables are arranged within the deformable polymer in a coax configuration, a triad configuration, a quad configuration, or a hepta configuration. Each opto-electrical cable includes an opto-electrical cable core. Each opto-electrical cable core includes a wire, at least one channel formed within the wire and extending longitudinally along the wire, and optical fibers extending longitudinally within each channel. A polymer layer longitudinally and circumferentially surrounds each opto-electrical cable core.

The present disclosure provides for a method. The method includes providing a wire having at least one channel extending longitudinally within and along the wire. The method includes providing optical fibers extending longitudinally within each channel. The wire and the optical fibers form an opto-electrical cable core. The method includes applying a polymer layer longitudinally and circumferentially surrounding the opto-electrical cable core to form an opto-electrical cable.

BRIEF DESCRIPTION OF DRAWINGS

The present disclosure may be understood from the following detailed description when read with the accompanying figures. It is emphasized that, in accordance with the standard practice in the industry, various features may not be drawn to scale. In fact, the dimensions of the various features may be arbitrarily increased or reduced for clarity of discussion.

FIGS. 1A-1F depict cross-sectional views showing manufacture of the opto-electrical cable of FIG. 1 in accordance with certain embodiments of the present disclosure.

FIG. 2 depicts a cross-sectional view an opto-electrical cable including a wire having multiple channels in accordance with certain embodiments of the present disclosure.

FIGS. 2A-2D depict cross-sectional views showing manufacture of the opto-electrical cable of FIG. 2 in accordance with certain embodiments of the present disclosure.

FIG. 3 depicts a cross-sectional view an opto-electrical cable including a wire having a single channel in accordance with certain embodiments of the present disclosure.

FIGS. 3A-3D depict cross-sectional views showing manufacture of the opto-electrical cable of FIG. 3 in accordance with certain embodiments of the present disclosure.

FIG. 4 depicts a cross-sectional view an opto-electrical cable including a wire having a single channel and a planar base in accordance with certain embodiments of the present disclosure.

FIGS. 4A-4D depict cross-sectional views showing manufacture of the opto-electrical cable of FIG. 4 in accordance with certain embodiments of the present disclosure.

FIG. 5 depicts a cross-sectional view an opto-electrical cable including a wire having a single channel and a C-shaped profile in accordance with certain embodiments of the present disclosure.

FIGS. 5A-5E depict cross-sectional views showing manufacture of the opto-electrical cable of FIG. 5 in accordance with certain embodiments of the present disclosure.

FIGS. 8A-8D depict cross-sectional views of additional embodiments of opto-electrical cables having completion layers in accordance with certain embodiments of the present disclosure.

FIGS. 10A-10D depict cross-sectional views of additional embodiments of opto-electrical cables having completion layers in accordance with certain embodiments of the present disclosure.

FIGS. 14A-14H depict cross-sectional views showing manufacture of a jacketed multi-component cable having arch-profile wires in accordance with certain embodiments of the present disclosure.

FIGS. 20A-20G depict cross-sectional views showing manufacture of jacketed multi-component cables having a layer of hard polymer in accordance with certain embodiments of the present disclosure.

FIGS. 29A-29H depict cross-sectional views of opto-electrical cables having completion layers in accordance with certain embodiments of the present disclosure.

FIGS. 30A-30H depict cross-sectional views of opto-electrical cables having completion layers in accordance with certain embodiments of the present disclosure.

FIGS. 31A-31H depict cross-sectional views of opto-electrical cables having completion layers in accordance with certain embodiments of the present disclosure.

FIGS. 32A-32H depict cross-sectional views of opto-electrical cables having completion layers in accordance with certain embodiments of the present disclosure.

FIGS. 33A-33H depict cross-sectional views of opto-electrical cables having completion layers in accordance with certain embodiments of the present disclosure.

DETAILED DESCRIPTION

Figure 1:
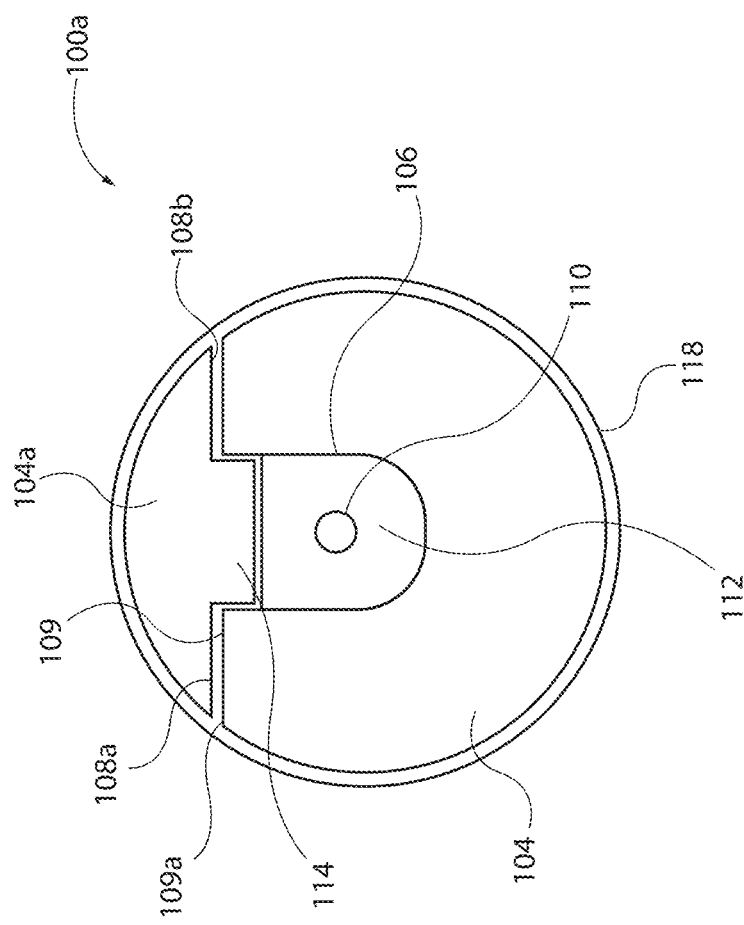
FIG. 1 depicts a cross-sectional view of an opto-electrical cable including a wire having a channel and cap configuration in accordance with certain embodiments of the present disclosure.

A detailed description will now be provided. The following disclosure includes specific embodiments, versions and examples, but the disclosure is not limited to these embodiments, versions or examples, which are included to enable a person having ordinary skill in the art to make and use the disclosure when the information in this application is combined with available information and technology. In addition, the present disclosure may repeat reference numerals and/or letters in the various examples. This repetition is for the purpose of simplicity and clarity and does not in itself dictate a relationship between the various embodiments and/or configurations discussed.

Various terms as used herein are shown below. To the extent a term used in a claim is not defined below, it should be given the broadest definition persons in the pertinent art have given that term as reflected in printed publications and issued patents. Further, unless otherwise specified, all compounds described herein may be substituted or unsubstituted and the listing of compounds includes derivatives thereof.

Further, various ranges and/or numerical limitations may be expressly stated below. It should be recognized that unless stated otherwise, it is intended that endpoints are to be interchangeable. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.).

Embodiments of the present disclosure may include an opto-electrical cable for providing electrical power, data transmission, distributed sensing capabilities, or combinations thereof. For example and without limitation, the opto-electrical cable may be used to provide electrical power, data transmission, distributed sensing capabilities, or combinations thereof to downhole tools within a wellbore. In certain embodiments, the opto-electrical cable may include stable, durable, stretch-resistant and compression-resistant opto-electrical cable cores adapted to resist milking.

FIG. 1 depicts an embodiment of opto-electrical cable 100a. Opto-electrical cable 100a may include base wire 104. Base wire 104 may include channel 106 formed within and extending along a longitudinal axis of base wire 104. In certain embodiments, base wire 104 has a partial-circular-profile. Base wire 104 may be a conductive metal wire. For example and without limitation, base wire 104 may be a copper wire, a copper alloy wire, a steel wire, or an aluminum wire. In certain embodiments, base wire 104 has base wire mating face 108a (e.g., a mating surface). Base wire mating face 108a may extend from channel edge 109 to outer wire circumference 109a of base wire 104. Channel 106 may be formed within base wire 104 between two portions of base wire mating face 108a. In some embodiments, base wire mating face 108a is a planar surface. One or more optical fibers 110 may extend longitudinally within channel 106. In certain embodiments, optical fibers 110 may be composed of acrylate fibers, polyimide fibers, or silicone perfluoroalkoxy (PFA) fibers. In certain embodiments, filler 112 may encase optical fibers 110 within channel 106. Filler 112 may provide protective cushioning to optical fibers 110. In some embodiments, filler 112 is a soft gel filler, such as a silicon polymer gel. Opto-electrical cable 100a may include cap wire 104a. Cap wire 104a may be formed of the same or different conductive materials as base wire 104. In some embodiments, cap wire 104a has a semicircular outer profile. Cap wire 104a may be mechanically coupled with base wire 104. For example and without limitation, cap wire 104a may include cap wire mating face 108b and tab 114 extending from cap wire mating face 108b. In some embodiments, tab 114 extends from cap wire mating face 108b between two portions cap wire mating face 108b. Tab 114 may be sized and shaped to fit within channel 106 in base wire 104. Tab 114 may extend at least partially into channel 106 and longitudinally along cap wire 104a. With optical fibers 110 and filler 112 within channel 106, tab 114 of cap wire 104a may be mechanically coupled into channel 106 of base wire 104. For example and without limitation, tab 114 may be close fit, location fit, or interference fit within channel 106. In some embodiments, tab 114 may be press fit or shrink fit into channel 106. When cap wire 104a is mechanically coupled with base wire 104, cap wire mating face 108b may be in contact with base wire mating face 108a. In some embodiments, cap wire mating face 108b is a planar surface. Cap wire 104a may enclose and/or seal channel 106. Opto-electrical cable 100a may include one or more polymer layers 118 encasing base wire 104 and cap wire 104a. In some embodiments, polymer layer 118 includes one or more layers of tape. For example and without limitation, the tape of polymer layer 118 may be a polyetheretherketone (PEEK) tape. In some embodiments, polymer layer 118 includes one or more layers of extruded polymer. Polymer layer 118 may retain optical fibers 110 and filler 112 in position within channel 106. In certain embodiments, opto-electrical cable 100a has a circular-profile. In operation, when opto-electrical cable 100a is subjected to compressive forces and/or longitudinal strain, cap wire 104a may be remain mechanically coupled with base wire 104. For example, tab 114 may remain mechanically coupled within channel 106, preventing or reducing the occurrence of milking.

FIGS. 1A-1F depict manufacture of opto-electrical cable 100a in accordance with this disclosure. Base wire 104 having base wire mating face 108a and channel 106 may be provided, as shown in FIG. 1A. One or more optical fibers 110 may be placed within channel 106, as shown in FIG. 1B. Filler 112 may be placed into channel 106, encasing optical fibers 110, as shown in FIG. 1C. Cap wire 104a having tab 114 and cap wire mating face 108b may be provided, as shown in FIG. 1D. Cap wire 104a may be mechanically coupled with base wire 104 by engaging tab 114 into channel 106 and engaging base wire mating face 108a with cap wire mating face 108b, enclosing channel 106 and forming opto-electrical cable core 116a, as shown in FIG. 1E. One or more polymer layers 118 may be wrapped around or extruded over opto-electrical cable core 116a, encasing opto-electrical cable core 116a and forming opto-electrical cable 100a, as shown in FIG. 1F. Polymer layer 118 may longitudinally and circumferentially surround opto-electrical cable core 116a.

FIG. 2 depicts another embodiment of an opto-electrical cable consistent with this disclosure. Opto-electrical cable 100b may include wire 104b. In certain embodiments, wire 104b has a circular-profile. Wire 104b may be composed of the same or different materials as base wire 104. Wire 104b may have one or more channels 106, two or more channels 106, or three or more channels 106 formed within and extending along a longitudinal axis of wire 104b. For example and without limitation, wire 104b is depicted in FIG. 2 as having three channels 106. Channels 106 may be formed within wire 104b between two portions of outer wire circumference 109a of wire 104b. In embodiments of wire 104b having multiple channels 106, channels 106 may be uniformly spaced about outer wire circumference 109a. In other embodiments of wire 104b having multiple channels 106, channels 106 are non-uniformly spaced about outer wire circumference 109a. In some embodiments, channels 106 may extend parallel with a longitudinal axis of wire 104b along the length of wire 104b. In other embodiments, channels 106 may spiral helically about the longitudinal axis of wire 104b. One or more optical fibers 110 may extend longitudinally within each channel 106 of wire 104b. Optical fibers 110 may be composed of the same materials or different materials as discussed with respect to FIG. 1. In certain embodiments, filler 112 may be encase optical fibers 110 within channels 106. Filler 112 may be the same as or different than filler 112 described with respect to FIG. 1. In certain embodiments, filler 112 encases the entirety of wire 104b (not shown). In other embodiments, filler 112 does not encase the entirety of wire 104b. Opto-electrical cable 100b may include one or more polymer layers 118 encasing wire 104b and channels 106. Polymer layer 118 may be the same as or different than polymer layer 118 as described with respect to FIG. 1. Polymer layer 118 may surround channel 106 and/or filler 112 within channel 106. In certain embodiments, opto-electrical cable 100b has a circular-profile.

FIGS. 2A-2D depict manufacture of opto-electrical cable 100b in accordance with this disclosure. Wire 104b having one or more channels 106 may be provided, as shown in FIG. 2A. One or more optical fibers 110 may be placed within each channel 106 of wire 104b, as shown in FIG. 2B. Filler 112 may be placed within each channel 106, encasing optical fibers 110 and forming opto-electrical cable core 116b, as shown in FIG. 2C. One or more polymer layers 118 may be wrapped around or extruded over opto-electrical cable core 116b, forming opto-electrical cable 100b, as shown in FIG. 2D. Polymer layer 118 may longitudinally and circumferentially surround opto-electrical cable core 116b.

FIG. 3 depicts another embodiment of an opto-electrical cable in accordance with this disclosure. Opto-electrical cable 100c may include wire 104c. In certain embodiments, wire 104c has a circular-profile with circular or arcuate outer wire circumference 123. Wire 104c may be composed of the same or different materials as base wire 104. Wire 104c may have a single channel 106. Channel 106 may be formed within wire 104c between two portions of outer wire circumference 123. Channel 106 may extend along a longitudinal axis of wire 104c. In some embodiments, channel 106 may extend parallel with the longitudinal axis of wire 104c along the length of wire 104c. In other embodiments, channel 106 may spiral helically about longitudinal axis of wire 104c. One or more optical fibers 110 may extend longitudinally within channel 106 of wire 104c. Optical fibers 110 may be composed of the same materials or different materials as discussed with respect to FIG. 1. In certain embodiments, filler 112 may encase optical fibers 110 within channel 106. Filler 112 may be the same as or different than filler 112 described with respect to FIG. 1. In certain embodiments, filler 112 encases the entirety of wire 104c (not shown). In other embodiments, filler 112 does not encase the entirety of wire 104c. Opto-electrical cable 100c may include one or more polymer layers 118 encasing wire 104c and channel 106. Polymer layer 118 may be the same as or different than polymer layer 118 as described with respect to FIG. 1. Polymer layer 118 may surround channels 106 and/or filler 112 within channels 106. In certain embodiments, opto-electrical cable 100c has a circular-profile.

FIGS. 3A-3D depict manufacture of opto-electrical cable 100c in accordance with this disclosure. Wire 104c with outer wire circumference 123 and channel 106 may be provided, as shown in FIG. 3A. One or more optical fibers 110 may be placed within channel 106 of wire 104c, as shown in FIG. 3B. Filler 112 may be placed within channel 106, encasing optical fibers 110 and forming opto-electrical cable core 116c, as shown in FIG. 3C. One or more polymer layers 118 may be wrapped around or extruded over opto-electrical cable core 116c, forming opto-electrical cable 100c, as shown in FIG. 3D. Polymer layer 118 may longitudinally and circumferentially surround opto-electrical cable core 116c.

FIG. 4 depicts another embodiment of an opto-electrical cable in accordance with this disclosure. Opto-electrical cable 100d may include wire 104d. In certain embodiments, wire 104d has a hexagonal-profile or an approximately hexagonal-profile. Wire 104d may be composed of the same or different materials as base wire 104. Wire 104d may have base 120 formed along a circumference of wire 104d. In some embodiments, base 120 is a planar surface formed on one side of wire 104d. Base 120 may extend along a longitudinal axis of wire 104d. Wire 104d may have a single channel 106. In some embodiments, wire 104d may have multiple channels (not shown). In certain embodiments, channel 106 of wire 104d may be formed within wire 104d between two portions of outer wire circumference 122 of wire 104d and opposite of base 120. Channel 106 may extend along a longitudinal axis of wire 104d. In some embodiments, channel 106 may extend parallel to the longitudinal axis of wire 104d along the length of wire 104d. In certain embodiments, channel 106 of wire 104d has a circular-profile or semi-circular-profile. In certain embodiments, opto-electrical cable 100d has a circular-profile. In certain embodiments, sides of outer wire circumference 122 have a non-circular profile, such that sides of wire 104d are at least partially flattened. One or more optical fibers 110 may extend longitudinally within channel 106 of wire 104d. Optical fibers 110 may be composed of the same materials or different materials as discussed with respect to FIG. 1. In certain embodiments, filler 112 may encase optical fibers 110 within channel 106. Filler 112 may be the same as or different than filler 112 described with respect to FIG. 1. In certain embodiments, filler 112 encases the entirety of wire 104d (not shown). In other embodiments, filler 112 does not encase the entirety of wire 104d. Opto-electrical cable 100d may include one or more polymer layers 118 encasing wire 104d and channel 106. Polymer layer 118 may be the same as or different than polymer layer 118 as described with respect to FIG. 1. Polymer layer 118 may surround channel 106 and/or filler 112 within channel 106.

FIGS. 4A-4D depict manufacture of opto-electrical cable 100d in accordance with this disclosure. Wire 104d having base 120, channel 106, and outer wire circumference 122 may be provided, as shown in FIG. 4A. Wire 104d may be held securely in place in a desired position and location and prevented from moving from the desired position and location. For example and without limitation, base 120 may be engaged on a surface (not shown) and sides of outer wire circumference 122 of wire 104d may be held to secure wire 104d in the desired position and location. With wire 104d secured in the desired position and location, one or more optical fibers 110 may be placed within channel 106 of wire 104d, as shown in FIG. 4B. Filler 112 may be placed within channel 106, encasing optical fibers 110 and forming opto-electrical cable core 116d, as shown in FIG. 4C. One or more polymer layers 118 may be wrapped around or extruded over opto-electrical cable core 116d, forming opto-electrical cable 100d, as shown in FIG. 4D. Polymer layer 118 may longitudinally and circumferentially surround opto-electrical cable core 116d.

FIG. 5 depicts another embodiment of an opto-electrical cable in accordance with this disclosure. Opto-electrical cable 100e may include wire 104e. In certain embodiments, wire 104e has a C-shaped-profile. Wire 104e may be formed of the same or different materials as base wire 104. Wire 104e may have a single channel 106. Channel 106 may be formed within and extend along a longitudinal axis of wire 104e. In some embodiments, channel 106 may extend parallel with the longitudinal axis of wire 104e along the length of wire 104e. In certain embodiments, channel 106 is formed within a central interior of wire 104e, and channel 106 may concentrically aligned with the longitudinal axis of wire 104e. Channel 106 may have opening 126 formed between two portions of outer wire circumference 127. One or more optical fibers 110 may extend longitudinally within channel 106 of wire 104e. Optical fibers 110 may be composed of the same materials or different materials as discussed with respect to FIG. 1. Filler 112 may encase optical fibers 110 within channel 106. Filler 112 may be the same as or different than filler 112 described with respect to FIG. 1. Plug 124 may be mechanically coupled with and/or chemically bonded to wire 104e at opening 126 of channel 106. In certain embodiments, plug 124 may be a hard polymer plug. For example and without limitation, plug 124 may be composed of a polymer or gel having a higher viscosity than filler 112. Plug 124 may enclose and/or seal filler 112 and/or optical fibers 110 within channel 106. In some embodiments, a layer of material forming plug 124 is located circumferentially about wire 104e (not shown). Opto-electrical cable 100e may include one or more polymer layers 118 encasing wire 104e and plug 124. Polymer layer 118 may be the same as or different than polymer layer 118 as described with respect to FIG. 1. Polymer layer 118 may surround opening 126 of channel 106 and/or filler 112 within channel 106. In certain embodiments, opto-electrical cable 100e has a circular-profile.

FIG. 5A-5E depict manufacture of opto-electrical cable 100e in accordance with this disclosure. Wire 104e having channel 106 may be provided, as shown in FIG. 5A. One or more optical fibers 110 may be placed within channel 106 of wire 104e, as shown in FIG. 5B. Filler 112 may be placed within channel 106, encasing optical fibers 110, as shown in FIG. 5C. Plug 124 may be mechanically coupled with and/or chemically bonded to wire 104e at opening 126 of channel 106, forming opto-electrical cable core 116e, as shown in FIG. 5D. For example and without limitation, plug 124 may be mechanically coupled with and/or chemically bonded to wire 104e prior to filler 112 (e.g., silicon polymer gel) curing within channel 106. In operation, when plug 124 is mechanically coupled with and/or chemically bonded to wire 104e, plug 124 may restrict movement of optical fibers 110 during and/or after curing of filler 112 within channel 106, preventing or reducing the occurrence of milking. In certain embodiments, a quantity of material forming plug 124 is applied in a layer circumferentially about wire 104e (not shown). One or more polymer layers 118 may be wrapped around or extruded over opto-electrical cable core 116e, forming opto-electrical cable 100e, as shown in FIG. 5E. Polymer layer 118 may longitudinally and circumferentially surround opto-electrical cable core 116e.

In certain embodiments, the opto-electrical cable core includes a single wire, as is depicted in FIGS. 2-5E. In other embodiments, the opto-electrical cable core includes at least two wires, as is depicted in FIGS. 1-1F. In operation, optical fibers 110 may be used to transmit data, and wires (e.g., 104, 104a-104e) may be used to transmit electrical power and/or data. For example and without limitation, wires (e.g., 104, 104a-104e) may provide electrical power downhole to a toolstring, and coiled tubing or casing may be used to complete the circuit. Optical fibers 110 may be used for telemetry and/or as sensors to measure distributed temperature, pressure, and longitudinal stain, for example.

In some embodiments, polymer layer 118 may provide insulation to optical fibers 110 and wires (e.g., 104, 104a-104e). In certain embodiments, micro-bundles of optical fibers 110 may be contained within channels 106 of wires (e.g., 104, 104a-104e), increasing the number of optical fibers 110 within channels 106 of wires (e.g., 104, 104a-

104e). Bundled optical fibers 110 may include single mode and/or multi-mode optical fibers. In some embodiments, optical fibers 110 are cabled in a helix, which may increase the longitudinal strain optical fibers 110 can sustain. In some embodiments, optical fibers 110 are uncoated optical fibers. In other embodiments, optical fibers 110 are coated optical fibers.

Figure 6B:
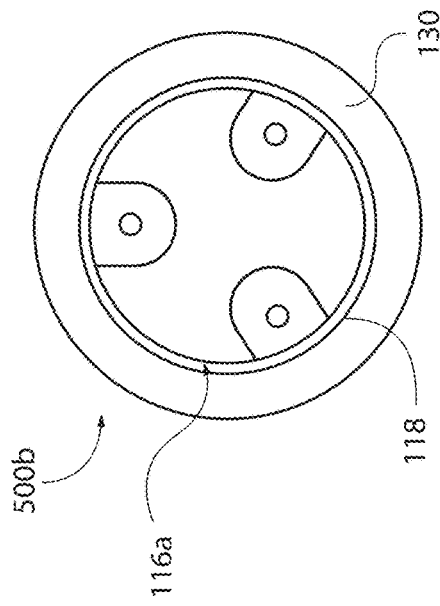
FIGS. 6A-6D depict cross-sectional views of opto-electrical cables having completion layers in accordance with certain embodiments of the present disclosure.
Figure 6D:
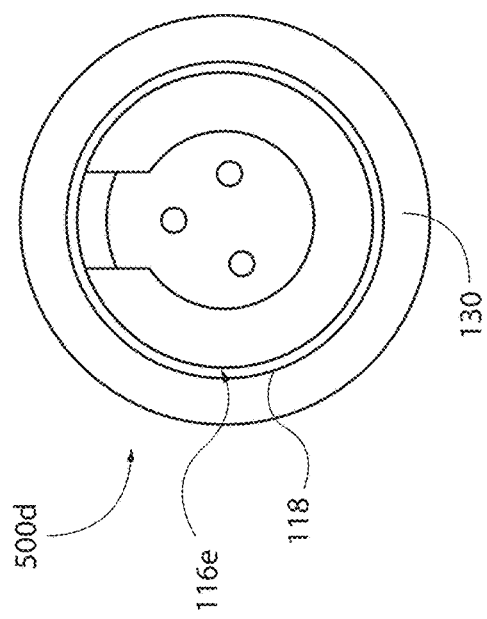
Figure 6A:
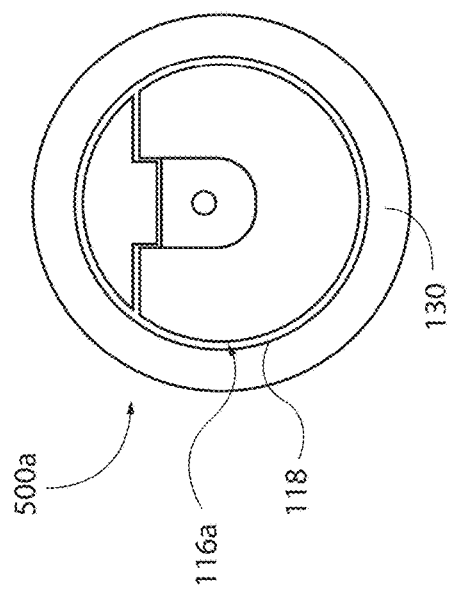
Figure 6C:
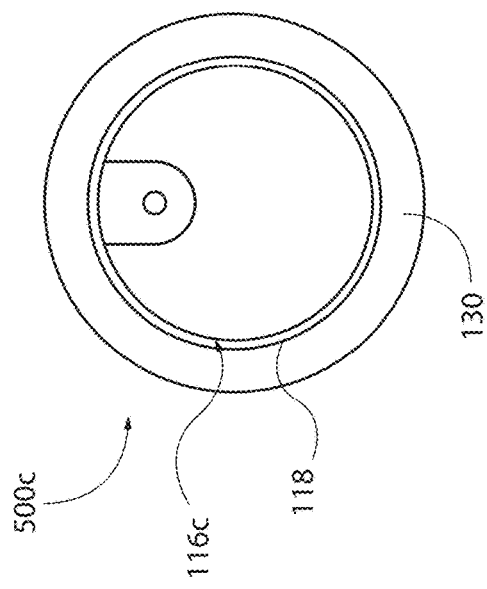

Each of opto-electrical cables 100a-100e may include one or more completion layers, forming a completed opto-electrical cable. FIGS. 6A, 6B, 6C and 6D depict embodiments of completed opto-electrical cables in accordance with this disclosure. As shown in FIG. 6A, completed opto-electrical cables 500a may include opto-electrical cable core 116a longitudinally and circumferentially surrounded by one or more polymer layers 118. As shown in FIG. 6B, completed opto-electrical cables 500b may include opto-electrical cable core 116b longitudinally and circumferentially surrounded by one or more polymer layers 118. As shown in FIG. 6C, completed opto-electrical cables 500c may include opto-electrical cable core 116c longitudinally and circumferentially surrounded by one or more polymer layers 118. As shown in FIG. 6D, completed opto-electrical cables 500d may include opto-electrical cable core 116e longitudinally and circumferentially surrounded by one or more polymer layers 118. Completed opto-electrical cables 500a-500d may each include layer of cladding 130 longitudinally and circumferentially surrounding polymer layers 118, as shown in FIGS. 6A-6D, respectively. For example and without limitation, cladding 130 may be composed of a metal, such as Zn, Ni, Mo or Fe. While completed opto-electrical cables 500a-500d are shown as having opto-electrical cables 100a, 100b, 100c and 100e, one skilled in the art with the aid of the present disclosure would understand that cladding 130 may also be applied to opto-electrical cables 100d to form a completed opto-electrical cable.

Figure 7A:
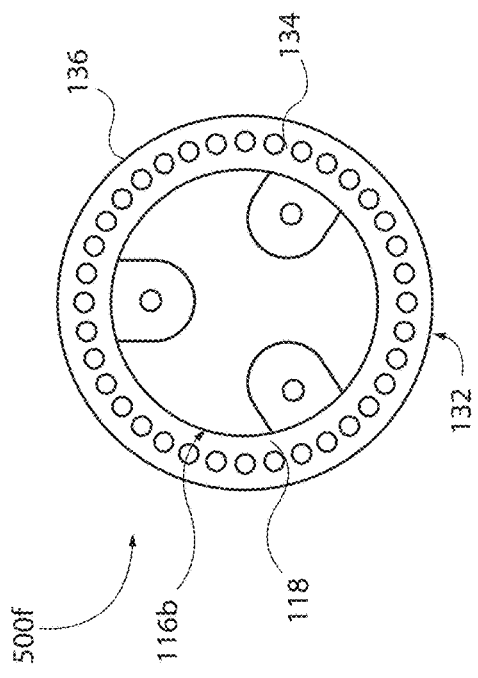
FIGS. 7A-7D depict cross-sectional views of additional embodiments of opto-electrical cables having completion layers in accordance with certain embodiments of the present disclosure.
Figure 7B:
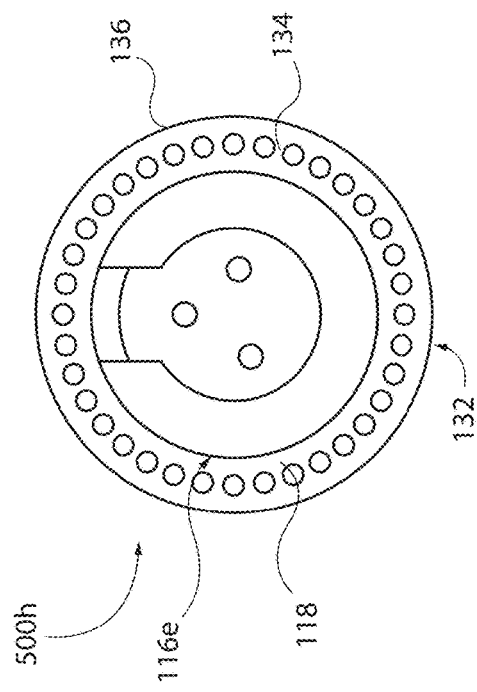
Figure 7C:
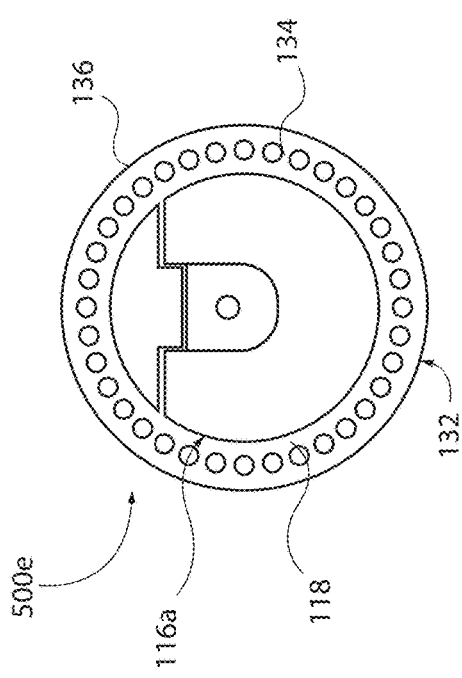
Figure 7D:
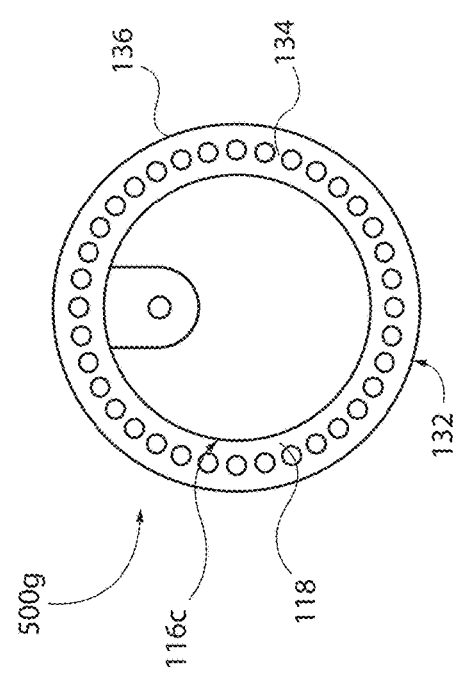

FIGS. 7A, 7B, 7C and 7D depict additional embodiments of completed opto-electrical cables in accordance with this disclosure. Completed opto-electrical cable 500e may include opto-electrical cable core 116a longitudinally and circumferentially surrounded by one or more polymer layers 118, as shown in FIG. 7A. Completed opto-electrical cable 500f may include opto-electrical cable core 116b longitudinally and circumferentially surrounded by one or more polymer layers 118, as shown in FIG. 7B. Completed opto-electrical cable 500g may include opto-electrical cable core 116c longitudinally and circumferentially surrounded by one or more polymer layers 118, as shown in FIG. 7C. Completed opto-electrical cable 500h may include opto-electrical cable core 116e longitudinally and circumferentially surrounded by one or more polymer layers 118, as shown in FIG. 7D. With references to FIGS. 7A-7D, each of completed opto-electrical cables 500e-500h may include jacket layer 132 longitudinally and circumferentially surrounding polymer layers 118. Each jacket layer 132 may include wires 134 encased within polymer 136. Wires 134 may be small served wires (e.g., helically cabled wires). Polymer 136 may be composed of the same composition as polymer layers 118, or may be composed of a different composition. For example and without limitation, jacket layer 132 may be at least partially composed of TEFZEL® or carbon-fiber-reinforced TEFZEL®. While completed opto-electrical cables 500e-500h are shown as having opto-electrical cables 100a, 100b, 100c and 100e, one skilled in the art with the aid of the present disclosure would understand that jacket layer 132 may also be applied to opto-electrical cables 100d to form a completed opto-electrical cable.

FIGS. 8A, 8B, 8C and 8D depict additional embodiments of completed opto-electrical cables in accordance with this disclosure. Completed opto-electrical cable 500i may include opto-electrical cable core 116a longitudinally and circumferentially surrounded by one or more polymer layers 118, as shown in FIG. 8A. Completed opto-electrical cable 500j may include opto-electrical cable core 116b longitudinally and circumferentially surrounded by one or more polymer layers 118, as shown in FIG. 8B. Completed opto-electrical cable 500k may include opto-electrical cable core 116c longitudinally and circumferentially surrounded by one or more polymer layers 118, as shown in FIG. 8C. Completed opto-electrical cable 500l may include opto-electrical cable core 116e longitudinally and circumferentially surrounded by one or more polymer layers 118, as shown in FIG. 8D. With reference to FIGS. 8A-8D, each completed opto-electrical cable 500i-500l may include two arcuate metal wires 138a and 138b, forming a tube longitudinally and circumferentially surrounding polymer layers 118. Arcuate metal wires 138a and 138b may be composed of the same or different conductive metal as base wire 104. Each completed opto-electrical cable 500i-500l may include second polymer layer 118a longitudinally and circumferentially surrounding and encasing arcuate metal wires 138a and 138b. Second polymer layer 118a may be composed of the same or different composition as polymer layers 118. In operation, wire (e.g., 104, 104a-104e) may prevent the tube formed by arcuate metal wires 138a and 138b from flattening under compressive forces. Seam 140 between arcuate metal wires 138a and 138b may be aligned with a solid portion of wire (e.g., 104, 104a-104e). For example and without limitation, seam 140 may be aligned with a portion of wire (e.g., 104, 104a-104e) that does not have a channel located on a circumference of wire (e.g., 104, 104a-104e), or seam 140 may be aligned with a portion of wire (e.g., 104, 104a-104e) that does not have a wire seam, such as wire seam 141 between base wire 104 and cap wire 104a. Without being bound by theory, with seam 140 aligned with a solid portion of wire (e.g., 104, 104a-104e), shifting of wire (e.g., 104, 104a-104e) may be prevented or reduced, preventing or reducing the occurrence of milking. In operation, arcuate metal wires 138a and 138b may transmit data, electricity, or combinations thereof. While completed opto-electrical cables 500i-500l are shown as having opto-electrical cables 100a, 100b, 100c and 100e, one skilled in the art with the aid of the present disclosure would understand that arcuate metal wires 138 and second polymer layer 118a may also be applied to opto-electrical cables 100d to form a completed opto-electrical cable.

Figure 9B:
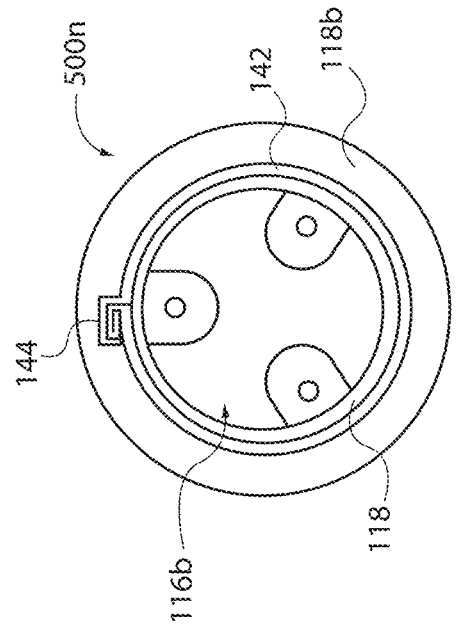
FIGS. 9A-9D depict cross-sectional views of additional embodiments of opto-electrical cables having completion layers in accordance with certain embodiments of the present disclosure.
Figure 9D:
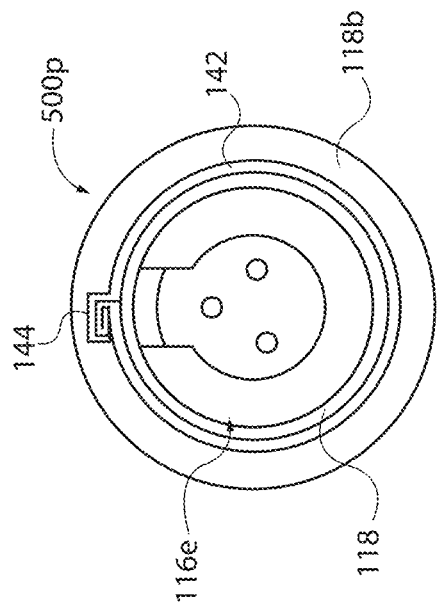
Figure 9A:
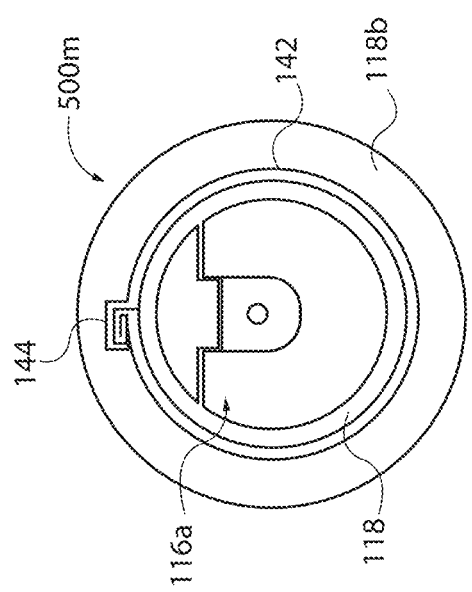
Figure 9C:
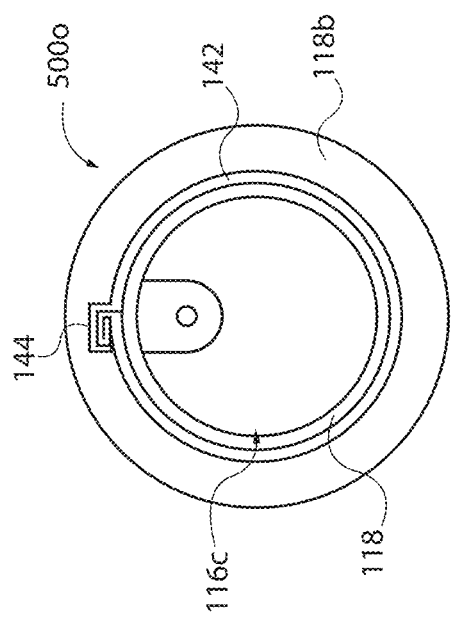

FIGS. 9A, 9B, 9C and 9D depict additional embodiments of completed opto-electrical cables in accordance with this disclosure. Completed opto-electrical cable 500m may include opto-electrical cable core 116a longitudinally and circumferentially surrounded by one or more polymer layers 118, as shown in FIG. 9A. Completed opto-electrical cable 500n may include opto-electrical cable core 116b longitudinally and circumferentially surrounded by one or more polymer layers 118, as shown in FIG. 9B. Completed opto-electrical cable 500o may include opto-electrical cable core 116c longitudinally and circumferentially surrounded by one or more polymer layers 118, as shown in FIG. 9C. Completed opto-electrical cable 500p may include opto-electrical cable core 116e longitudinally and circumferentially surrounded by one or more polymer layers 118, as shown in FIG. 9D. With references to FIGS. 9A-9D, each completed opto-electrical cable 500m-500p may include metallic tape 142 longitudinally and circumferentially surrounding polymer layers 118. Metallic tape 142 may have longitudinally crimped seam 144, where two ends of metallic tape 142 are crimped together after wrapping metallic tape 142 about polymer layers 118. Each completed opto-electrical cables 500m-500p may include additional layer of polymer 118b longitudinally and circumferentially surrounding metallic tape 142. Additional layer of polymer 118b may be composed of the same or different composition as polymer layers 118. While completed opto-electrical cables 500m-500p are shown as having opto-electrical cables 100a, 100b, 100c and 100e, one skilled in the art with the aid of the present disclosure would understand that metallic tape 142 and additional layer of polymer 118b may also be applied to opto-electrical cables 100d to form a completed opto-electrical cable.

FIGS. 10A-10D depict additional embodiments of completed opto-electrical cables in accordance with this disclosure. Completed opto-electrical cable 500q may include opto-electrical cable 100a, as shown in FIG. 10A. Completed opto-electrical cable 500r may include opto-electrical cable 100b, as shown in FIG. 10B. Completed opto-electrical cable 500s may include opto-electrical cable 100c, as shown in FIG. 10C. Completed opto-electrical cable 500t may include opto-electrical cable 100e, as shown in FIG. 10D. With reference to FIGS. 10A-10D, each of completed opto-electrical cables 500q-500t may include soft polymer layer 200 longitudinally and circumferentially surrounding opto-electrical cable 100a, 100b, 100c and 100e, respectively. For example and without limitation, soft polymer layer 200 may be a silicone polymer layer. Each of completed opto-electrical cables 500q-500t may include a plurality of arch-profile wires 210 longitudinally and circumferentially (e.g., helically) surrounding soft polymer layer 200. Arch-profile wires 210 may provide a solid surface over seams and/or channels 106 of opto-electrical cable 100a, 100b, 100c and 100e, respectively. For example and without limitation, arch-profile wires 210 may be composed of copper, copper-coated steel, or nickel coated copper. In certain embodiments, a portion of soft polymer layer 200a fills interstitial spaces between arch-profile wires 210. In some embodiments, a powder (not shown) may be located on soft polymer layer 200. Each of completed opto-electrical cables 500q-500t may include layer of stranded wires 220 encased within one or more additional layers of polymer 230 and surrounding arch-profile wires 210. Each of completed opto-electrical cables 500q-500t may have a coaxial cable configuration. Additional layers of polymer 230 may be composed of a material that is the same as or different than polymer layer 118. In operation, arch-profile wires 210 may transmit data, electricity, or combinations thereof.

Figure 11D:
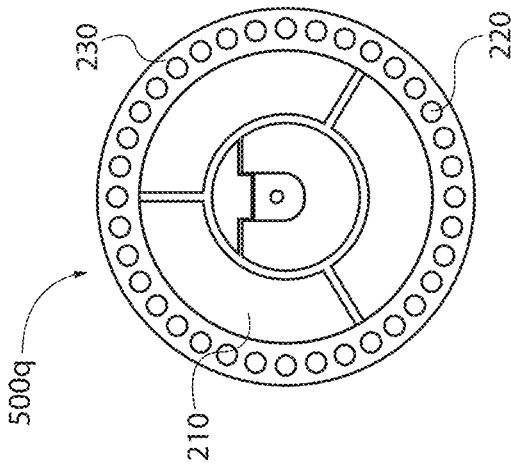
FIGS. 11A-11D depict cross-sectional views showing manufacture of an opto-electrical cable having a completion layer in accordance with certain embodiments of the present disclosure.
Figure 11C:
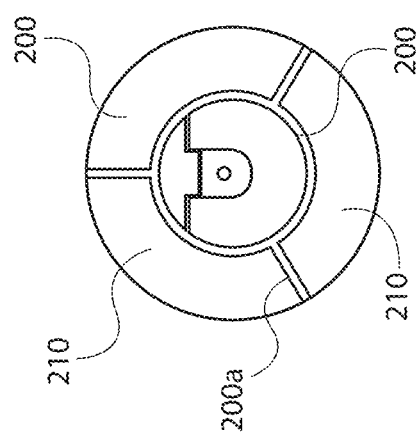
Figure 11B:
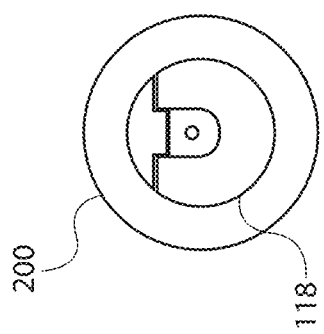
Figure 11A:
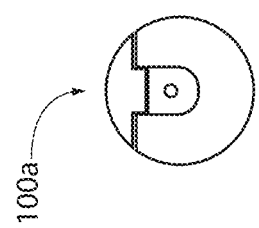

FIGS. 11A-11D depict manufacture of completed opto-electrical cable 500q in accordance with this disclosure. While manufacture of completed opto-electrical cable 500q is described with respect to opto-electrical cable 100a, one skilled in the art with the aid of the present disclosure would understand that the same manufacturing method of completed opto-electrical cable 500q may be performed with respect to opto-electrical cables 100b, 100c, 100d and 100e. Opto-electrical cable 100a may be provided, as shown in FIG. 11A. Soft polymer layer 200 may be extruded over opto-electrical cable 100a to longitudinally and circumferentially surround and encase polymer layers 118 of opto-electrical cable 100a, as shown in FIG. 11B. A plurality of arch-profile wires 210 may be applied to longitudinally and circumferentially surround soft polymer layer 200, as shown in FIG. 11C. In certain embodiments, when applying arch-profile wires 210 onto soft polymer layer 200, arch-profile wires 210 may compress over soft polymer layer 200, causing a portion of soft polymer layer 200a to fill the interstitial spaces between arch-profile wires 210. In some embodiments, a powder (not shown) may be applied on soft polymer layer 200. Without being bound by theory, it is believed that powder on soft polymer layer 200 may reduce or prevent metal of arch-profile wires 210 from sticking onto soft polymer layer 200. Layer of stranded wires 220 encased within one or more additional layers of polymer 230 may be applied to encase arch-profile wires 210, forming completed opto-electrical cable 500q.

Figure 12:
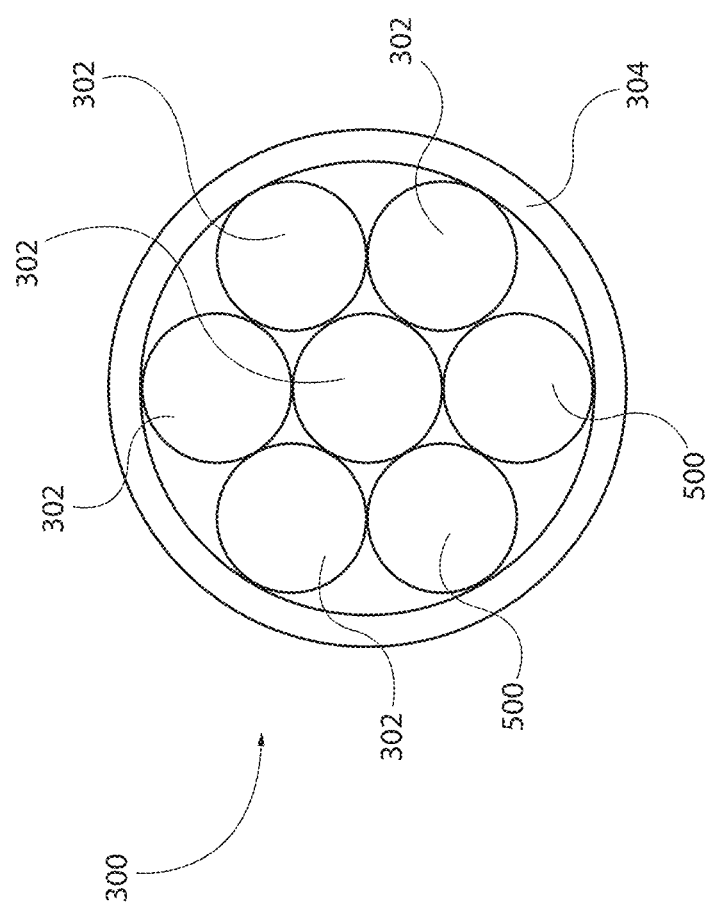
FIG. 12 depicts a cross-sectional view of a multi-component cable in accordance with certain embodiments of the present disclosure.

Embodiments of the present disclosure may include a multi-component cable. FIG. 12 depicts an embodiment of a multi-component cable in accordance with this disclosure. Multi-component cable 300 may include one or more completed opto-electrical cables 500 (e.g., 500a-500t) and one or more electrical conductor cables 302. Electrical conductor cables 302 may include one or more metallic conductor wires (not shown), which may be circumferentially and longitudinally surrounded by one or more insulation layers (not shown), such as one or more polymer layers. The metallic conductor wires of electrical conductor cables 302 may be composed of copper, copper-coated steel, or nickel coated copper, for example. In operation, electrical conductor cables 302 may provide electrical power to downhole tools within a wellbore. One or more layers of deformable polymer 304 may longitudinally and circumferentially surround completed opto-electrical cables 500 and electrical conductor cables 302. For example and without limitation, deformable polymer 304 may be extruded over completed opto-electrical cables 500 and electrical conductor cables 302, encasing completed opto-electrical cables 500 and electrical conductor cables 302. In certain embodiments, completed opto-electrical cables 500 and electrical conductor cables 302 are arranged within deformable polymer 304 in a coax configuration, a triad configuration, a quad configuration, or a hepta configuration. FIG. 12 depicts completed opto-electrical cables 500 and electrical conductor cables 302 arranged in a hepta configuration.

Figure 13A:
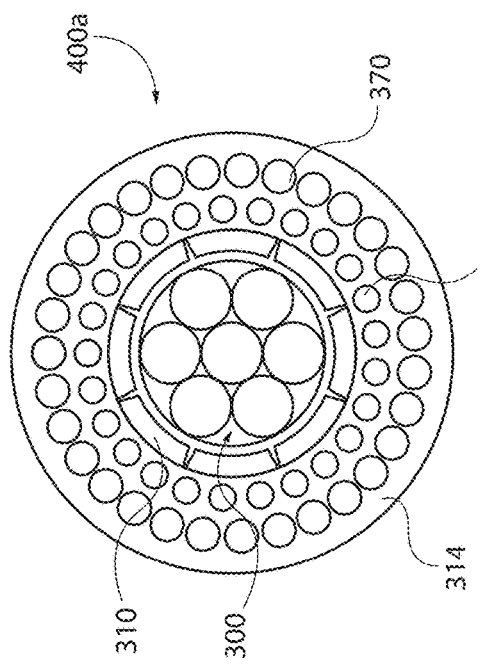
FIGS. 13A-13C depict cross-sectional views of jacketed multi-component cables having arch-profile wires in accordance with certain embodiments of the present disclosure.
Figure 13C:
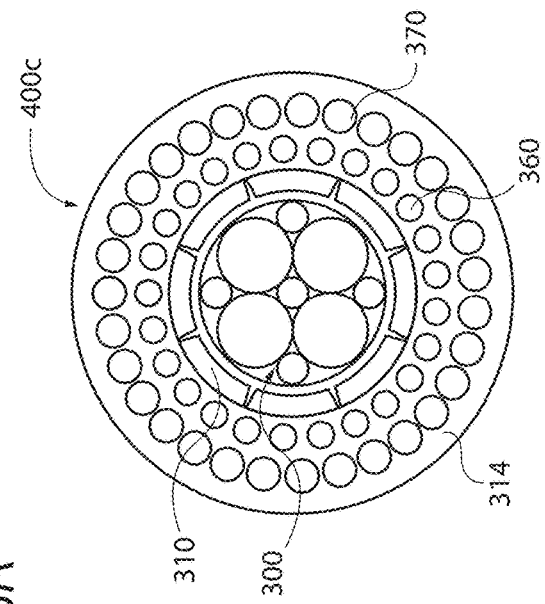
Figure 13B:
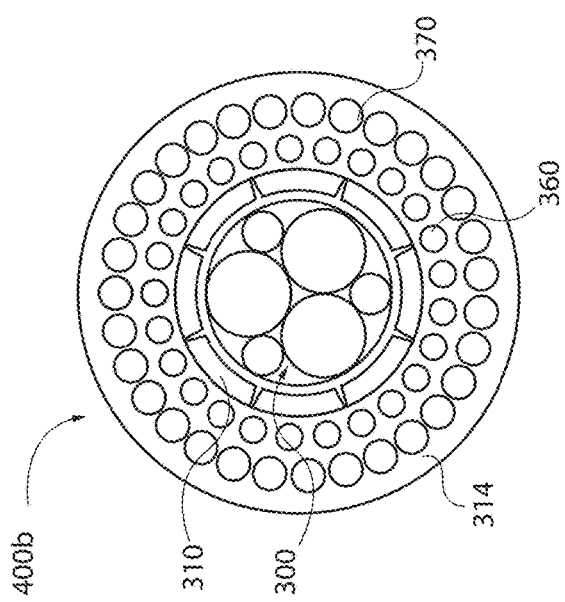

In certain embodiments multi-component cable 300 is a jacketed. FIGS. 13A-13C depict embodiments of a jacketed multi-component cable in accordance with this disclosure. FIG. 13A depicts jacketed multi-component cable 400a having a hepta configuration. FIG. 13B depicts jacketed multi-component cable 400b having a triad configuration. FIG. 13C depicts jacketed multi-component cable 400c having a quad configuration. Referring to FIGS. 13A-13C, each of jacketed multi-component cables 400a-400c may include a plurality of arch-profile wires 310 longitudinally and circumferentially surrounding multi-component cable 300. That is, the arch-profile wires 310 may be cabled helically about the multi-component cable 300. It should be understood that, in some embodiments, the arch-profile wires 310 may be cabled (e.g., helically cabled) directly about any of the opto-electrical cables discussed herein (e.g., about the opto-electrical cables 100a, 100b, 100c, 100d, and/or 100e). Each of jacketed multi-component cables 400a-400c may include one or more layers of reinforced polymer 314 longitudinally and circumferentially surrounding arch-profile wires 310. Reinforced polymer 314 may be composed of a carbon-fiber reinforced polymer. Reinforced polymer 314 may encase arch-profile wires 310 and retain arch-profile wires 310 in place about multi-component cable 300, such as during manufacturing and/or deployment (e.g., in a wellbore). In operation, under compressive forces during deployment of multi-component cable 300, arch-profile wires 310 may form a continuous arch circumferentially about multi-component cable 300, dispersing the compressive forces about the circumference of multi-component cable 300, preventing or reducing the occurrence of milking. Arch-profile wires 310 may be composed of copper, copper-coated steel, or nickel coated copper, for example and without limitation. Each of jacketed multi-component cables 400a-400c may include one or more layers of armor wires. For example each of jacketed multi-component cables 400a-400c may include inner layer of armor wires 360 and outer layer of armor wires 370. In certain embodiments, inner layer of armor wires 360 may be cabled helically over multi-component cable 300. In some embodiments, outer layer of armor wires 370 may be cabled counter-helically to inner layer of armor wires 360. In some embodiments, the armor wires of inner layer of armor wires 360 and outer layer of armor wires 370 may be composed of galvanized improved plow steel (GIPS) or alloy wires for improved corrosion resistance, such as a nickel-cobalt-chromium-molybdenum alloy (e.g., MP35N®), a molybdenum containing stainless steel alloy (e.g., INCOLOY® 27-7MO), or a nickel containing steel alloy (e.g., HC265).

Figure 14H:
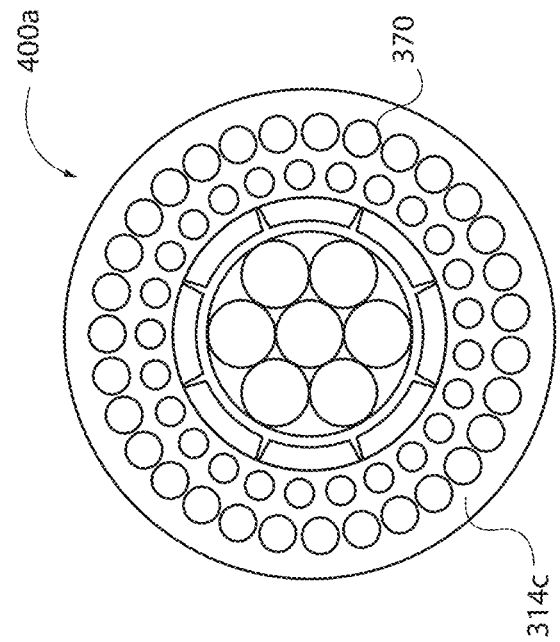
Figure 14G:
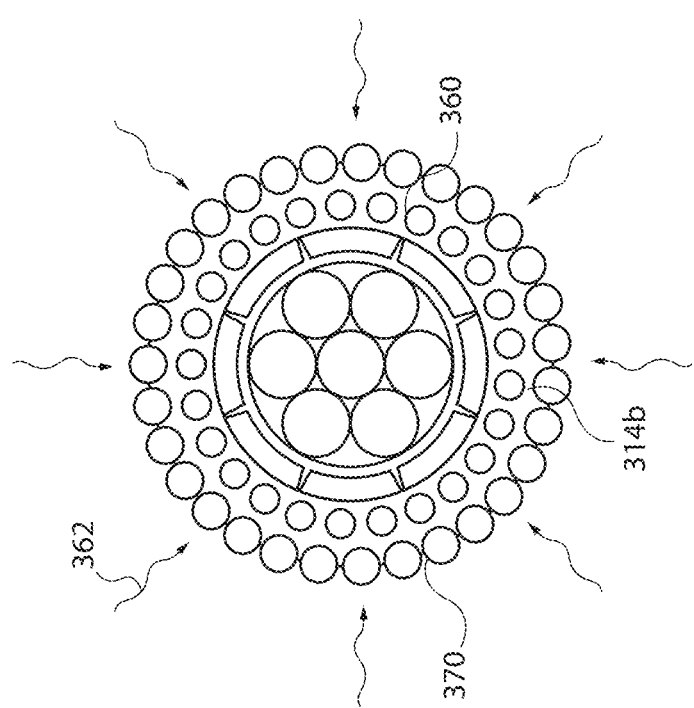

FIGS. 14A-14H depict manufacture of jacketed multi-component 400a in accordance with this disclosure. Multi-component cable 300 is provided, as shown in FIG. 14A, and arch-profile wires 310 are provided, as shown in FIG. 14B. Arch-profile wires 310 are at least partially embedded into deformable polymer 304, as shown in FIG. 14C. In some embodiments, a portion of deformable polymer 304a fills interstitial spaces between arch-profile wires 310. After being applied over deformable polymer 304, edges 312 of arch-profile wires 310 are in contact with one another, forming a compression-resistant barrier over multi-component cable 300. First layer of reinforced polymer 304a may longitudinally and circumferentially surround arch-profile wires 310, as shown in FIG. 14D. For example and without limitation, first layer of reinforced polymer 304a may be extruded over arch-profile wires 310, encasing arch-profile wires 310. Inner layer of armor wires 360 may longitudinally and circumferentially surround reinforced polymer 304a, as shown in FIG. 14E. In certain embodiments, inner layer of armor wires 360 may be at least partially embedded into reinforced polymer 304a. For example and without limitation, inner layer of armor wires 360 may be applied to reinforced polymer 304a while reinforced polymer 304a is in a pliable state, such as after extrusion of reinforced polymer 304a or after passing multi-component cable 300 with reinforced polymer 304a through an infrared 362 heating source. Second layer of reinforced polymer 314b may surround inner layer of armor wires 360, as shown in FIG. 14F. For example and without limitation, second layer of reinforced polymer 314b may be extruded over inner layer of armor wires 360, encasing inner layer of armor wires 360. Reinforced polymer 314b may bond with reinforced polymer 304a through the interstitial spaces between the wires of inner layer of armor wires 360. Reinforced polymer 314b may longitudinally and circumferentially surround inner layer of armor wires 360. Outer layer of armor wires 370 may be partially embedded into reinforced polymer 314b, as shown in FIG. 14G. Outer layer of armor wires 370 may longitudinally and circumferentially surround reinforced polymer 314b. For example and without limitation, while reinforced polymer 314b is in a pliable state, outer layer of armor wires 370 may be partially embedded into reinforced polymer 314b. Reinforced polymer 314b may be in a pliable state after extrusion of second layer of reinforced polymer 314b or after passing multi-component cable 300 with reinforced polymer 314b through infrared 362 heating source, for example. Third layer of reinforced polymer 314c may longitudinally and circumferentially surround outer layer of armor wires 370, as shown in FIG. 14H. Reinforced polymer 314c may bond with reinforced polymer 314b through interstitial spaces between the armor wires of outer layer of armor wires 370, encasing outer layer of armor wires 370.

Figure 15A:
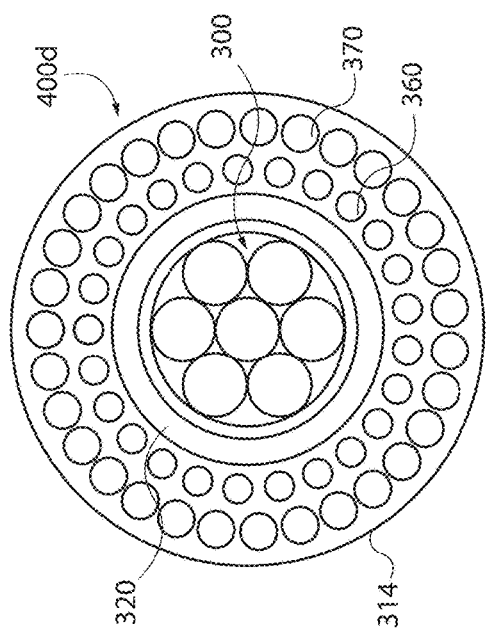
FIGS. 15A-15C depict cross-sectional views of jacketed multi-component cables having a layer of corrugated metallic tape in accordance with certain embodiments of the present disclosure.
Figure 15C:
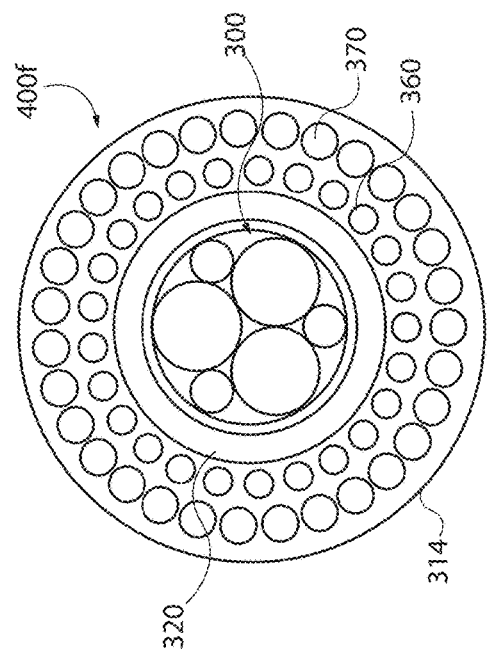
Figure 15B:
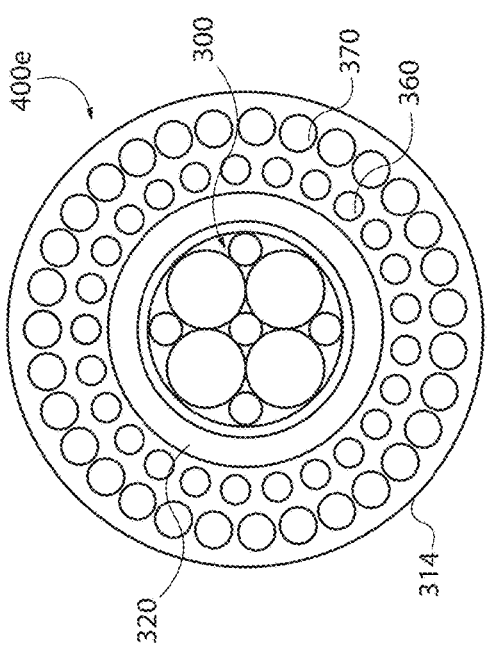

FIGS. 15A-15C depict additional embodiments of jacketed multi-component cables in accordance with this disclosure. FIG. 15A depicts jacketed multi-component cable 400d having a hepta configuration. FIG. 15B depicts jacketed multi-component cable 400e having a quad configuration. FIG. 15C depicts jacketed multi-component cable 400f having a triad configuration. With reference to FIGS. 15A-15C, each of jacketed multi-component cables 400d-400f include one or more layers of corrugated metallic tape 320 longitudinally and circumferentially surrounding multi-component cable 300. Corrugated metallic tape 320 may be compression resistant, and may be adapted to bend over radii, such as spools and sheaves. Each of jacketed multi-component cables 400d-400f may include one or more layers of reinforced polymer 314 longitudinally and circumferentially surrounding layer of corrugated metallic tape 320. Reinforced polymer 314 may encase layer of corrugated metallic tape 320 and retain layer of corrugated metallic tape 320 in place about multi-component cable 300, such as during manufacturing and/or deployment (e.g., in a wellbore). In operation, deformable polymer 304 (not shown) may cushion multi-component cable 300 against compressive forces, and reinforced polymer 314 may cushion multi-component cable 300 against compressive forces and form a circular-profile. In certain embodiments, layer of corrugated metallic tape 320 protects multi-component cable 300 against compressive forces and enhances flexibility of multi-component cable 300, preventing or reducing the occurrence of milking. Each of jacketed multi-component cables 400d-400f may include one or more layers of armor wires. For example, each of jacketed multi-component cables 400d-400f may include inner layer of armor wires 360 and outer layer of armor wires 370. In certain embodiments, inner layer of armor wires 360 may be cabled helically over multi-component cable 300. In some embodiments, outer layer of armor wires 370 may be cabled counter-helically to inner layer of armor wires 360.

Figure 16A:
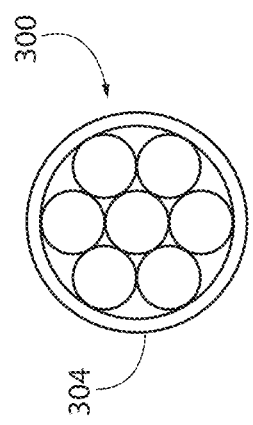
FIGS. 16A-16I depict cross-sectional views showing manufacture of jacketed multi-component cables having a layer of corrugated metallic tape in accordance with certain embodiments of the present disclosure.
Figure 16B:
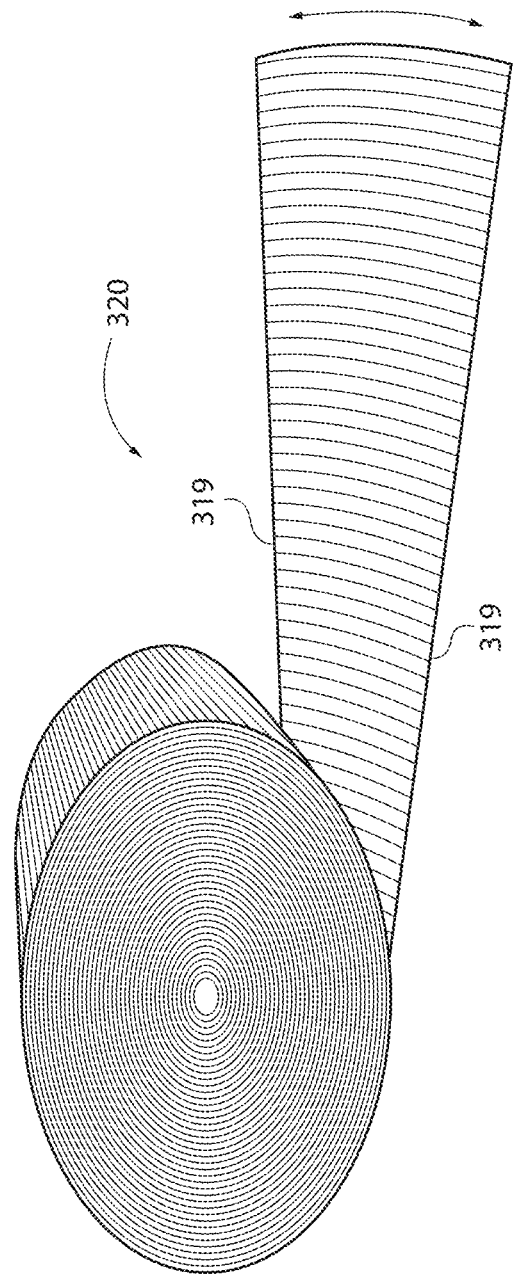
Figure 16D:
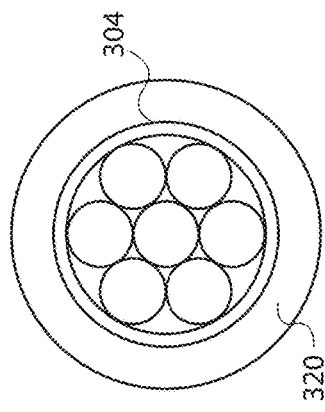
Figure 16C:
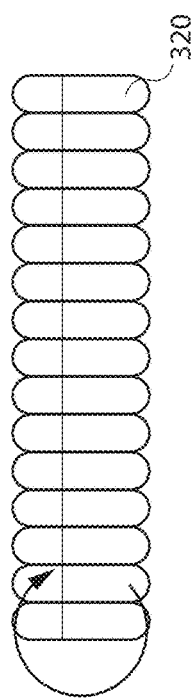
Figure 16G:
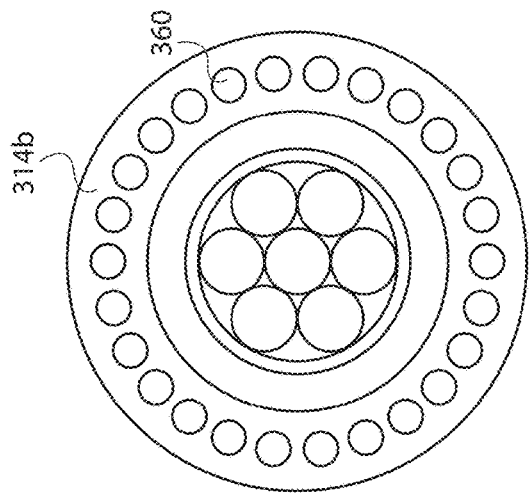
Figure 16F:
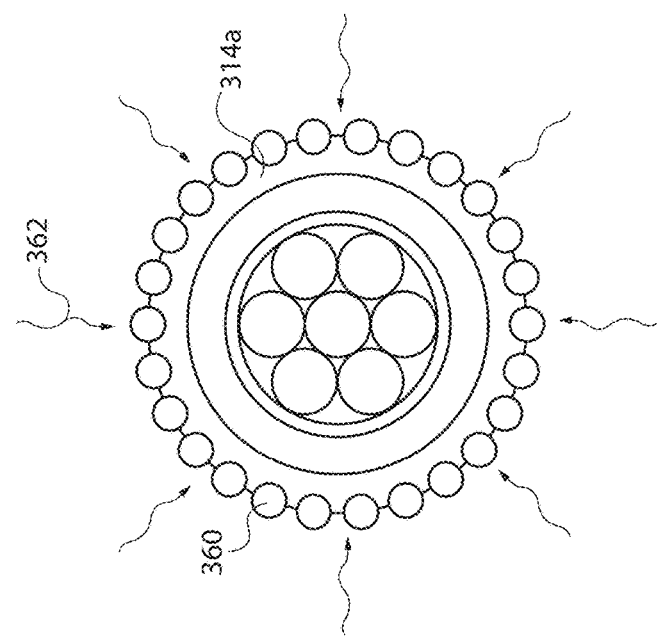
Figure 16E:
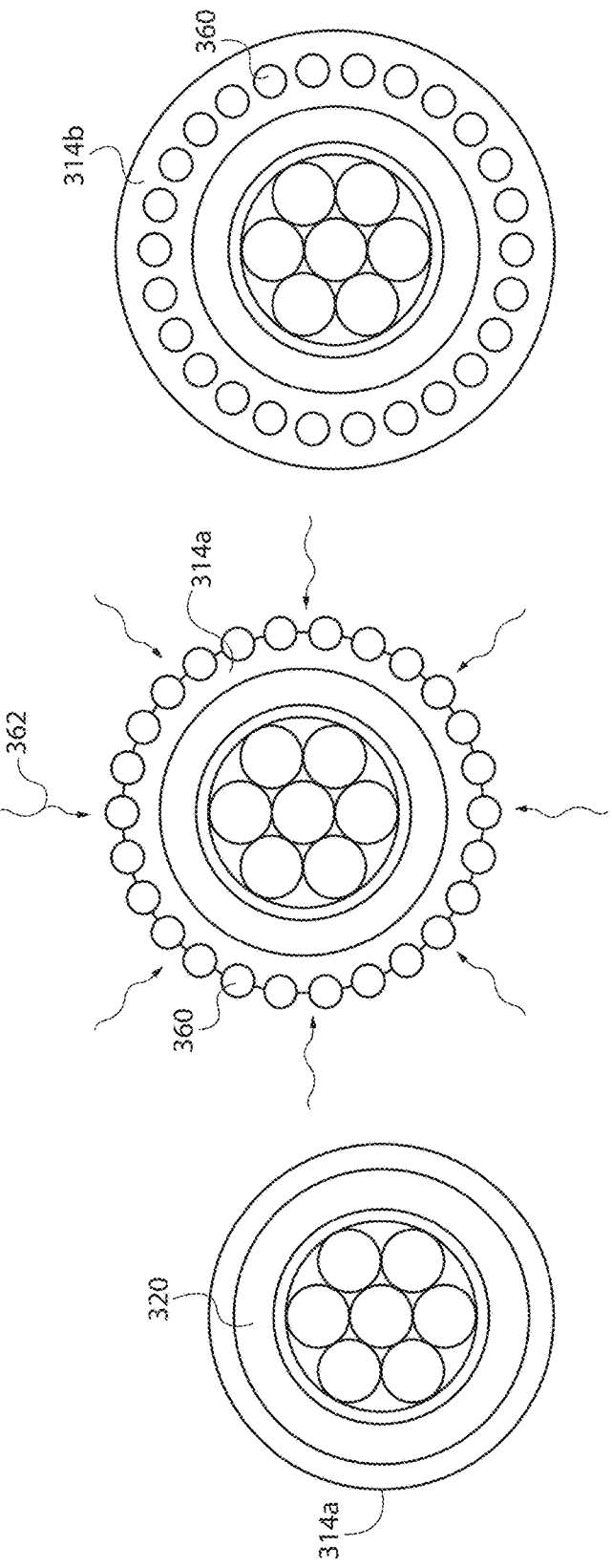
Figure 16I:
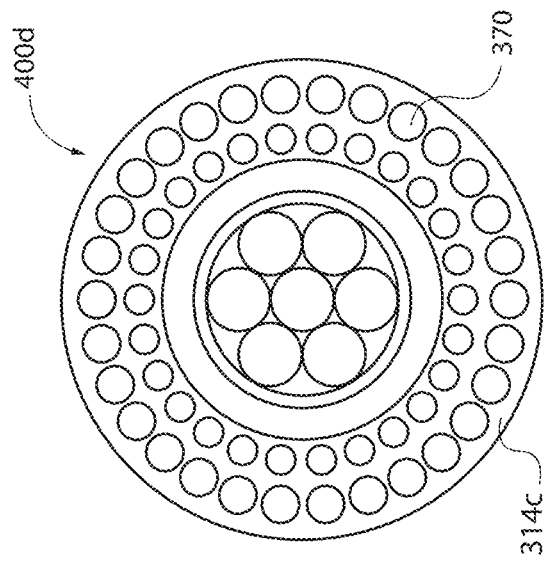
Figure 16H:
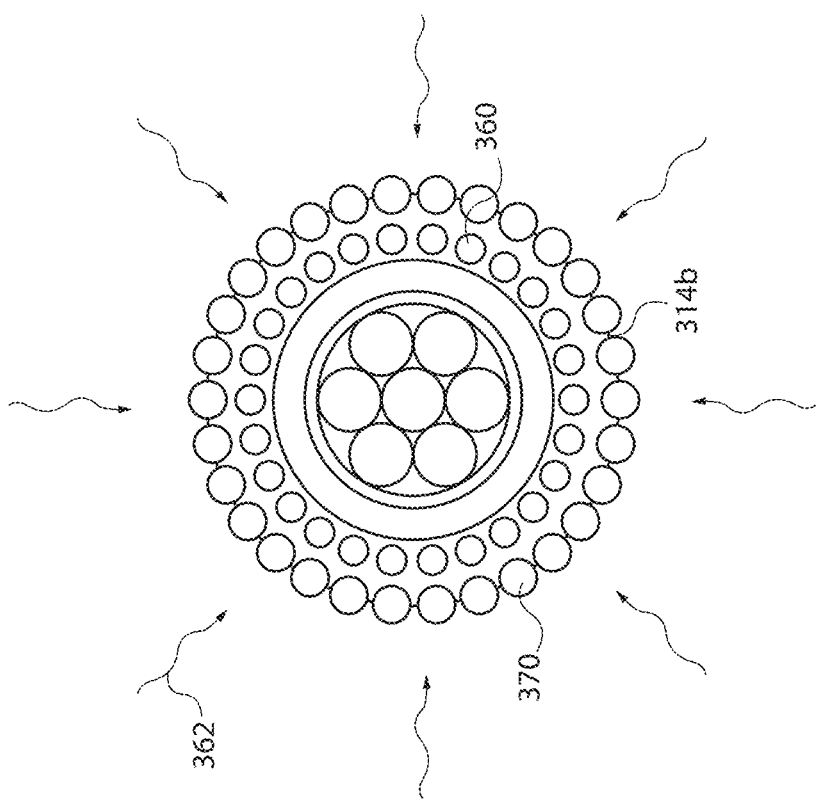

FIGS. 16A-16I depict manufacture of jacketed multi-component 400d in accordance with this disclosure. Multi-component cable 300 is provided, as shown in FIG. 16A. Corrugated metallic tape 320 having sides 319 is provided, as shown in FIG. 16B. Corrugated metallic tape 320 may be wrapped longitudinally and circumferentially about deformable polymer 304, as shown in FIGS. 16C and 16D. Sides 319 of corrugated metallic tape 320 (shown in FIG. 16B) may be overlapped with one another, providing complete or substantially complete coverage over multi-component cable 300. In certain embodiments, layer of corrugated metallic tape 320 is at least partially embedded into deformable polymer 304. In certain embodiments, layer of corrugated metallic tape 320 is wrapped about two layers of deformable polymer 304. Layer of corrugated metallic tape 320 may form a tube about multi-component cable 300. First layer of reinforced polymer 304a may longitudinally and circumferentially surround layer of corrugated metallic tape 320, as shown in FIG. 16E. For example and without limitation, first layer of reinforced polymer 304a may be extruded over layer of corrugated metallic tape 320, encasing layer of corrugated metallic tape 320. First layer of reinforced polymer 304a may form a circular-profile, aiding in subsequent manufacturing steps. Inner layer of armor wires 360 may longitudinally and circumferentially surround reinforced polymer 304a, as shown in FIG. 16F. In certain embodiments, inner layer of armor wires 360 may be at least partially embedded into reinforced polymer 304a. For example and without limitation, inner layer of armor wires 360 may be applied to reinforced polymer 304a while reinforced polymer 304a is in a pliable state, such as after extrusion of reinforced polymer 304a or after passing multi-component cable 300 with reinforced polymer 304a through an infrared 362 heating source. Second layer of reinforced polymer 314b may surround inner layer of armor wires 360, as shown in FIG. 16G. For example and without limitation, second layer of reinforced polymer 314b may be extruded over inner layer of armor wires 360, encasing inner layer of armor wires 360. Reinforced polymer 314b may bond with reinforced polymer 304a through the interstitial spaces between the wires of inner layer of armor wires 360. Reinforced polymer 314b may longitudinally and circumferentially surround inner layer of armor wires 360. Outer layer of armor wires 370 may be partially embedded into reinforced polymer 314b, as shown in FIG. 16H. Outer layer of armor wires 370 may longitudinally and circumferentially surround reinforced polymer 314b. For example and without limitation, while reinforced polymer 314b is in a pliable state, outer layer of armor wires 370 may be partially embedded into reinforced polymer 314b. Reinforced polymer 314b may be in a pliable state after extrusion of second layer of reinforced polymer 314b or after passing multi-component cable 300 with reinforced polymer 314b through infrared 362 heating source, for example. Third layer of reinforced polymer 314c may longitudinally and circumferentially surround outer layer of armor wires 370, as shown in FIG. 16I. Reinforced polymer 314c may bond with reinforced polymer 314b through interstitial spaces between the armor wires of outer layer of armor wires 370, encasing outer layer of armor wires 370.

Figure 17A:
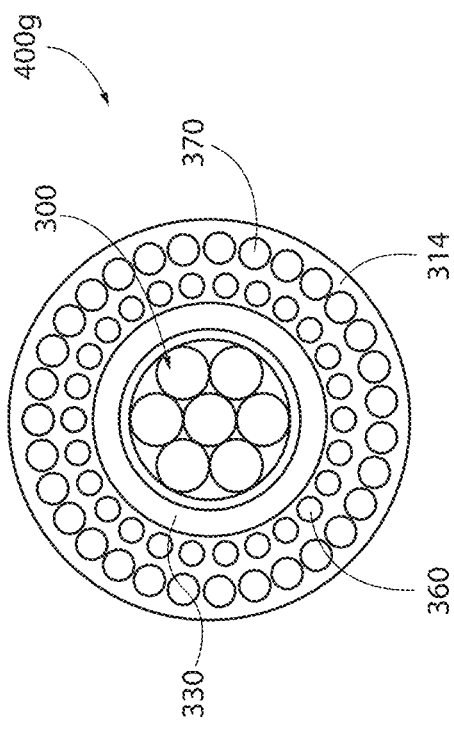
FIGS. 17A-17C depict cross-sectional views of jacketed multi-component cables having a layer of metallic cladding tape in accordance with certain embodiments of the present disclosure.
Figure 17C:
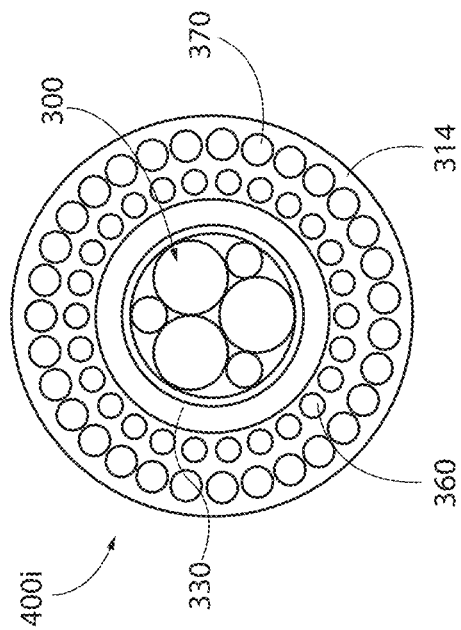
Figure 17B:
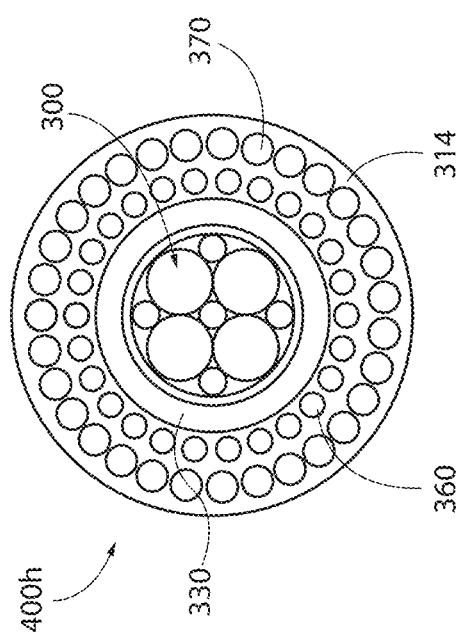

FIGS. 17A-17C depict additional embodiments of jacketed multi-component cables in accordance with this disclosure. FIG. 17A depicts jacketed multi-component cable 400g having a hepta configuration. FIG. 17B depicts jacketed multi-component cable 400h having a quad configuration. FIG. 17C depicts jacketed multi-component cable 400i having a triad configuration. With reference to FIGS. 17A-17C, each jacketed multi-component cable 400g-400i may include a layer of metallic cladding tape 330 longitudinally and circumferentially surrounding multi-component cable 300. Metallic cladding tape 330 may form a tube (e.g., corrugated tube) longitudinally and circumferentially about multi-component cable 300, which may be compression-resistant and adapted to bend over radii, such as spools and sheaves. Each jacketed multi-component cable 400g-400i may include one or more layers of reinforced polymer 314 longitudinally and circumferentially surrounding metallic cladding tape 330. In operation, under compressive forces during deployment of multi-component cable 300, metallic cladding tape 330 may form a compression-resistant tube, distributing the compressive forces circumferentially about multi-component cable 300, preventing or reducing the occurrence of milking. Each of jacketed multi-component cables 400g-400i may include one or more layers of armor wires. For example, each of jacketed multi-component cables 400g-400i may include inner layer of armor wires 360 and outer layer of armor wires 370. In certain embodiments, inner layer of armor wires 360 may be cabled helically over multi-component cable 300. In some embodiments, outer layer of armor wires 370 may be cabled counter-helically to inner layer of armor wires 360.

Figure 18A:
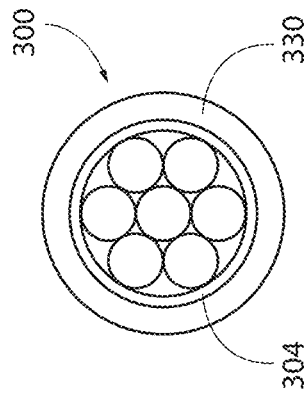
FIGS. 18A-18H depict cross-sectional views showing manufacture of jacketed multi-component cables having a layer of metallic cladding tape in accordance with certain embodiments of the present disclosure.
Figure 18B:
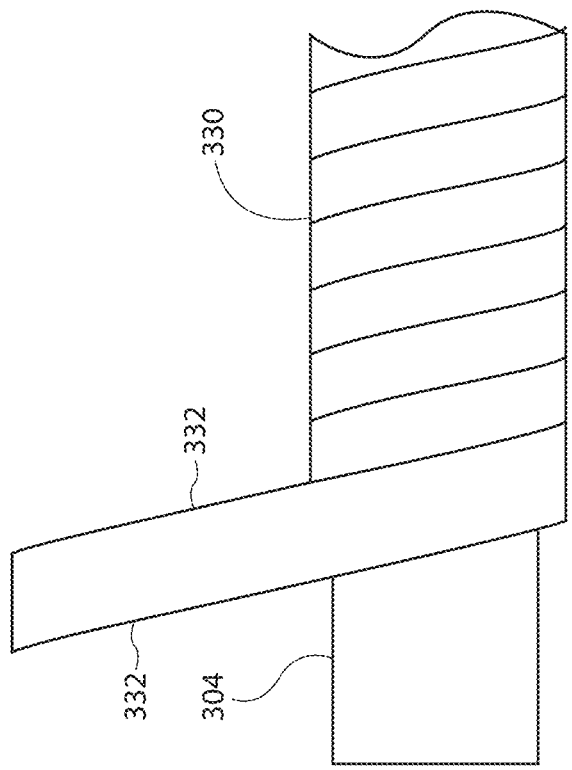
Figure 18C:
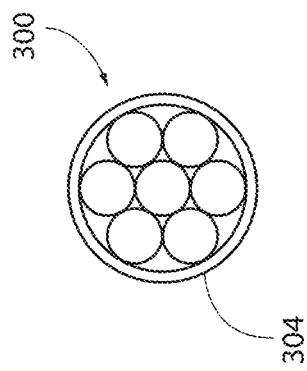
Figure 18F:
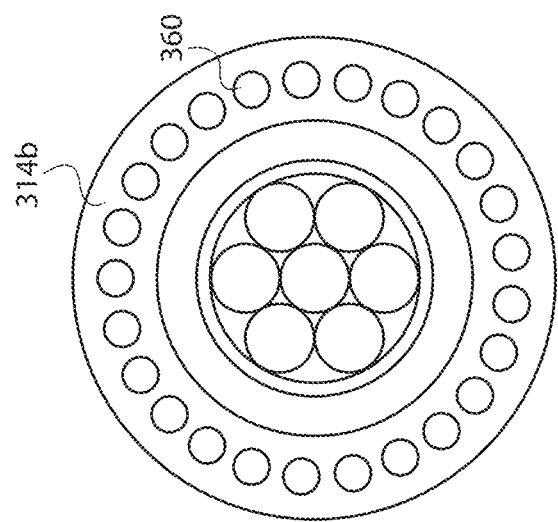
Figure 18E:
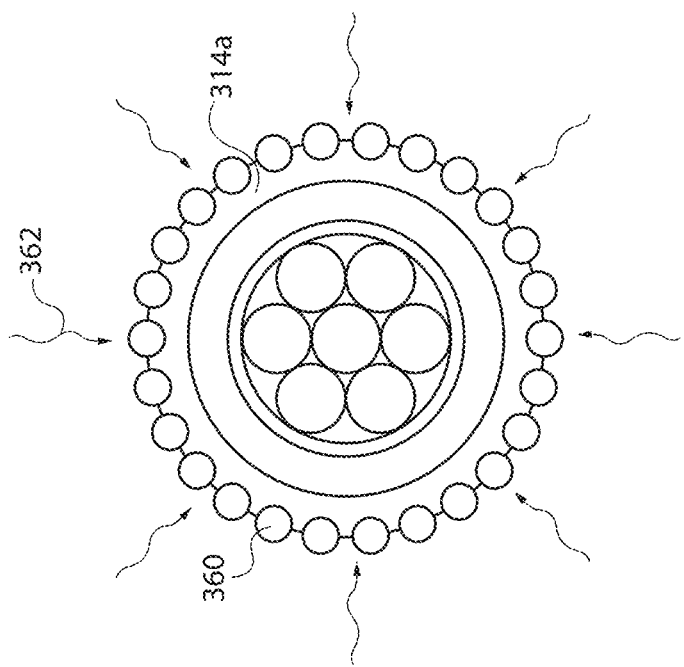
Figure 18D:
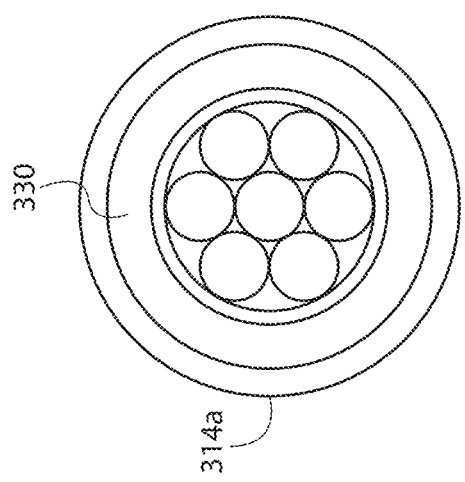
Figure 18H:
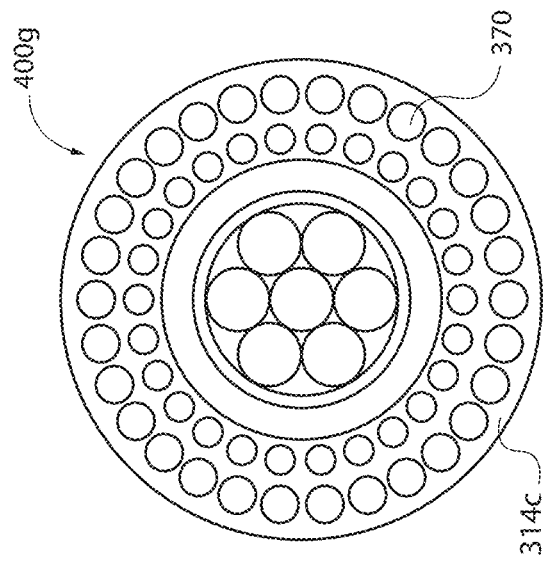
Figure 18G:
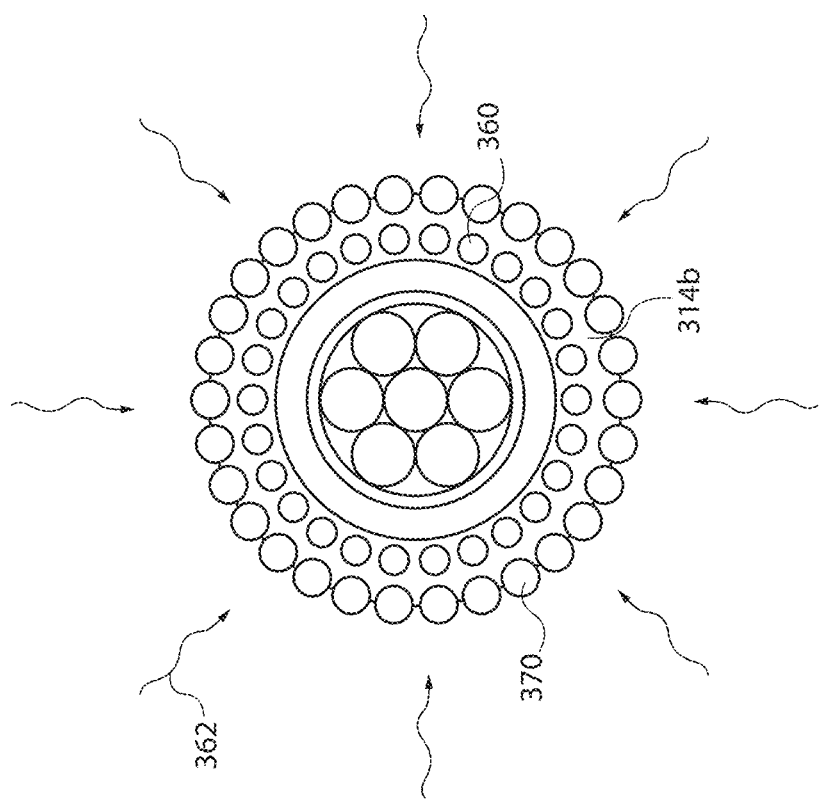

FIGS. 18A-18H depict manufacture of jacketed multi-component cables 400g in accordance with this disclosure. Multi-component cable 300 may be provided, as shown in FIG. 18A. Metallic cladding tape 330 may be wrapped about multi-component cable 300 to longitudinally and circumferentially surround deformable polymer 304, as shown in FIGS. 18B and 18C. In certain embodiments, metallic cladding tape 330 may be wrapped helically over deformable polymer 304. Deformable polymer 304 may encase metallic cladding tape 330 and retain metallic cladding tape 330 in place during manufacturing and/or during deployment (e.g., in a wellbore) of multi-component cable 300. Sides 332 of metallic cladding tape 330 may be overlapped, providing complete or substantially complement coverage of multi-component cable 300. First layer of reinforced polymer 304a may longitudinally and circumferentially surround metallic cladding tape 330, as shown in FIG. 18D. For example and without limitation, first layer of reinforced polymer 304a may be extruded over metallic cladding tape 330, encasing metallic cladding tape 330. Reinforced polymer 304a may retain metallic cladding tape 330 in place about multi-component cable 300, such as during manufacturing and/or deployment (e.g., in a wellbore). Inner layer of armor wires 360 may longitudinally and circumferentially surround reinforced polymer 304a, as shown in FIG. 18E. In certain embodiments, inner layer of armor wires 360 may be at least partially embedded into reinforced polymer 304a. For example and without limitation, inner layer of armor wires 360 may be applied to reinforced polymer 304a while reinforced polymer 304a is in a pliable state, such as after extrusion of reinforced polymer 304a or after passing multi-component cable 300 with reinforced polymer 304a through an infrared 362 heating source. Second layer of reinforced polymer 314b may surround inner layer of armor wires 360, as shown in FIG. 18F. For example and without limitation, second layer of reinforced polymer 314b may be extruded over inner layer of armor wires 360, encasing inner layer of armor wires 360. Reinforced polymer 314b may bond with reinforced polymer 304a through the interstitial spaces between the wires of inner layer of armor wires 360. Reinforced polymer 314b may longitudinally and circumferentially surround inner layer of armor wires 360. Outer layer of armor wires 370 may be partially embedded into reinforced polymer 314b, as shown in FIG. 18G. Outer layer of armor wires 370 may longitudinally and circumferentially surround reinforced polymer 314b. For example and without limitation, while reinforced polymer 314b is in a pliable state, outer layer of armor wires 370 may be partially embedded into reinforced polymer 314b. Reinforced polymer 314b may be in a pliable state after extrusion of second layer of reinforced polymer 314b or after passing multi-component cable 300 with reinforced polymer 314b through infrared 362 heating source, for example. Third layer of reinforced polymer 314c may longitudinally and circumferentially surround outer layer of armor wires 370, as shown in FIG. 18H. Reinforced polymer 314c may bond with reinforced polymer 314b through interstitial spaces between the armor wires of outer layer of armor wires 370, encasing outer layer of armor wires 370.

Figure 19A:
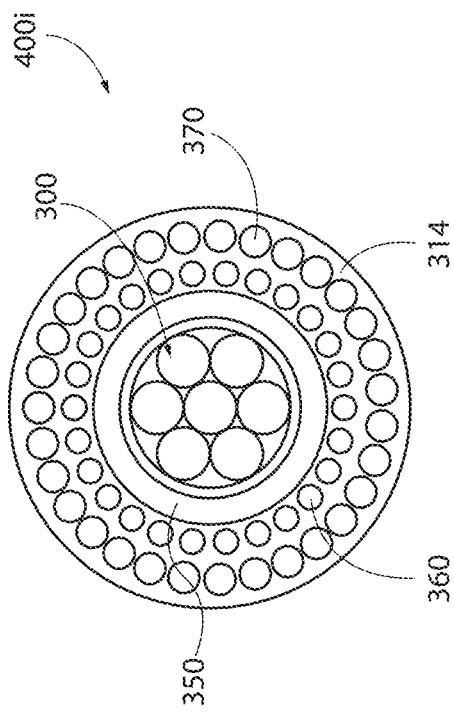
FIGS. 19A-19C depict cross-sectional views of jacketed multi-component cables having a layer of hard polymer in accordance with certain embodiments of the present disclosure.
Figure 19C:
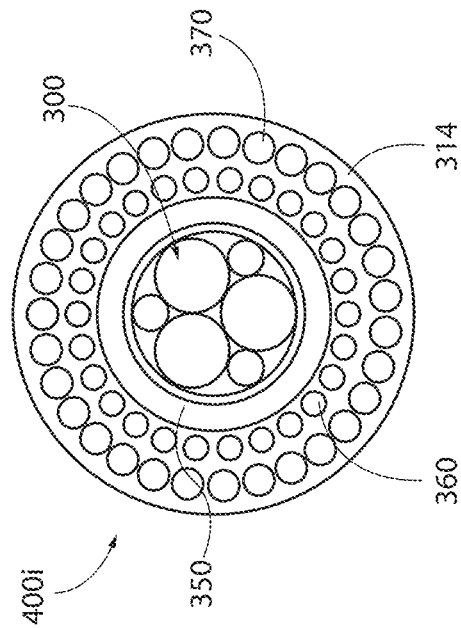
Figure 19B:
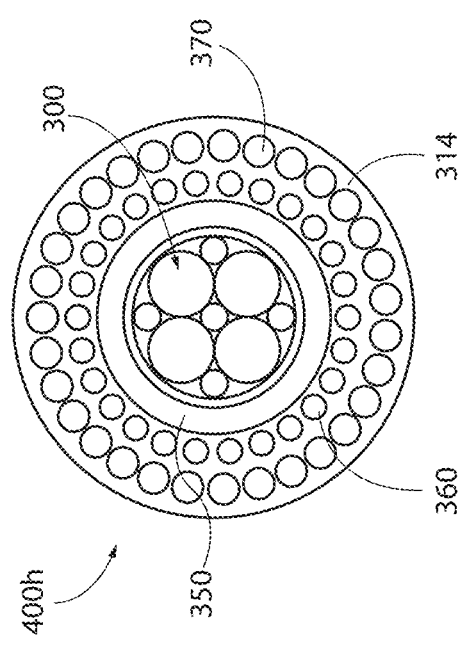

FIGS. 19A-19C depict additional embodiments of jacketed multi-component cables in accordance with this disclosure. FIG. 19A depicts jacketed multi-component cable 400j having a hepta configuration. FIG. 19B depicts jacketed multi-component cable 400k having a quad configuration. FIG. 19C depicts jacketed multi-component cable 400l having a triad configuration. Each jacketed multi-component cable 400j-400l may include hard polymeric layer 350 longitudinally and circumferentially surrounding multi-component cable 300. In certain embodiments, hard polymeric layer 350 may be composed of polyetheretherketone (PEEK) or another hard polymer. In operation, hard polymer layer 350 may encase multi-component cable 300 and protect multi-component cable 300 against compressive forces during the manufacturing process and deployment operations. Each jacketed multi-component cable 400j-400l may include one or more layers of reinforced polymer 314 longitudinally and circumferentially surrounding hard polymeric layer 350. Each of jacketed multi-component cables 400j-400l may include one or more layers of armor wires. For example, each of jacketed multi-component cables 400j-400l may include inner layer of armor wires 360 and outer layer of armor wires 370. In certain embodiments, inner layer of armor wires 360 may be cabled helically over multi-component cable 300. In some embodiments, outer layer of armor wires 370 may be cabled counter-helically to inner layer of armor wires 360.

Figure 20G:
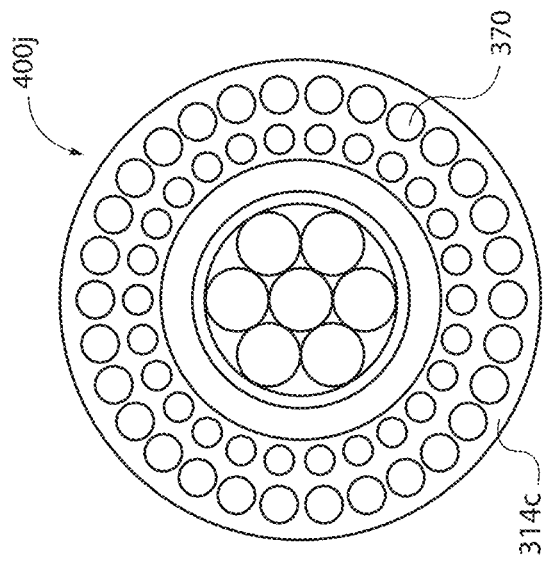
Figure 20F:
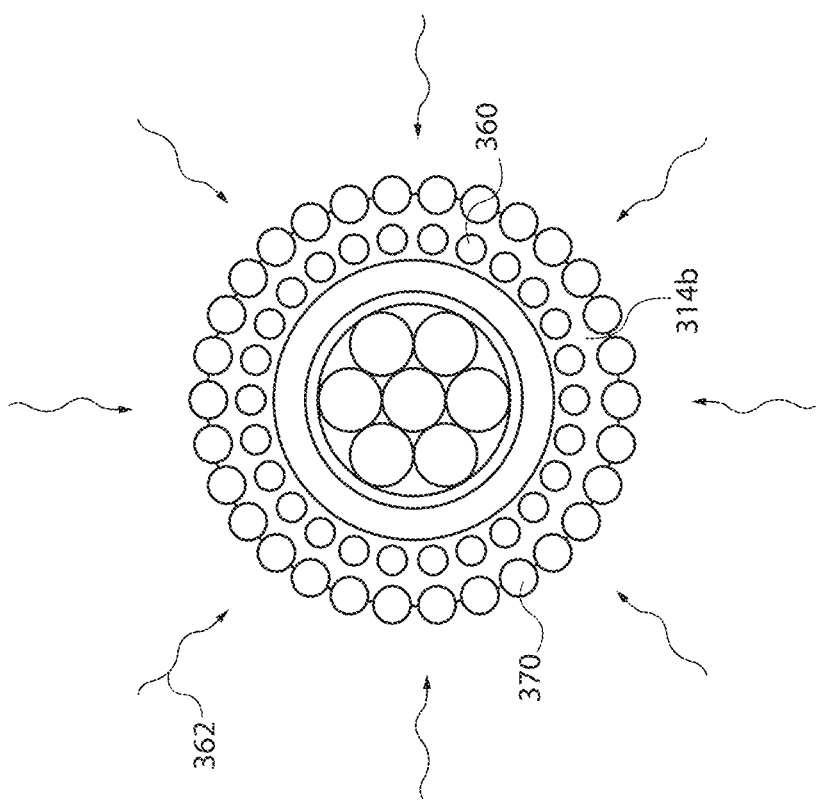

FIGS. 20A-20G depict manufacture of jacketed multi-component cables 400j in accordance with this disclosure. Multi-component cable 300 may be provided, as shown in FIG. 20A. Hard polymeric layer 350 may be extruded over deformable polymer 304, encasing deformable polymer 304. First layer of reinforced polymer 304a may be extruded over hard polymeric layer 350, encasing hard polymeric layer 350. Inner layer of armor wires 360 may longitudinally and circumferentially surround reinforced polymer 304a, as shown in FIG. 20D. In certain embodiments, inner layer of armor wires 360 may be at least partially embedded into reinforced polymer 304a. For example and without limitation, inner layer of armor wires 360 may be applied to reinforced polymer 304a while reinforced polymer 304a is in a pliable state, such as after extrusion of reinforced polymer 304a or after passing multi-component cable 300 with reinforced polymer 304a through an infrared 362 heating source. Second layer of reinforced polymer 314b may surround inner layer of armor wires 360, as shown in FIG. 20E. For example and without limitation, second layer of reinforced polymer 314b may be extruded over inner layer of armor wires 360, encasing inner layer of armor wires 360. Reinforced polymer 314b may bond with reinforced polymer 304a through the interstitial spaces between the wires of inner layer of armor wires 360. Reinforced polymer 314b may longitudinally and circumferentially surround inner layer of armor wires 360. Outer layer of armor wires 370 may be partially embedded into reinforced polymer 314b, as shown in FIG. 20F. Outer layer of armor wires 370 may longitudinally and circumferentially surround reinforced polymer 314b. For example and without limitation, while reinforced polymer 314b is in a pliable state, outer layer of armor wires 370 may be partially embedded into reinforced polymer 314b. Reinforced polymer 314b may be in a pliable state after extrusion of second layer of reinforced polymer 314b or after passing multi-component cable 300 with reinforced polymer 314b through infrared 362 heating source, for example. Third layer of reinforced polymer 314c may longitudinally and circumferentially surround outer layer of armor wires 370, as shown in FIG. 20G. Reinforced polymer 314c may bond with reinforced polymer 314b through interstitial spaces between the armor wires of outer layer of armor wires 370, encasing outer layer of armor wires 370.

In operation, multi-component cable 300 or jacketed multi-component cables 400a-400j may provide one or more low voltage paths via electrical conductor cables 302 and/or wires (e.g., 104, 104a-104e), one or more telemetry paths via fiber optic cables 110 and/or wires (e.g., 104, 104a-104e), one or more high voltage electrical paths via electrical conductor cables 302 and/or wires (e.g., 104, 104a-104e), or combinations thereof. In certain embodiments, such as the quad configuration, multi-component cable 300 or jacketed multi-component cables 400a-400j may supply AC power to downhole tools.

In certain embodiments, multi-component cable 300 or jacketed cables 400a-400j may be used with wellbore devices to perform operations in wellbores penetrating geologic formations that may contain gas and oil reservoirs. Multi-component cable 300 or jacketed multi-component cables 400a-400j may be used to interconnect well logging tools, such as gamma-ray emitters/receivers, caliper devices, resistivity-measuring devices, seismic devices, neutron emitters/receivers, downhole tractors, mechanical service tools, and the like, to one or more power supplies and data logging equipment outside the well. Multi-component cable 300 or jacketed multi-component cables 400a-400j may be used in seismic operations, including subsea and subterranean seismic operations. Multi-component cable 300 or jacketed multi-component cables 400a-400j may be used as permanent monitoring cables for wellbores.

EXAMPLES

The disclosure having been generally described, the following examples show particular embodiments of the disclosure. It is understood that the example is given by way of illustration and is not intended to limit the specification or the claims.

Example 1—Manufacturing Process—Channel and Cap Configuration

The manufacture of an opto-electrical cable having a channel and cap configuration may proceed as follows:
1. A first conductive metal wire having a partial-circular-profile is provided. One side of the first conducted metal wire is planar, with a channel running longitudinally along the planar side.
2. One or more optical fibers are placed into the channel.
3. Soft gel filler is placed into the channel, encasing the one or more optical fibers and serving as a protective cushion.
4. A second conductive metal wire is provided. The second conductive metal wire has a semicircular outer profile and a tab sized to fit within the channel in the first conductive metal wire.
5. The second conductive metal wire is fitted into the first conductive metal wire to form an opto-electrical cable core.
6. A layer of tape (e.g., PEEK) is applied over the opto-electrical cable core to form an opto-electrical cable. Alternatively, a layer of polymer is extruded over the opto-electrical cable core to form the opto-electrical cable.

Example 2—Manufacturing Process—Circular Wire with Multiple Channels

The manufacture of an opto-electrical cable having a wire with multiple channels may proceed as follows:

1. A conductive metal wire having a circular-profile with three or more uniformly spaced channels around the outer diameter of the conductive metal wire is provided.
2. One or more optical fibers are placed in each channel.
3. Soft gel filler is placed into each channel, encasing the optical fibers and serving as a protective cushion to form an opto-electrical cable core.
4. A layer of tape (e.g., PEEK) or polymer extrusion is applied over the opto-electrical cable core to form an opto-electrical cable.

Example 3—Manufacturing Process—Circular Wire with a Single Channel

The manufacture of an opto-electrical cable having a wire with a single channel may proceed as follows:
1. A conductive metal wire having a circular-profile with a single channel located in the outer diameter of the conductive metal wire is provided.
2. One or more optical fibers are placed in the channel.
3. Soft gel filler is placed into the channel, encasing the optical fibers and serving as a protective cushion to form an opto-electrical cable core.
4. A layer of tape (e.g., PEEK) or polymer extrusion is applied over the opto-electrical cable core to form an opto-electrical cable.

Example 4—Manufacturing Process—Hexagonal Wire with a Flat Base and Single Channel The manufacture of an opto-electrical cable having a hexagonal wire with a single channel may proceed as follows:
1. A conductive metal wire having an approximately hexagonal-profile with a single channel located in the outer diameter of the conductive metal wire, a planar base opposite the single channel, and at least partially flattened sides is provided.
2. The conductive metal wire is held in place upon the planar base, optionally by holding the at least partially flattened sides.
3. One or more optical fibers are placed in the channel.
4. Soft gel filler is placed into the channel, encasing the optical fibers and serving as a protective cushion to form an opto-electrical cable core.
5. A layer of tape (e.g., PEEK) or polymer extrusion is applied over the opto-electrical cable core to form an opto-electrical cable and provide the opto-electrical cable with a circular-profile.

Example 5—Manufacturing Process—C-Shaped Wire with a Single Channel

The manufacture of an opto-electrical cable having a C-shaped wire with a single channel may proceed as follows:
1. A conductive metal wire having a C-shaped-profile and an interior that forms a channel running the length of the conductive metal wire is provided.
2. One or more optical fibers are placed in the channel.
3. Soft gel filler is placed into the channel, encasing the optical fibers and serving as a protective cushion.
4. A plug is placed into an opening of the channel to seal the soft gel filler within the channel and form an opto-electrical cable core. A gel or other material that forms the plug may form a thin layer over the outer surface of the conductive metal wire.
5. A layer of tape (e.g., PEEK) or polymer extrusion is applied over the opto-electrical cable core to form an opto-electrical cable.

Example 6—Manufacturing Process—Core Completion

Completion of any of the opto-electrical cables of Examples 1-5 to form a completed opto-electrical cable may proceed as follows:
1. A layer of cladding is applied over an opto-electrical cable formed in accordance with any of Examples 1-5; or
2. A jacket layer is applied over an opto-electrical cable formed in accordance with any of Examples 1-5. The jacket layer may include small served wires encased in a polymer layer (e.g., TEFZEL® or Carbon-fiber-reinforced TEFZEL1®); or
3. Two semi-circular-shaped metallic wires (e.g., arcuate metal wires) are placed over an opto-electrical cable formed in accordance with any of Examples 1-5, forming an outer tube, followed by application of an additional layer of polymer over the tube; or
4. A layer of metallic tape with a longitudinal crimped seam is applied over an opto-electrical cable formed in accordance with any of Examples 1-5, followed by application of an additional layer of polymer over the layer of metallic tape.

Example 7—Manufacturing Process—Coaxial Core Completion

Completion of any of the opto-electrical cables of Examples 1-5 to form a completed opto-electrical cable may proceed as follows:
1. An opto-electrical cable formed in accordance with any of Examples 1-5 is provided.
2. A layer of soft silicone polymer is extruded over the opto-electrical cable. A powder may be placed over the silicone to alleviate the possibility of the silicone sticking to the metal in subsequent step 3.
3. A number of arch-profile wires are placed over the layer of soft silicone polymer. As the wires compress over the layer of soft silicone polymer, the soft silicone polymer fills the interstitial spaces between the arch-profile wires.
4. A layer of stranded wires encased in layers of polymer is applied over the arch-profile wires to form a completed opto-electrical cable having a coaxial cable configuration.

Example 8—Manufacturing Process—Arch-Profile Wire Jacketing

A completed opto-electrical cable formed in accordance with either Example 6 or 7 may be arranged into a jacketed multi-component cable as follows:
1. A layer of soft, deformable polymer is applied over one or more completed opto-electrical cables formed in accordance with Example 6 and/or 7, and one or more electrical conductor cables, forming a multi-component cable. The completed opto-electrical cables and electrical conductor cables may have a triad, quad, or hepta configuration, for example.
2. A number of arch-profile metallic wires sufficient to cover the circumference of the multi-component cable are placed longitudinally over the multi-component cable.
3. The arch-profile wires are embedded into the soft, deformable polymer. The arch-profile wires are shaped to allow the polymer to deform into interstitial spaces between the arch-profile wires. The outer profiles of the arch-profile wires contact each other and form a compression-resistant barrier over the multi-component cable.
4. A first layer of carbon-fiber-reinforced (CFR) polymer is extruded over the arch-profile wires to lock the arch-profile wires in place about the multi-component cable.
5. While the first layer of CFR polymer is still pliable or after passing the multi-component cable through an infrared heating source, an inner layer of armor wire strength members is cabled helically over and partially embedded into the first layer of CFR-polymer.
6. A second layer of CFR polymer is extruded over the inner layer of armor wire strength members and bonds with the first layer of CFR polymer layer through the interstitial spaces between the armor wire strength members.
7. While the second layer of CFR polymer is still pliable or after passing the multi-component cable through an infrared heating source, an outer layer of armor wire strength members is cabled counter-helically to the inner layer of armor wire strength members over and is partially embedded into the second layer of CFR-polymer.
8. For additional seal, a final layer of CFR polymer is extruded over the outer layer of armor wire strength members and bonds with the second layer of CFR polymer layer through the interstitial spaces between the armor wire strength members, forming the jacketed multi-component cable.

Example 9—Manufacturing Process—Corrugated Metallic Tape Jacketing

A completed opto-electrical cable formed in accordance with either of Example 6 or 7 may be arranged into a jacketed multi-component cable as follows:
1. A layer of soft, deformable polymer is applied over one or more completed opto-electrical cable formed in accordance with Example 6 and/or 7, and one or more electrical conductor cables, forming a multi-component cable. The completed opto-electrical cables and electrical conductor cables may have a triad, quad, or hepta configuration, for example.
2. A corrugated metallic tape is wrapped longitudinally around and embedded into the soft, deformable polymer to form a corrugated tube. The sides of the corrugated metallic tape overlap to ensure complete coverage.
3. A first layer of carbon-fiber-reinforced (CFR) polymer is extruded over the corrugated metallic tape to lock the corrugated metallic tape in place about the multi-component cable.
4. While the first layer of CFR polymer is still pliable or after passing the multi-component cable through an infrared heating source, an inner layer of armor wire strength members is cabled helically over and partially embedded into the first layer of CFR-polymer.

5. A second layer of CFR polymer is extruded over the inner layer of armor wire strength members and bonds with the first layer of CFR polymer layer through the interstitial spaces between the armor wire strength members.
6. While the second layer of CFR polymer is still pliable or after passing the multi-component cable through an infrared heating source, an outer layer of armor wire strength members is cabled counter-helically to the inner layer of armor wire strength members over and is partially embedded into the second layer of CFR-polymer.
7. For additional seal, a final layer of CFR polymer is extruded over the outer layer of armor wire strength members and bonds with the second layer of CFR polymer layer through the interstitial spaces between the armor wire strength members, forming the jacketed multi-component cable.

Example 10—Manufacturing Process—Metallic Cladding Tape Jacketing

A completed opto-electrical cable formed in accordance with either of Example 6 or 7 may be arranged into a jacketed multi-component cable as follows:
1. A layer of soft, deformable polymer is applied over one or more completed opto-electrical cables formed in accordance with Example 6 and/or 7, and one or more electrical conductor cables, forming a multi-component cable. The completed opto-electrical cables and the electrical conductor cables may have a triad, quad, or hepta configuration, for example.
2. A layer of metallic cladding tape is helically wrapped over the soft, deformable polymer. The sides of the metallic cladding tape overlap to ensure complete coverage of the multi-component cable.
3. A first layer of carbon-fiber-reinforced (CFR) polymer is extruded over the metallic cladding tape to lock the metallic cladding tape in place about the multi-component cable.
4. While the first layer of CFR polymer is still pliable or after passing the multi-component cable through an infrared heating source, an inner layer of armor wire strength members is cabled helically over and partially embedded into the first layer of CFR-polymer.
5. A second layer of CFR polymer is extruded over the inner layer of armor wire strength members and bonds with the first layer of CFR polymer layer through the interstitial spaces between the armor wire strength members.
6. While the second layer of CFR polymer is still pliable or after passing the multi-component cable through an infrared heating source, an outer layer of armor wire strength members is cabled counter-helically to the inner layer of armor wire strength members over and is partially embedded into the second layer of CFR-polymer.
7. In some embodiments, for additional seal, a final layer of CFR polymer is extruded over the outer layer of armor wire strength members and bonds with the second layer of CFR polymer layer through the interstitial spaces between the armor wire strength members, forming the jacketed multi-component cable.

Example 11—Manufacturing Process—PEEK Jacketing

A completed opto-electrical cable formed in accordance with either of Example 6 or 7 may be arranged into a jacketed multi-component cable as follows:
1. A layer of soft, deformable polymer or tape is applied over one or more completed opto-electrical cables formed in accordance with Example 6 and/or 7, and one or more electrical conductor cables, forming a multi-component cable. The completed opto-electrical cables and the electrical conductor cables may have a triad, quad, or hepta configuration, for example.
2. A thick layer of polyetheretherketone (PEEK) or other hard polymer is extruded over the soft, deformable polymer or tape.
3. A first layer of carbon-fiber-reinforced (CFR) polymer is extruded over the thick layer of polyetheretherketone (PEEK) or other hard polymer.
4. While the first layer of CFR polymer is still pliable or after passing the multi-component cable through an infrared heating source, an inner layer of armor wire strength members is cabled helically over and partially embedded into the first layer of CFR-polymer.
5. A second layer of CFR polymer is extruded over the inner layer of armor wire strength members and bonds with the first layer of CFR polymer layer through the interstitial spaces between the armor wire strength members.
6. While the second layer of CFR polymer is still pliable or after passing the multi-component cable through an infrared heating source, an outer layer of armor wire strength members is cabled counter-helically to the inner layer of armor wire strength members over and is partially embedded into the second layer of CFR-polymer.
7. In some embodiments, for additional seal, a final layer of CFR polymer is extruded over the outer layer of armor wire strength members and bonds with the second layer of CFR polymer layer through the interstitial spaces between the armor wire strength members, forming the jacketed multi-component cable.

Figure 21:
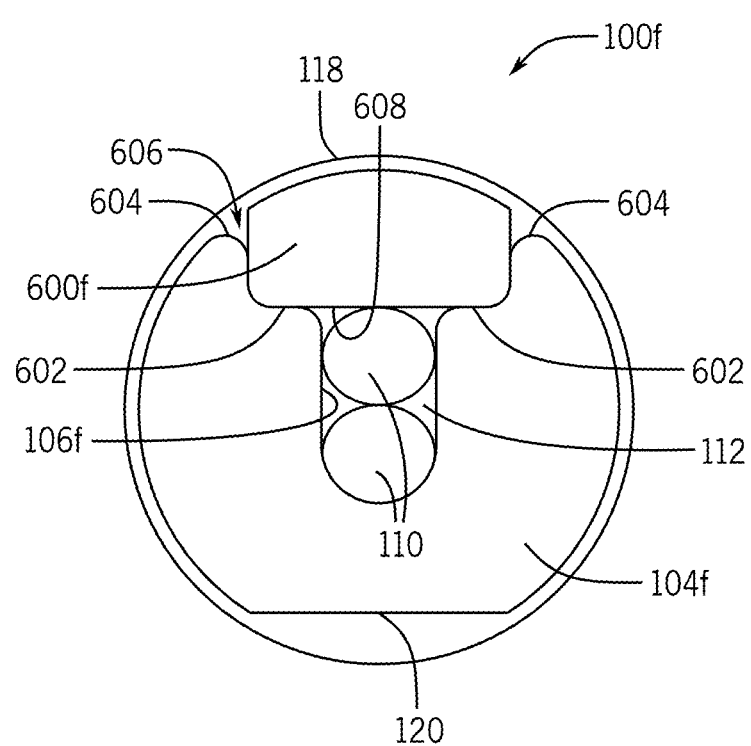
FIG. 21 depicts a cross-sectional view of an opto-electrical cable including a wire having a channel and cap configuration in accordance with certain embodiments of the present disclosure.

FIG. 21 depicts another embodiment of an opto-electrical cable consistent with the present disclosure, referred to herein as an opto-electrical cable 100f. As shown in the illustrated embodiment, the opto-electrical cable 100f includes a base wire 104f and a cap wire 600f. The base wire 104f and the cap wire 600f may each be formed from the same material as the base wire 104 of the opto-electrical cable 100a discussed above. For example, the base wire 104f and/or the cap wire 600f may be formed from copper, a copper alloy, steel, aluminum, an aluminum alloy, or any other suitable metallic material or non-metallic material. Similar to the base wire 104, the base wire 104f may include the base 120 that extends along a length of the base wire 104f.

The base wire 104f may include a channel 106f formed therein that extends along a longitudinal axis of the base wire 104f. The channel 106f is configured to receive the one or more optical fibers 110. As discussed above, the optical fibers 110 may include acrylate fibers, polyimide fibers, silicone perfluoroalkoxy (PFA) fibers, or any other suitable optical fibers 110. Although the opto-electrical cable 100f includes two optical fibers 110 in the illustrated embodiment of FIG. 21, it should be understood that, in other embodiments, the opto-electrical cable 100f may include any suitable quantity of optical fibers 110. For example, the opto-electrical cable 100f may include 1, 2, 3, 4, or more than four optical fibers 110 that are arranged within the channel 106f and that may extend along a length of the opto-electrical cable 100f. It should be understood that, in some embodiments, the optical fibers 100 may include a jacket, shield, or cladding layer that forms an outer circumference of the optical fibers 100.

In some embodiments, the optical fibers 110 may be in contact (e.g., physical contact) with the base wire 104f and/or the cap wire 600f. In this manner, compressive forces that may be applied to the base wire 104f and/or the cap wire 600f may be transferred to the optical fibers 110. In other words, the optical fibers 110 may be coupled to the base wire 104f, the cap wire 600f, or both, such that compressive forces (e.g., forces applied radially on the opto-electrical cable 100f) imparted on the opto-electrical cable 100f are transferred to the optical fibers 110. In other embodiments, a gap may remain between an outer circumference of the optical fibers 110 and the channel 106f and/or the cap wire 600f. For example, in certain embodiments, the filler 112 may be inserted (e.g., injected) into the channel 106f to encase the optical fibers 110 within channel 106f. In this manner, the filler 112 may provide protective cushioning to the optical fibers 110. That is, in some embodiments, the filler 112 may isolate the optical fibers 110 from direct, physical contact with the base wire 104f. In certain embodiments, the filler 112 may enable the optical fibers 110 to contact the base wire 104f and/or the cap wire 600f while occupying interstitial spaces (e.g., voids) that may be formed between the optical fibers 110, the base wire 104f, and/or the cap wire 600f It should be understood that, in other embodiments, the filler 112 may be omitted from the channel 106f (e.g., the channel 106f may be filled with air). For clarity, it should be appreciated that any of the embodiments of the opto-electrical cable 100f discussed herein may include the arrangement of optical fibers 100 discussed above.

In the illustrated embodiment, the base wire 104f includes a pair of base wire mating surfaces 602 (e.g., mating surfaces) that may receive the cap wire 600f. For example, the base wire mating surfaces 602 may extend longitudinally along a length of the base wire 104f and may be positioned along opposing sides of the channel 106f. Particularly, the base wire mating surfaces 602 may be positioned between opposing protrusions 604 of the base wire 104f. The base wire mating surfaces 602 and the protrusions 604 may therefore define a mating channel 606 that extends longitudinally along the length of the base wire 104f and that may form a portion of the channel 106f. In some embodiments, base wire mating surfaces 602 are substantially planar surfaces. The cap wire 600f includes a mating surface 608 (e.g., a substantially planar surface) that may rest on and/or engage with the base wire mating surfaces 602 when the cap wire 600f is inserted into the mating channel 606. In some embodiments, the cap wire 600f may be sized to form an interference fit between the protrusions 604 when the cap wire 600f is inserted into the mating channel 606. Accordingly, such an interference fit may facilitate coupling the cap wire 600f to the base wire 104f and retaining the cap wire 600f within the mating channel 606. Additionally or alternatively, suitable adhesives (e.g., bonding glue) and/or metallurgical processes (e.g., welding, brazing) may be used to couple the cap wire 600f to the base wire 104f. In some embodiments, the cap wire 600f, when installed within the mating channel 606, may form a fluid seal between the channel 106f and an ambient environment surrounding the opto-electrical cable 100f. As such, the cap wire 600f may seal the optical fibers 110 and/or the filler 112 within the channel 106f and may mitigate or substantially eliminate fluid flow through an interface between the cap wire 600f and the base wire 104f.

Similar to the embodiments of the opto-electrical cables discussed above, the opto-electrical cable 100f may include the one or more polymer layers 118 (e.g., layers of polymer tape, extruded polymer jackets) that encase the base wire 104f and cap wire 600f. Indeed, as set forth above, the polymer layer 118 may include one or more layers of polyetheretherketone (PEEK) tape, which may be wrapped around the assembled base wire 104f and cap wire 600f in a circumferential, helical, and/or longitudinal manner. In other embodiments, the polymer layer 118 may include a polymer jacket that, upon assembly of the base wire 104f and the cap wire 600f, is extruded about an exterior of the base wire 104f and the cap wire 600f. In some embodiments, the polymer layer 118 may facilitate retaining the cap wire 600f within the mating channel 606. Moreover, the polymer layer 118 may facilitate forming a fluid seal between the channel 106f and an ambient environment surrounding the opto-electrical cable 100f. To this end, the polymer layer 118 may facilitate blocking intrusion of foreign matter into the channel 106f.

Figure 21A:
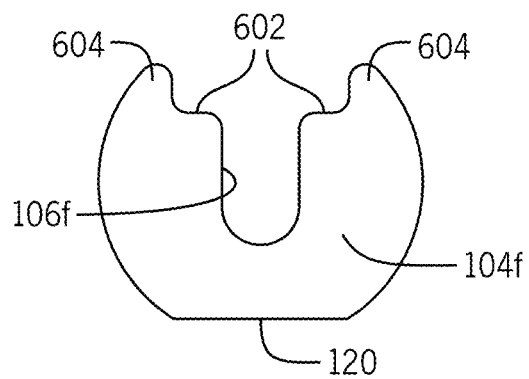
FIGS. 21A-21F depict cross-sectional views showing manufacture of the opto-electrical cable of FIG. 21 in accordance with certain embodiments of the present disclosure.
Figure 21B:
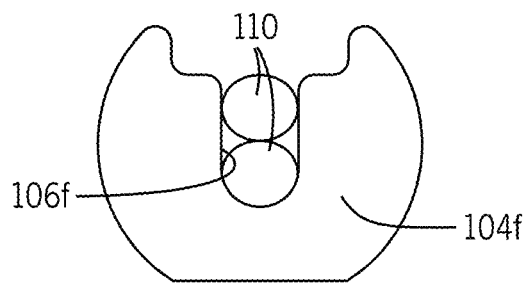
Figure 21C:
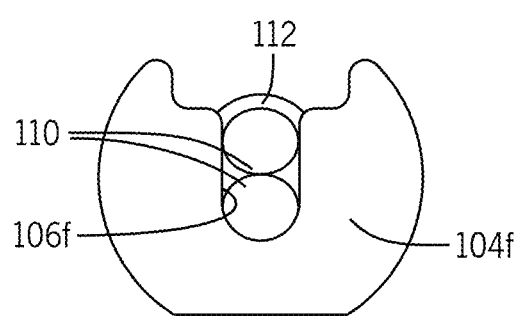
Figure 21D:
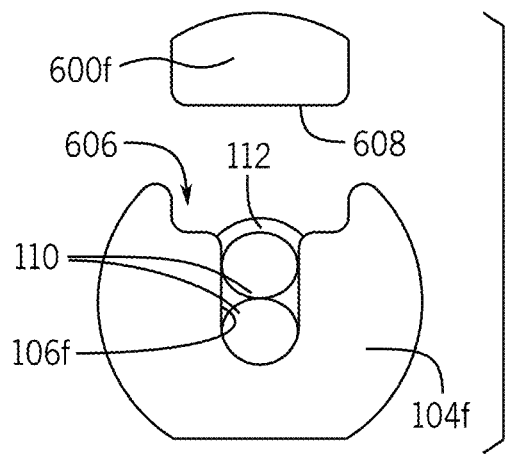
Figure 21E:
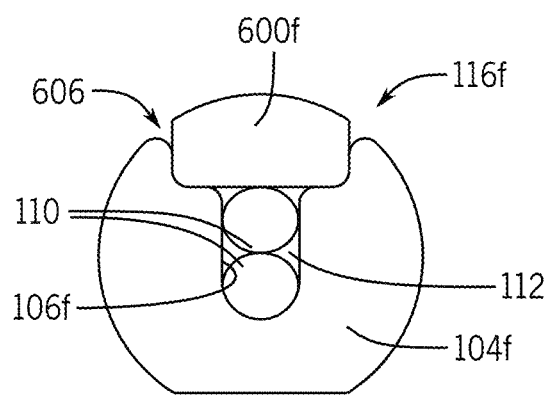
Figure 21F:
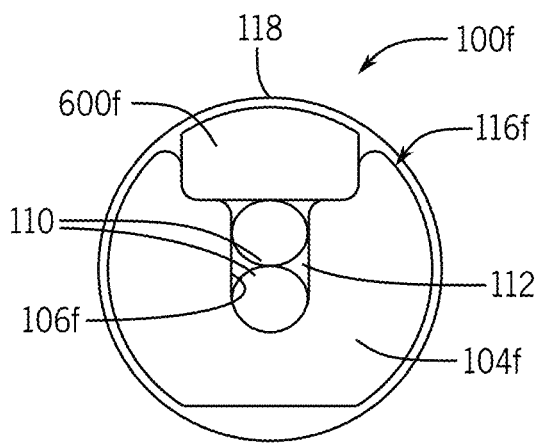

FIGS. 21A-21F depict various steps of manufacturing the opto-electrical cable 100f in accordance with the techniques discussed herein. For example, to assemble the opto-electrical cable 100f, the base wire 104f may first be extruded or otherwise machined to include the features discussed above, such as the base 120, the channel 106f, the base wire mating surfaces 602, and the protrusions 604, as shown in FIG. 21A. The one or more optical fibers 110 may be placed within the channel 106f, as shown in FIG. 21B. The filler 112 may be placed into (e.g., injected into) the channel 106 to encase the optical fibers 110 within the channel 106f, as shown in FIG. 21C. The cap wire 600f may be extruded or otherwise machined to include the features discussed above, such as the mating surface 608, as shown in FIG. 21D. The cap wire 600f may be inserted into the mating channel 606 and coupled with the base wire 104f (e.g., via an interference fit, adhesives, and/or a metallurgical process) to enclose the channel 106f. That is, the cap wire 600f may encapsulate the optical fibers 110 and the filler 112 within the channel 106f to form an opto-electrical cable core 116f, as shown in FIG. 21E. For clarity, it should be understood that the opto-electrical cable core 116f may include the base wire 104f, the cap wire 600f, the one or more optical fibers 110, and the filler 112. The one or more polymer layers 118 may be wrapped around or extruded over the opto-electrical cable core 116f, thereby encasing the opto-electrical cable core 116f and forming the opto-electrical cable 100f, as shown in FIG. 21F.

Figure 22:
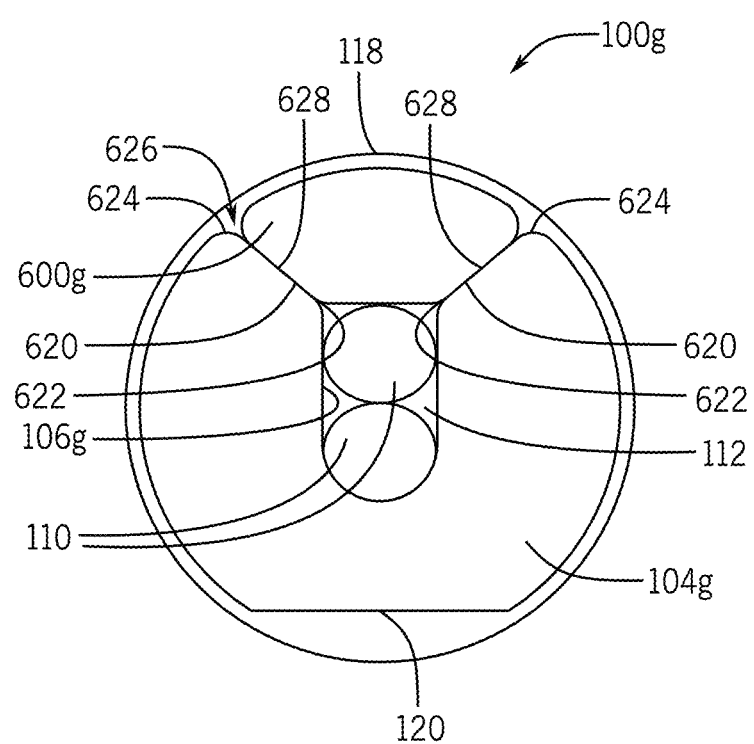
FIG. 22 depicts a cross-sectional view of an opto-electrical cable including a wire having a channel and cap configuration in accordance with certain embodiments of the present disclosure.

FIG. 22 depicts another embodiment of an opto-electrical cable consistent with the present disclosure, referred to herein as an opto-electrical cable 100g. As shown in the illustrated embodiment, the opto-electrical cable 100g includes a base wire 104g and a cap wire 600g. The base wire 104g and the cap wire 600g may each be formed from the same material as the base wire 104f of the opto-electrical cable 100f. Similar to the base wire 104f discussed above, the base wire 104g may include the base 120 that extends along a length of the base wire 104g.

The base wire 104g may include a channel 106g formed therein that extends along a longitudinal axis of the base wire 104g. The channel 106g is configured to receive the one or more optical fibers 110. The filler 112 may be inserted (e.g., injected) into the channel 106g to encase the optical fibers 110 within channel 106g and to provide protective cushioning for the optical fibers 110. That is, as similarly discussed above, the filler 112 may isolate the optical fibers 110 from direct, physical contact with the base wire 104g. In certain embodiments, the filler 112 may enable the optical fibers 110 to contact the base wire 104g and/or the cap wire 600g while occupying interstitial spaces (e.g., voids) that may be formed between the optical fibers 110, the base wire 104g, and/or the cap wire 600g. In other embodiments, the filler 112 may be omitted from the channel 106g.

In the illustrated embodiment, the base wire 104g includes base wire mating chamfers 620 that may receive the cap wire 600g. For example, the base wire mating chamfers 620 may extend longitudinally along a length of the base wire 104g and may be positioned along opposing sides of the channel 106g. Particularly, the base wire mating chamfers 620 may extend between respective edges 622 of the channel 106g and corresponding vertices 624 of the base wire 104g. The base wire mating chamfers 620 may therefore define a mating groove 626 that may extend longitudinally along the length of the base wire 104g. In some embodiments, the base wire mating chamfers 620 are substantially planar surfaces. The cap wire 600g includes an arch-profile having inclined mating surfaces 628 (e.g., a substantially planar surfaces) that may rest on and/or engage with corresponding ones of the base wire mating chamfers 620 when the cap wire 600g is inserted into the mating groove 626. In some embodiments, suitable adhesives (e.g., bonding glue) and/or metallurgical processes (e.g., welding, brazing) may be used to couple the cap wire 600g to the base wire 104g. In certain embodiments, the cap wire 600g, when installed within the mating groove 626, may form a fluid seal between the channel 106g and an ambient environment surrounding the opto-electrical cable 100g. As such, the cap wire 600g may seal the optical fibers 110 and/or the filler 112 within the channel 106g and may mitigate or substantially eliminate fluid flow through an interface between the cap wire 600g and the base wire 104g.

Similar to the embodiments of the opto-electrical cables discussed above, the opto-electrical cable 100g may include the one or more polymer layers 118 (e.g., layers of polymer tape) that encase the base wire 104g and the cap wire 600g. The polymer layers 118 may be wrapped around or extruded over the assembled base wire 104g and cap wire 600g. In some embodiments, the polymer layer 118 may facilitate retaining the cap wire 600g within the mating groove 626. Moreover, the polymer layer 118 may facilitate forming a fluid seal between the channel 106g and an ambient environment surrounding the opto-electrical cable 100g. To this end, the polymer layer 118 may facilitate blocking intrusion of foreign matter into the channel 106g.

Figure 22A:
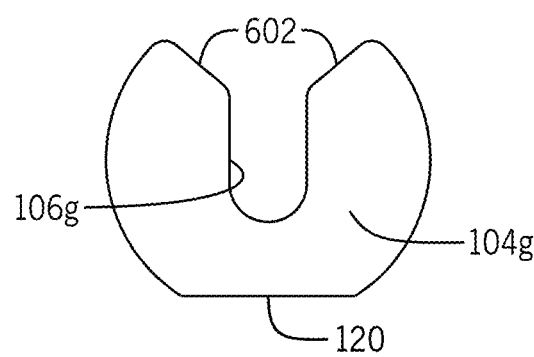
FIGS. 22A-22F depict cross-sectional views showing manufacture of the opto-electrical cable of FIG. 22 in accordance with certain embodiments of the present disclosure.
Figure 22B:
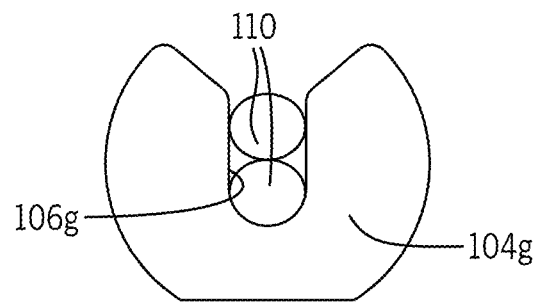
Figure 22C:
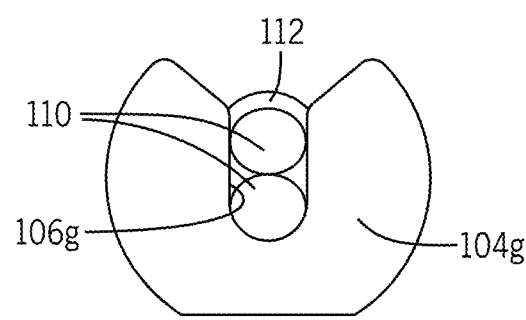
Figure 22D:
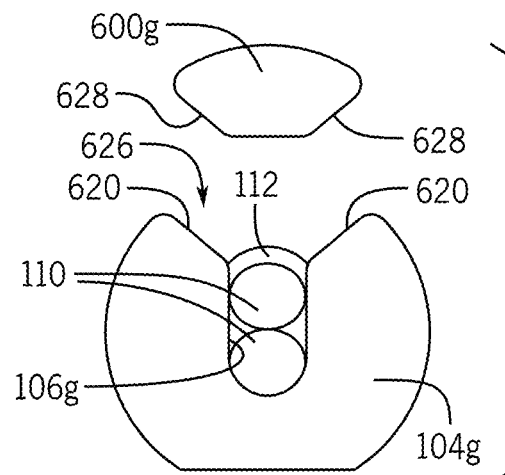
Figure 22E:
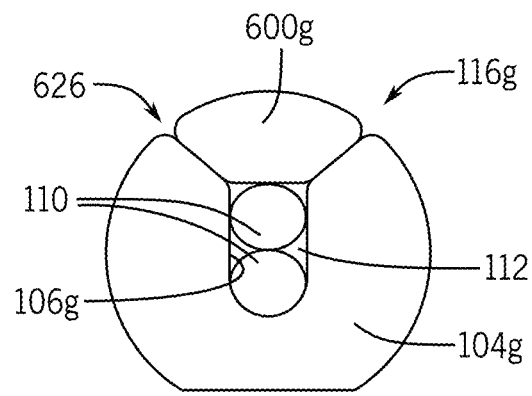
Figure 22F:
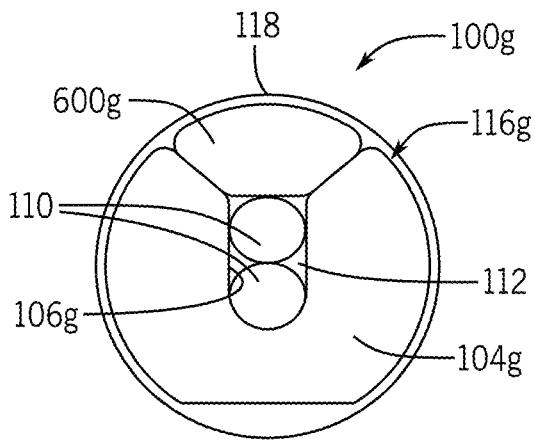

FIGS. 22A-22F depict various steps of manufacturing the opto-electrical cable 100g in accordance with the techniques discussed herein. For example, to assemble the opto-electrical cable 100g, the base wire 104g may first be extruded or otherwise machined to include the features discussed above, such as the base 120, the channel 106f, and the base wire mating chamfers 620, as shown in FIG. 22A. The one or more optical fibers 110 may be placed within channel 106f, as shown in FIG. 22B. The filler 112 may be placed into channel 106 to encase the optical fibers 110 within the channel 106g, as shown in FIG. 22C. The cap wire 600g may be extruded or otherwise machined to include the features discussed above, such as the inclined mating surfaces 628, as shown in FIG. 22D. The cap wire 600g may be inserted into the mating groove 626 and coupled with the base wire 104g (e.g., via adhesives, and/or a metallurgical process) to enclose the channel 106g. That is, the cap wire 600g may encapsulate the optical fibers 110 and the filler 112 to form an opto-electrical cable core 116g, as shown in FIG. 22E. For clarity, it should be understood that the opto-electrical cable core 116g may include the base wire 104g, the cap wire 600g, the one or more optical fibers 110, and the filler 112. The one or more polymer layers 118 may be wrapped around or extruded over the opto-electrical cable core 116g, thereby encasing the opto-electrical cable core 116g and forming the opto-electrical cable 100g, as shown in FIG. 22F.

Figure 23:
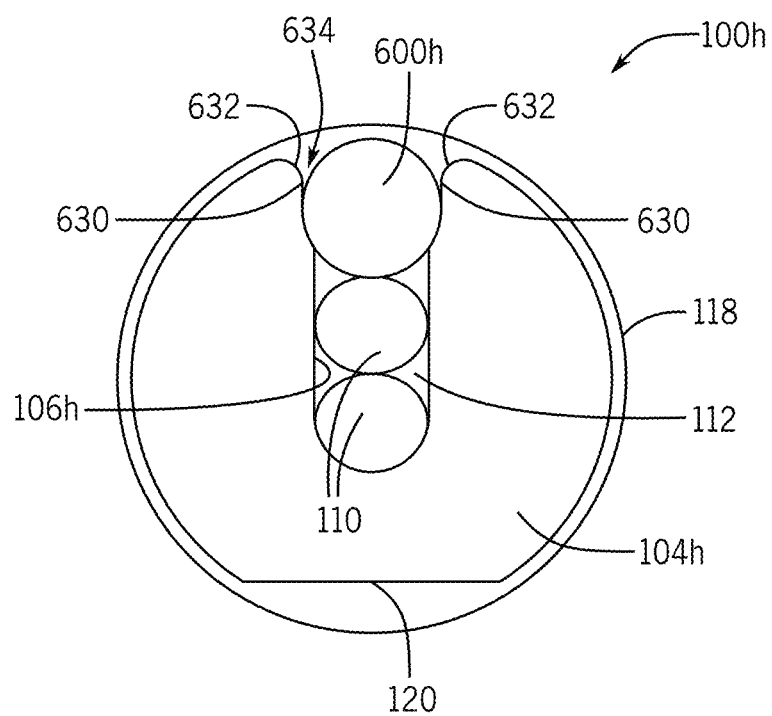
FIG. 23 depicts a cross-sectional view of an opto-electrical cable including a wire having a channel and cap configuration in accordance with certain embodiments of the present disclosure.

FIG. 23 depicts another embodiment of an opto-electrical cable consistent with the present disclosure, referred to herein as an opto-electrical cable 100h. As shown in the illustrated embodiment, the opto-electrical cable 100h includes a base wire 104h and a cap wire 600h. The base wire 104h and the cap wire 600h may each be formed from the same material as the base wire 104g of the opto-electrical cable 100g. In some embodiments, the cap wire 600h may be formed from a metallic material that is softer (e.g., more malleable) than the material used to form the base wire 104g. In certain embodiments, the cap wire 600h may include a single, solid wire. In other embodiments, the cap wire 600h may include a stranded wire made of a plurality of individual wires. Similar to the base wire 104g discussed above, the base wire 104h may include the base 120 that extends along a length of the base wire 104h.

The base wire 104h may include a channel 106h formed therein that extends along a longitudinal axis of the base wire 104h. The channel 106h is configured to receive the one or more optical fibers 110. The filler 112 may be inserted (e.g., injected) into the channel 106h to encase the optical fibers 110 within the channel 106h and to provide protective cushioning for the optical fibers 110. To this end, the filler 112 may isolate the optical fibers 110 from direct, physical contact with the base wire 104h. In certain embodiments, the filler 112 may enable the optical fibers 110 to contact the base wire 104h and/or the cap wire 600h while occupying interstitial spaces (e.g., voids) that may be formed between the optical fibers 110, the base wire 104h, and/or the cap wire 600h. In other embodiments, the filler 112 may be omitted from the channel 106h.

As shown in the illustrated embodiment, the base wire 104h includes a pair of curved mating surfaces 630 that extend between the channel 106h and respective vertices 632 of the base wire 104h. The curved mating surfaces 630 may extend along a length of the base wire 104h and, thus, define a receiving channel 634 of the base wire 104h that may receive and engage with the cap wire 600h. For example, in some embodiments, the cap wire 600h may include a substantially circular cross-sectional shape or a generally oval cross-sectional shape. A profile or radius of curvature of the curved mating surfaces 630 may be formed to receive and engage with an outer profile of the cap wire 600h. That is, the cap wire 600h may be sized to engage with the receiving channel 634 via an interference fit when the cap wire 600h is inserted into the receiving channel 634. Accordingly, such an interference fit between the cap wire 600h and the receiving channel 634 may facilitate coupling the cap wire 600h to the base wire 104h and retaining the cap wire 600h within the receiving channel 634. Additionally or alternatively, suitable adhesives (e.g., bonding glue) and/or metallurgical processes (e.g., welding, brazing) may be used to couple the cap wire 600h to the base wire 104h. In some embodiments, the cap wire 600h, when installed within the receiving channel 634, may form a fluid seal between the channel 106h and an ambient environment surrounding the opto-electrical cable 100h. As such, the cap wire 600h may seal the optical fibers 110 and/or the filler 112 within the channel 106h and may mitigate or substantially eliminate fluid flow through an interface between the cap wire 600h and the base wire 104h.

Similar to the embodiments of the opto-electrical cables discussed above, the opto-electrical cable 100*h* may include the one or more polymer layers 118 (e.g., layers of polymer tape) that encase the base wire 104*h* and the cap wire 600*h*. The polymer layers 118 may be wrapped around or extruded over the assembled base wire 104*h* and cap wire 600*h*. In some embodiments, the polymer layer 118 may facilitate retaining the cap wire 600*h* within the receiving channel 634. Moreover, the polymer layer 118 may facilitate forming a fluid seal between the channel 106*h* and an ambient environment surrounding the opto-electrical cable 100*h*. To this end, the polymer layer 118 may facilitate blocking intrusion of foreign matter into the channel 106*h*.

Figure 23A:
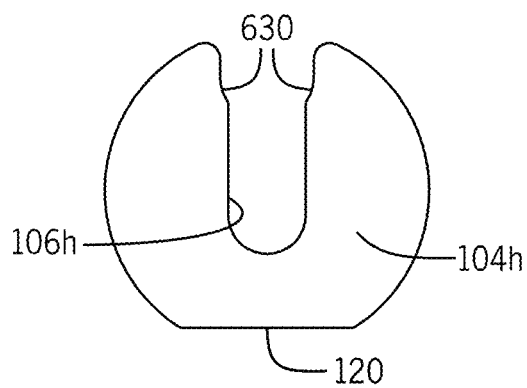
FIGS. 23A-23F depict cross-sectional views showing manufacture of the opto-electrical cable of FIG. 23 in accordance with certain embodiments of the present disclosure.
Figure 23B:
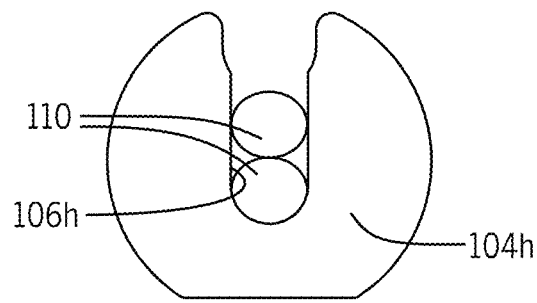
Figure 23C:
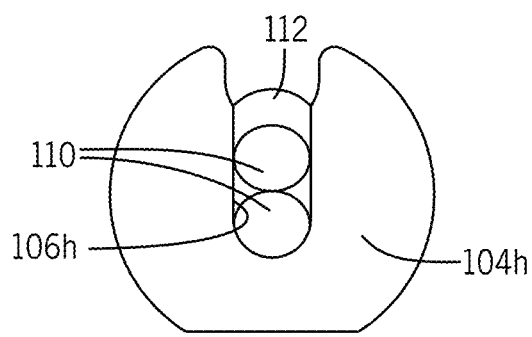
Figure 23D:
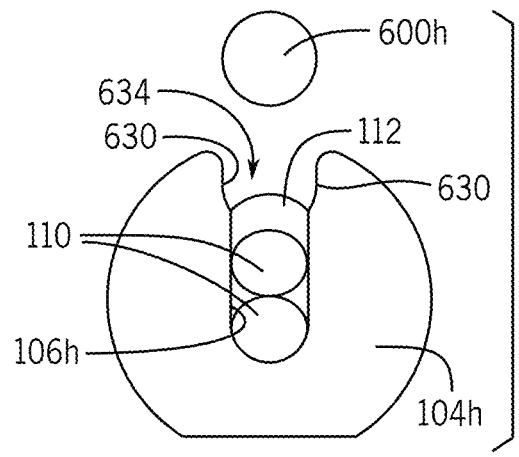
Figure 23E:
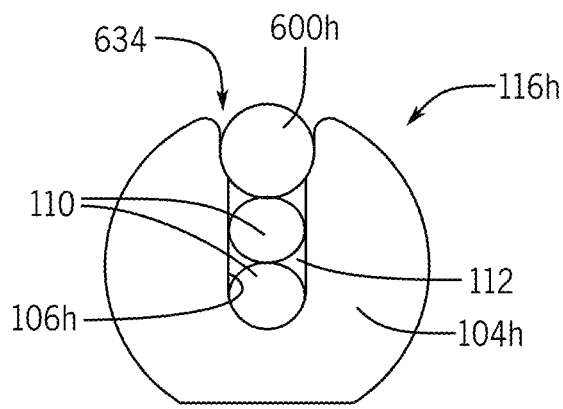
Figure 23F:
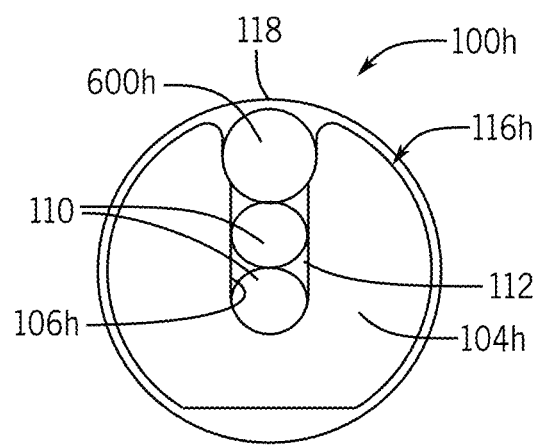

FIGS. 23A-23F depict various steps of manufacturing the opto-electrical cable 100*h* in accordance with the techniques discussed herein. For example, to assemble the opto-electrical cable 100*h*, the base wire 104*h* may first be extruded or otherwise machined to include the features discussed above, such as the base 120, the channel 106*h*, and the curved mating surfaces 630, as shown in FIG. 23A. The one or more optical fibers 110 may be placed within the channel 106*h*, as shown in FIG. 23B. The filler 112 may be placed into the channel 106*h* to encase the optical fibers 110 within the channel 106*h*, as shown in FIG. 23C. The cap wire 600*h* may be extruded or otherwise machined to include a particular cross-sectional shape or geometry (e.g., a circular cross-sectional shape), as shown in FIG. 23D. The cap wire 600*h* may be inserted into the receiving channel 634 and coupled with the base wire 104*h* (e.g., via an interference fit, adhesives, and/or a metallurgical process) to enclose the channel 106*h*. That is, the cap wire 600*h* may encapsulate the optical fibers 110 and the filler 112 within the channel 106*h* to form an opto-electrical cable core 116*h*, as shown in FIG. 23E. For clarity, it should be understood that the opto-electrical cable core 116*h* may include the base wire 104*h*, the cap wire 600*h*, the one or more optical fibers 110, and the filler 112. The one or more polymer layers 118 may be wrapped around or extruded over the opto-electrical cable core 116*h*, thereby encasing the opto-electrical cable core 116*h* and forming the opto-electrical cable 100*h*, as shown in FIG. 23F.

Figure 24:
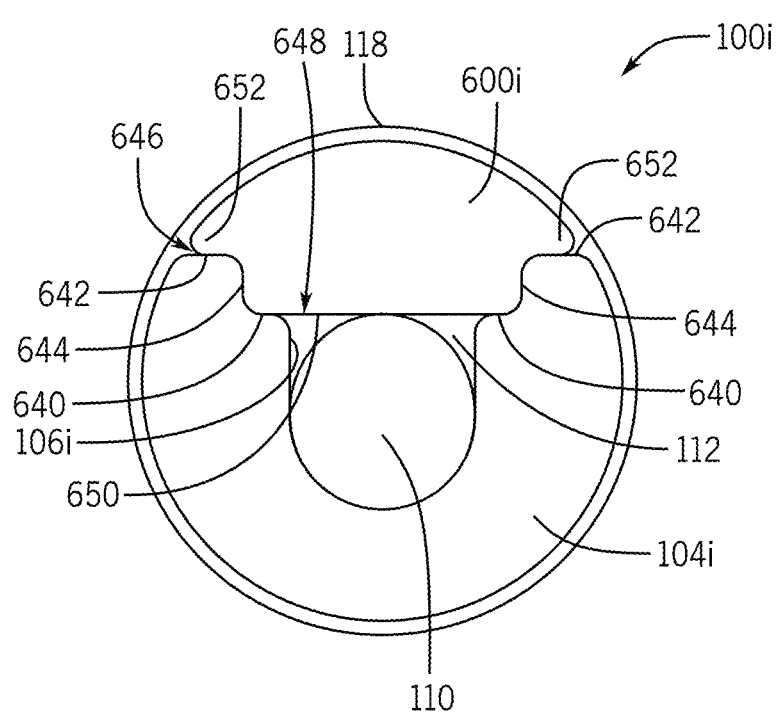
FIG. 24 depicts a cross-sectional view of an opto-electrical cable including a wire having a channel and cap configuration in accordance with certain embodiments of the present disclosure.

FIG. 24 depicts another embodiment of an opto-electrical cable consistent with the present disclosure, referred to herein as an opto-electrical cable 100*i*. As shown in the illustrated embodiment, the opto-electrical cable 100*i* includes a base wire 104*i* and a cap wire 600*i*. The base wire 104*i* and the cap wire 600*i* may each be formed from the same material as the base wire 104*h* of the opto-electrical cable 100*h*. In the illustrated embodiment, the base wire 104*i* does not include the base 120. However, it should be understood that, in other embodiments, the base wire 104*i* may include the base 120.

The base wire 104*i* may include a channel 106*i* formed therein that extends along a longitudinal axis of the base wire 104*i*. The channel 106*i* is configured to receive the one or more optical fibers 110. The filler 112 may be inserted (e.g., injected) into the channel 106*i* to encase the optical fibers 110 within channel 106*i* and to provide protective cushioning for the optical fibers 110. That is, as similarly discussed above, the filler 112 may isolate the optical fibers 110 from direct, physical contact with the base wire 104*i*. In certain embodiments, the filler 112 may enable the optical fibers 110 to contact the base wire 104*i* and/or the cap wire 600*i* while occupying interstitial spaces (e.g., voids) that may be formed between the optical fibers 110, the base wire 104*i*, and/or the cap wire 600*i*. In other embodiments, the filler 112 may be omitted from the channel 106*i*.

In the illustrated embodiment, the base wire 104*i* includes a first set of base wire mating surfaces 640 and a second set of base wire mating surfaces 642 that may extend longitudinally along a length of the base wire 104*i*. The first set of base wire mating surfaces 640 may be positioned along opposing sides of the channel 106*i* and may be offset (e.g., with respect to a central axis of the base wire 104*i*) from the second set of base wire mating surfaces 642. In particular, respective intermediate surfaces 644 may extend between the first and second sets of base wire mating surfaces 640, 642. In some embodiments, the first and second sets of base wire mating surfaces 640, 642 and the intermediate surfaces 644 may include substantially planar surfaces. In certain embodiments, the intermediate surfaces 644 may extend generally orthogonal to or transverse to the first and second sets of base wire mating surfaces 640, 642. In any case, the first set of base wire mating surfaces 642 and the intermediate surfaces 644 may collectively define a mating groove 646 that may extend longitudinally along the length of the base wire 104*i*. The cap wire 600*i* includes a mating tab 648 having a mating surface 650 (e.g., a substantially planar surface) that may rest on and/or engage with the first set of base wire mating surfaces 640 when the mating tab 648 is inserted into the mating groove 646. As shown in the illustrated embodiment, the cap wire 600*i* may include mating protrusions 652 that extend from the mating tab 648 and engage with the second set of base wire mating surfaces 642 when the mating tab 648 is inserted into the mating groove 646. In this manner, the mating tab 648 and the mating protrusions 652 may cooperatively facilitate force transfer (e.g., transfer of compressive forces) to the base wire 104*i*. In some embodiments, an interference fit between the mating tab 648 and the mating groove 646 may facilitate coupling the cap wire 600*i* to the base wire 104*i*. Additionally or alternatively, suitable adhesives (e.g., bonding glue) and/or metallurgical processes (e.g., welding, brazing) may be used to couple the cap wire 600*i* to the base wire 104*i*. In certain embodiments, the cap wire 600*i*, when installed on the mating groove 646, may form a fluid seal between the channel 106*i* and an ambient environment surrounding the opto-electrical cable 100*i*. As such, the cap wire 600*i* may seal the optical fibers 110 and/or the filler 112 within the channel 106*i* and may mitigate or substantially eliminate fluid flow through an interface between the cap wire 600*i* and the base wire 104*i*.

Similar to the embodiments of the opto-electrical cables discussed above, the opto-electrical cable 100*i* may include the one or more polymer layers 118 (e.g., layers of polymer tape) that encase the base wire 104*i* and the cap wire 600*i*. The polymer layers 118 may be wrapped around or extruded over the assembled base wire 104*i* and cap wire 600*i*. In some embodiments, the polymer layer 118 may facilitate retaining the cap wire 600*i* in an engaged configuration with the mating groove 646. Moreover, the polymer layer 118 may facilitate forming a fluid seal between the channel 106*i* and an ambient environment surrounding the opto-electrical cable 100*i*. To this end, the polymer layer 118 may facilitate blocking intrusion of foreign matter into the channel 106*i*.

Figure 24A:
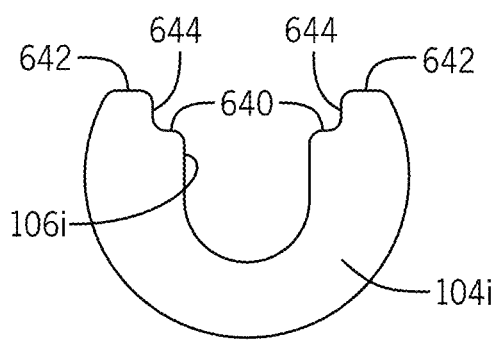
FIGS. 24A-24F depict cross-sectional views showing manufacture of the opto-electrical cable of FIG. 24 in accordance with certain embodiments of the present disclosure.
Figure 24B:
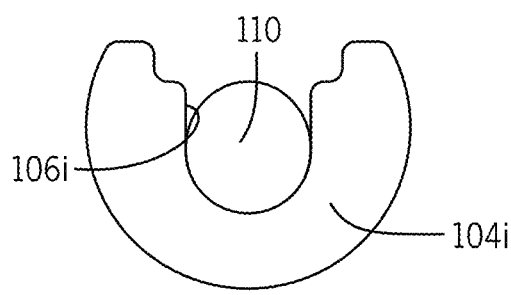

FIGS. 24A-24F depict various steps of manufacturing the opto-electrical cable 100*i* in accordance with the techniques discussed herein. For example, to assemble the opto-electrical cable 100*i*, the base wire 104*i* may first be extruded or otherwise machined to include the features discussed above, such as the first and second sets of base wire mating surfaces 640, 642, the intermediate surfaces 644, and the channel 106*i*, as shown in FIG. 24A. The one or more optical fibers 110 may be placed within channel 106*i*, as shown in FIG.

Figure 24C:
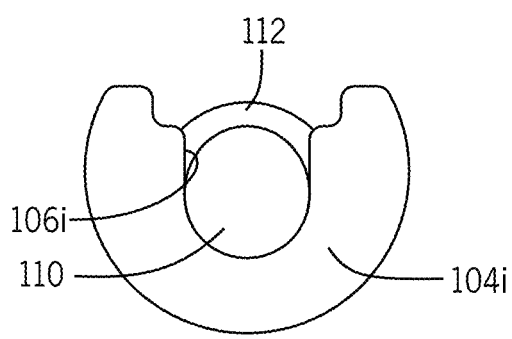
Figure 24D:
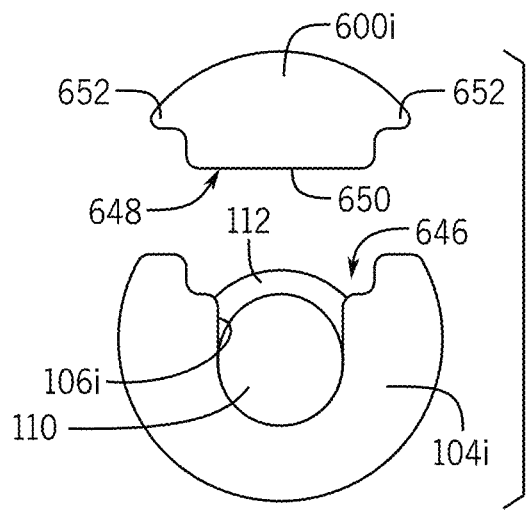
Figure 24E:
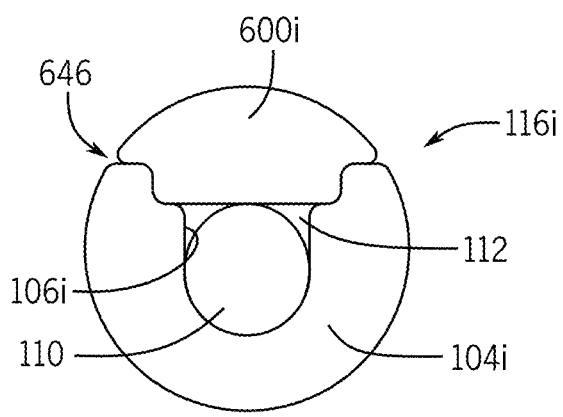
Figure 24F:
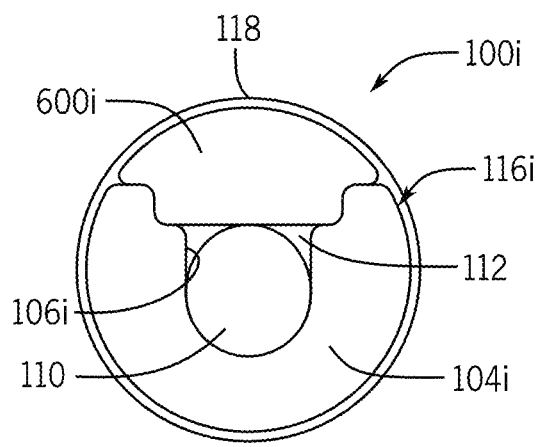

24B. The filler 112 may be placed into channel 106*i* to encase the optical fibers 110 within the channel 106*i*, as shown in FIG. 24C. The cap wire 600*i* may be extruded or otherwise machined to include the features discussed above, such as the mating tab 648 and the mating protrusions 652, as shown in FIG. 24D. The mating tab 648 may be inserted into the mating groove 646 and coupled with the base wire 104*i* (e.g., via an interference fit, adhesives, and/or a metallurgical process) to enclose the channel 106*i*. That is, the cap wire 600*i* may encapsulate the optical fibers 110 and the filler 112 within the channel 106*i* to form an opto-electrical cable core 116*i*, as shown in FIG. 24E. For clarity, it should be understood that the opto-electrical cable core 116*i* may include the base wire 104*i*, the cap wire 600*i*, the one or more optical fibers 110, and the filler 112. The one or more polymer layers 118 may be wrapped around or extruded over the opto-electrical cable core 116*i*, thereby encasing the opto-electrical cable core 116*i* and forming the opto-electrical cable 100*i*, as shown in FIG. 24F.

Figure 25:
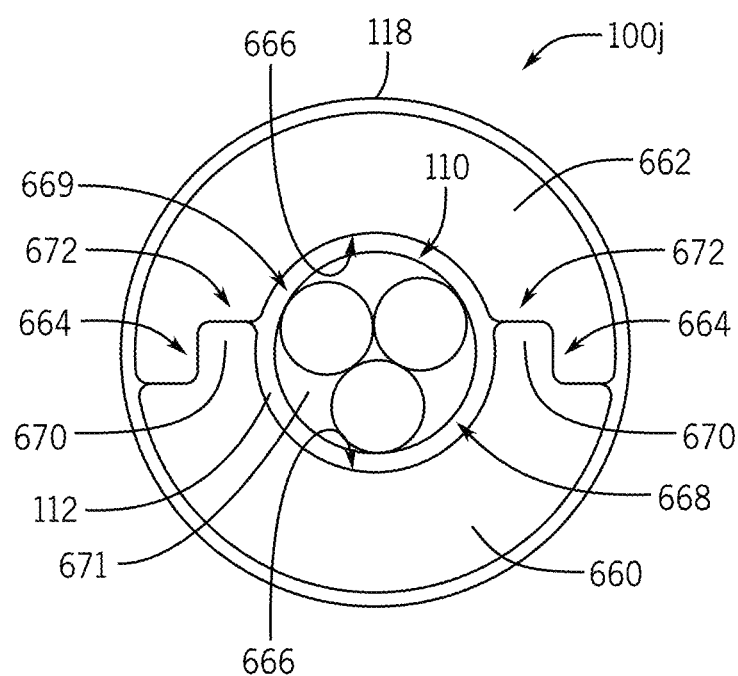
FIG. 25 depicts a cross-sectional view of an opto-electrical cable including base wires having stepped mating interfaces in accordance with certain embodiments of the present disclosure.

FIG. 25 depicts another embodiment of an opto-electrical cable consistent with the present disclosure, referred to herein as an opto-electrical cable 100*j*. As shown in the illustrated embodiment, the opto-electrical cable 100*j* includes a first base wire 660 (e.g., a first arcuate base wire) and a second base wire 662 (e.g., a second arcuate base wire) that are engageable with one another at respective mating interfaces 664 to form an annular wire member. The first and second base wires 660, 662 may each be formed from the same material as the base wire 104*i* of the opto-electrical cable 100*i* discussed above. In the illustrated embodiment, the first and second base wires 660, 662 do not include the base 120. However, it should be understood that, in other embodiments, the first base wire 660, the second base wire 662, or both, may include a respective base 120.

As shown in the illustrated embodiment, the first and second base wires 660, 662 may each be a generally semi-circular piece of material (e.g., metallic wire) having a channel 666 formed therein. The channels 666 of the first and second base wires 660, 662 may receive the one or more optical fibers 110 such that, in an assembled configuration of the first and second base wires 660, 662, the optical fibers 110 are encased within a central tunnel 668 (e.g., a tunnel formed by the channels) of the opto-electrical cable 100*j*. In the illustrated embodiment, the opto-electrical cable 100*j* includes three optical fibers 110 that may collectively form an optical microbundle 669. In some embodiments, a casing or jacket 671 may be disposed about (e.g., extruded about) the optical microbundle 669. It should be appreciated that, in other embodiments, the optical microbundle 669 may include 1, 2, 3, 4, 5 or more than five optical fibers 110.

The filler 112 may be inserted (e.g., injected) into the central tunnel 668 to encase the optical fibers 110 within the central tunnel 668 and to provide protective cushioning for the optical fibers 110. That is, as similarly discussed above, the filler 112 may isolate the optical fibers 110 from direct, physical contact with the first and second base wires 660, 662. In certain embodiments, the filler 112 may enable the optical fibers 110 to contact the first and second base wires 660, 662 while occupying interstitial spaces (e.g., voids) that may be formed between the optical fibers 110 and the first and second base wires 660, 662. In other embodiments, the filler 112 may be omitted from the central tunnel 668.

In the illustrated embodiment, the mating interfaces 664 of the first and second base wires 660, 662 each include a generally stepped geometry. Particularly, the mating interfaces 664 (e.g., a first set of mating interfaces) of the first base wire 660 include respective protrusions 670 that are engageable with respective notches 672 formed within the mating interfaces 664 (e.g., a second set of mating interfaces) of the second base wire 662. However, as discussed below, the mating interfaces 664 of the first and second base wires 660, 662 may include any other suitable profile or geometry that facilitates engagement between the first and second base wires 660, 662. It should be appreciated that the stepped geometry of the mating interfaces 664 may, in an assembled configuration of the opto-electrical cable 100*j*, bock lateral movement of the first base wire 660 relative to the second base wire 662 and, as a result, reducing or substantially eliminate the occurrence of milking.

In some embodiments, an interference fit between the mating interfaces 664 may facilitate coupling the first and second base wires 660, 662 to one another. Additionally or alternatively, suitable adhesives (e.g., bonding glue) and/or metallurgical processes (e.g., welding, brazing) may be used to couple the first base wire 660 to the second base wire 662 at the mating interfaces 664. In certain embodiments, the mating interfaces 664 may form a fluid seal between the central tunnel 668 and an ambient environment surrounding the opto-electrical cable 100*j* when the first and second base wires 660, 662 are coupled to one another. As such, the first and second base wires 660, 662 may cooperate to seal the optical fibers 110 and/or the filler 112 within the central tunnel 668 and may mitigate or substantially eliminate fluid flow through an interface (e.g., a boundary) between the first and second base wires 660, 662.

Similar to the embodiments of the opto-electrical cables discussed above, the opto-electrical cable 100*j* may include the one or more polymer layers 118 (e.g., layers of polymer tape) that may be wrapped around or extruded over the assembled first and second base wires 660, 662. In some embodiments, the polymer layer 118 may facilitate retaining the first base wire 660 and the second base wire 662 in an engaged configuration (e.g., an assembled configuration) with one another. Moreover, the polymer layer 118 may facilitate forming a fluid seal between the central tunnel 668 an ambient environment surrounding the opto-electrical cable 100*j*. To this end, the polymer layer 118 may facilitate blocking intrusion of foreign matter into the central tunnel 668.

Figure 25A:
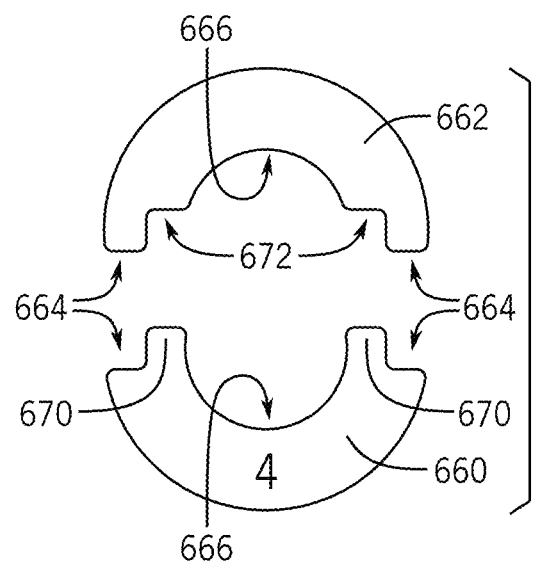
FIGS. 25A-25D depict cross-sectional views showing manufacture of the opto-electrical cable of FIG. 25 in accordance with certain embodiments of the present disclosure.
Figure 25B:
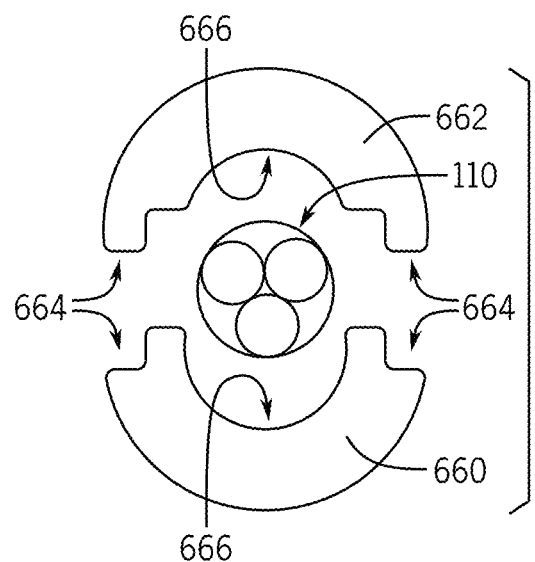
Figure 25C:
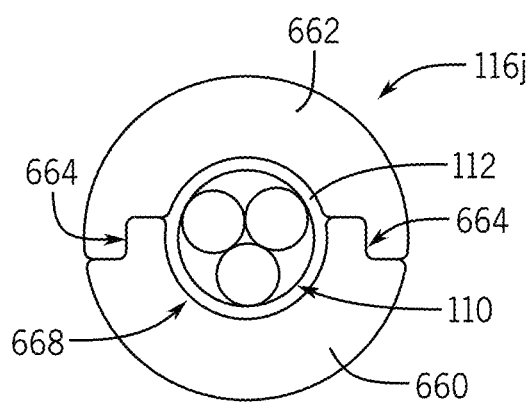
Figure 25D:
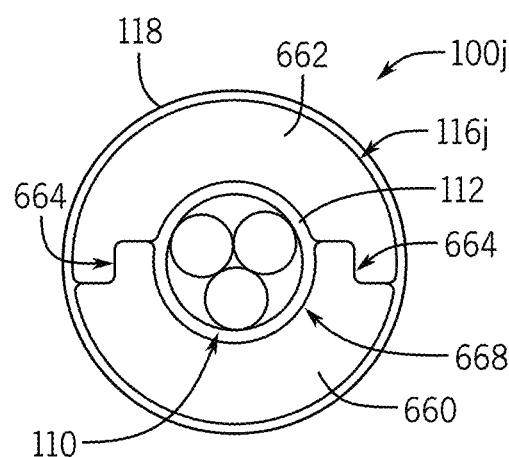

FIGS. 25A-25D depict various steps of manufacturing the opto-electrical cable 100*j* in accordance with the techniques discussed herein. For example, to assemble the opto-electrical cable 100*j*, the first base wire 660 and the second base wire 662 may first be extruded or otherwise machined to include the corresponding features discussed above, such as the channels 666, the protrusions 670, and the notches 672, as shown in FIG. 25A. The one or more optical fibers 110 may be placed between the first and second base wires 660, 662 (e.g., within one of the channels 666), as shown in FIG. 25B. In some embodiments, during engagement of the first base wire 660 with the second base wire 662 (e.g., to form the central tunnel 668), the filler 112 may be injected into the central tunnel 668 to encase the optical fibers 110 within the central tunnel 668, as shown in FIG. 25C. The first and second base wires 660, 662 may encapsulate the optical fibers 110 and the filler 112 within the central tunnel 668 to form an opto-electrical cable core 116*j*. For clarity, it should be understood that the opto-electrical cable core 116*j* may include the first base wire 660, the second base wire 662, the one or more optical fibers 110, and the filler 112. The one or more polymer layers 118 may be wrapped around or extruded over the opto-electrical cable core 116*j*, thereby encasing the opto-electrical cable core 116*j* and forming the opto-electrical cable 100*j*, as shown in FIG. 25D.

Figure 26:
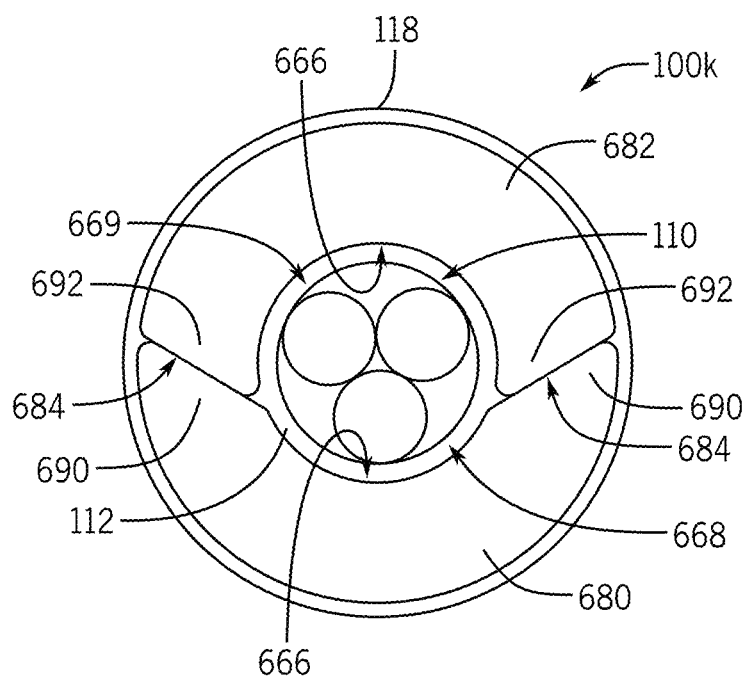
FIG. 26 depicts a cross-sectional view of an opto-electrical cable including base wires having inclined mating interfaces in accordance with certain embodiments of the present disclosure.

FIG. 26 depicts another embodiment of an opto-electrical cable consistent with the present disclosure, referred to herein as an opto-electrical cable 100k. As shown in the illustrated embodiment, the opto-electrical cable 100k includes a first base wire 680 (e.g., a first arcuate base wire) and a second base wire 682 (e.g., a second arcuate base wire) that are engageable with one another at respective mating interfaces 684. The first and second base wires 680, 682 may each be formed from the same material as the first and second base wires 660, 662 of the opto-electrical cable 100j discussed above. In the illustrated embodiment, the first and second base wires 680, 682 do not include the base 120. However, it should be understood that, in other embodiments, the first base wire 680, the second base wire 682, or both, may include a respective base 120.

As shown in the illustrated embodiment, the first and second base wires 680, 682 may each be a generally semi-circular piece of material (e.g., metallic wire) having the channel 666 formed therein. The channels 666 of the first and second base wires 680, 682 may receive the one or more optical fibers 110 (e.g., the optical microbundle 669) such that, in an assembled configuration of the first and second base wires 680, 682, the optical fibers 110 are encased within the central tunnel 668 (e.g., a tunnel formed by the channels 666) of the opto-electrical cable 100k. The filler 112 may be inserted (e.g., injected) into the central tunnel 668 to encase the optical fibers 110 within the central tunnel 668 and to provide protective cushioning for optical fibers 110. That is, as similarly discussed above, the filler 112 may isolate the optical fibers 110 from direct, physical contact with the first and second base wires 680, 682. In certain embodiments, the filler 112 may enable the optical fibers 110 to contact the first and second base wires 680, 682 while occupying interstitial spaces (e.g., voids) that may be formed between the optical fibers 110 and the first and second base wires 680, 682. In other embodiments, the filler 112 may be omitted from the central tunnel 668.

In the illustrated embodiment, the mating interfaces 684 of the first and second base wires 680, 682 each include a generally inclined or wedge-shaped geometry. Particularly, the mating interfaces 684 of the first base wire 680 include included protrusions 690 that are engageable with respective declined protrusions 692 formed within the mating interfaces 684 of the second base wire 682. However, as discussed below, the mating interfaces 684 of the first and second base wires 680, 682 may include any other suitable profile or geometry that facilitates engagement between the first and second base wires 680, 682. It should be appreciated that the wedge-shaped geometries of the mating interfaces 664 may, in an assembled configuration of the opto-electrical cable 100k, bock lateral movement of the first base wire 680 relative to the second base wire 682 and, as a result, reducing or substantially eliminate the occurrence of milking.

In some embodiments, suitable adhesives (e.g., bonding glue) and/or metallurgical processes (e.g., welding, brazing) may be used to couple the first base wire 680 to the second base wire 682 at the mating interfaces 684. In certain embodiments, the mating interfaces 684 may form a fluid seal between the central tunnel 668 and an ambient environment surrounding the opto-electrical cable 100k when the first and second base wires 680, 682 are coupled to one another. As such, the first and second base wires 680, 682 may cooperate to seal the optical fibers 110 and/or the filler 112 within the central tunnel 668 and may mitigate or substantially eliminate fluid flow through an interface (e.g., a boundary) between the first and second base wires 680, 682.

Similar to the embodiments of the opto-electrical cables discussed above, the opto-electrical cable 100k may include the one or more polymer layers 118 (e.g., layers of polymer tape) that may be wrapped around or extruded over the assembled first and second base wires 680, 682. In some embodiments, the polymer layer 118 may facilitate retaining the first base wire 680 and the second base wire 682 in an engaged configuration (e.g., an assembled configuration) with one another. Moreover, the polymer layer 118 may facilitate forming a fluid seal between the central tunnel 668 an ambient environment surrounding the opto-electrical cable 100k. To this end, the polymer layer 118 may facilitate blocking intrusion of foreign matter into the central tunnel 668.

Figure 26A:
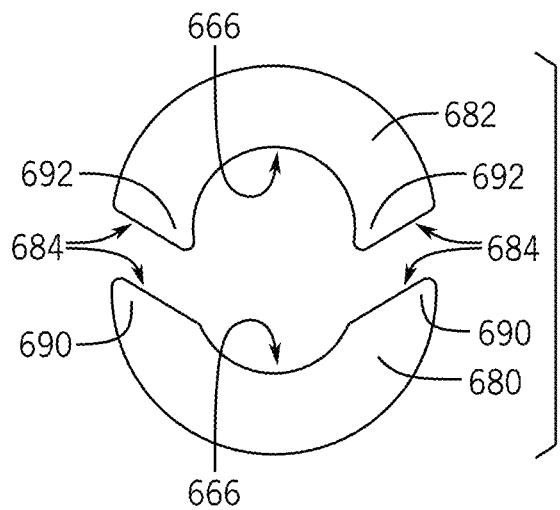
FIGS. 26A-26D depict cross-sectional views showing manufacture of the opto-electrical cable of FIG. 26 in accordance with certain embodiments of the present disclosure.
Figure 26B:
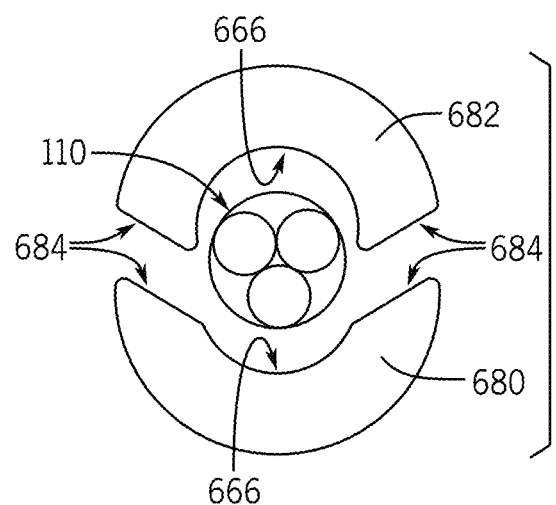
Figure 26C:
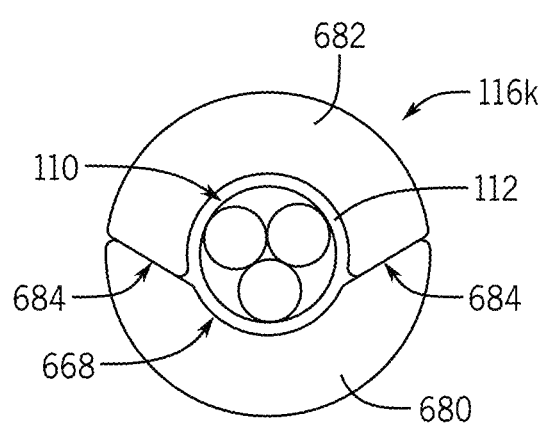
Figure 26D:
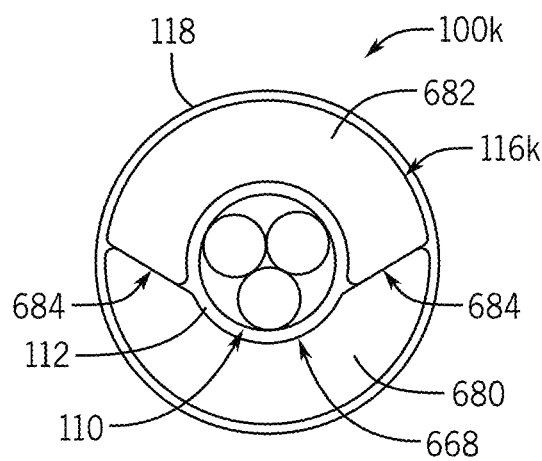

FIGS. 26A-26D depict various steps of manufacturing the opto-electrical cable 100k in accordance with the techniques discussed herein. For example, to assemble the opto-electrical cable 100k, the first base wire 680 and the second base wire 682 may first be extruded or otherwise machined to include the corresponding features discussed above, such as the channels 666, the inclined protrusions 690, and the declined protrusions 692, as shown in FIG. 26A. The one or more optical fibers 110 may be placed between the first and second base wires 680, 682 (e.g., within one of the channels 666), as shown in FIG. 26B. In some embodiments, during engagement of the first base wire 680 with the second base wire 682 (e.g., to form the central tunnel 668), the filler 112 may be injected into the central tunnel 668 to encase the optical fibers 110 within the central tunnel 668, as shown in FIG. 26C. The first and second base wires 680, 682 may encapsulate the optical fibers 110 and the filler 112 within the central tunnel 668 to form an opto-electrical cable core 116k. For clarity, it should be understood that the opto-electrical cable core 116k may include the first base wire 680, the second base wire 682, the one or more optical fibers 110, and the filler 112. The one or more polymer layers 118 may be wrapped around or extruded over the opto-electrical cable core 116k, thereby encasing the opto-electrical cable core 116k and forming the opto-electrical cable 100k, as shown in FIG. 26D.

Figure 27:
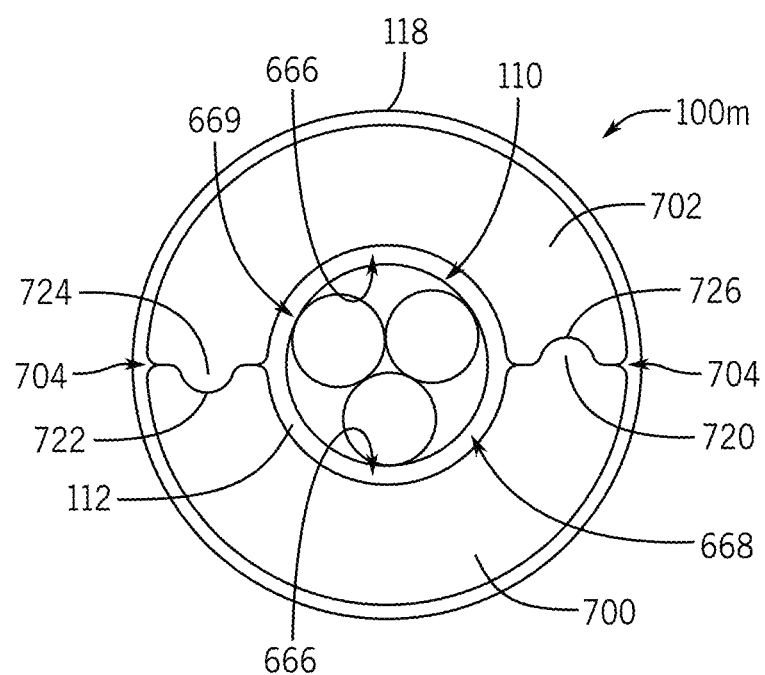
FIG. 27 depicts a cross-sectional view of an opto-electrical cable including base wires having keyed mating interfaces in accordance with certain embodiments of the present disclosure.

FIG. 27 depicts another embodiment of an opto-electrical cable consistent with the present disclosure, referred to herein as an opto-electrical cable 100m. As shown in the illustrated embodiment, the opto-electrical cable 100m includes a first base wire 700 (e.g., a first arcuate base wire) and a second base wire 702 (e.g., a second arcuate base wire) that are engageable with one another at respective mating interfaces 704 (e.g., keyed mating interfaces). The first and second base wires 700, 702 may each be formed from the same material as the first and second base wires 680, 682 of the opto-electrical cable 100k discussed above. In the illustrated embodiment, the first and second base wires 700, 702 do not include the base 120. However, it should be understood that, in other embodiments, the first base wire 700, the second base wire 702, or both, may include a respective base 120.

As shown in the illustrated embodiment, the first and second base wires 680, 682 may each be a generally semi-circular piece of material (e.g., metallic wire) having the channels 666 formed therein. The channels 666 of the first and second base wires 680, 682 may receive the one or more optical fibers 110 (e.g., the optical microbundle 669) such that, in an assembled configuration of the first and second base wires 680, 682, the optical fibers 110 are encased within the central tunnel 668 (e.g., a tunnel formed by the channels 666) of the opto-electrical cable 100k. The filler 112 may be inserted (e.g., injected) into the central tunnel 668 to encase the optical fibers 110 within the central tunnel 668 and to provide protective cushioning for the optical fibers 110. That is, as similarly discussed above, the filler 112 may isolate the optical fibers 110 from direct, physical contact with the first and second base wires 700, 702. In certain embodiments, the filler 112 may enable the optical fibers 110 to contact the first and second base wires 700, 702 while occupying interstitial spaces (e.g., voids) that may be formed between the optical fibers 110 and the first and second base wires 700, 702. In other embodiments, the filler 112 may be omitted from the central tunnel 668.

In the illustrated embodiment, one of the mating interfaces 704 of the first base wire 700 includes a first protrusion 720 (e.g., a first key) and another of the mating interfaces 704 of the first base wire 700 includes a first groove 722 (e.g., a first receiver). One of the mating interfaces 704 of the second base wire 702 includes a second protrusion 724 (e.g., a second key) and another of the mating interfaces 704 of the second base wire 702 includes a second groove 726 (e.g., a second receiver). The first and second protrusions 720, 724 engage with the second and first grooves 726, 722, respectively, in an assembled configuration of the first and second base wires 700, 702. It should be appreciated that interlocking of the first protrusion 720 with the second groove 726, and interlocking of the second protrusion 724 with the first groove 722, may bock lateral movement of the first base wire 700 relative to the second base wire 702 and, as a result, reducing or substantially eliminate the occurrence of milking. Moreover, it should be understood that, in some embodiments, the first and second base wires 700, 702 may be self-similar, interchangeable components. For example, in such embodiments, the first base wire 700 may be used interchangeably with the second base wire 702, and vice versa. Further, in certain embodiments, the first base wire 700 may include both the first protrusion 720 and the second protrusion 724, while the second base wire 702 includes both the first groove 722 and the second groove 726.

In some embodiments, suitable adhesives (e.g., bonding glue) and/or metallurgical processes (e.g., welding, brazing) may be used to couple the first base wire 700 to the second base wire 702 at the mating interfaces 704. In certain embodiments, the mating interfaces 704 may form a fluid seal between the central tunnel 668 and an ambient environment surrounding the opto-electrical cable 100m when the first and second base wires 700, 702 are coupled to one another. As such, the first and second base wires 700, 702 may cooperate to seal the optical fibers 110 and/or the filler 112 within the central tunnel 668 and may mitigate or substantially eliminate fluid flow through an interface (e.g., a boundary) between the first and second base wires 700, 702.

Similar to the embodiments of the opto-electrical cables discussed above, the opto-electrical cable 100m may include the one or more polymer layers 118 (e.g., layers of polymer tape) that may be wrapped around or extruded over the assembled first and second base wires 700, 702. In some embodiments, the polymer layer 118 may facilitate retaining the first base wire 700 and the second base wire 702 in an engaged configuration (e.g., an assembled configuration) with one another. Moreover, the polymer layer 118 may facilitate forming a fluid seal between the central tunnel 668 an ambient environment surrounding the opto-electrical cable 100m. To this end, the polymer layer 118 may facilitate blocking intrusion of foreign matter into the central tunnel 668.

Figure 27A:
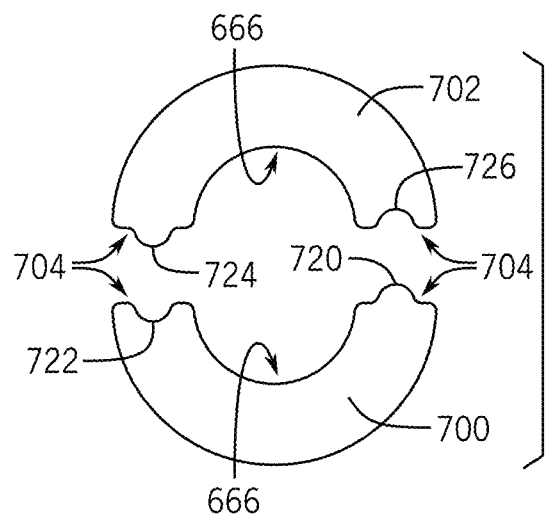
FIGS. 27A-27D depict cross-sectional views showing manufacture of the opto-electrical cable of FIG. 27 in accordance with certain embodiments of the present disclosure.
Figure 27B:
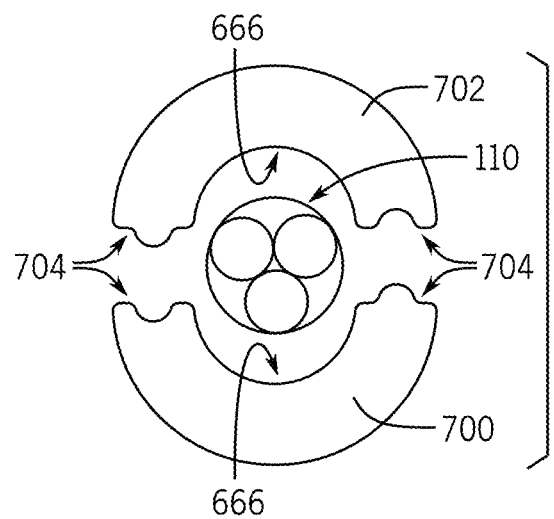
Figure 27C:
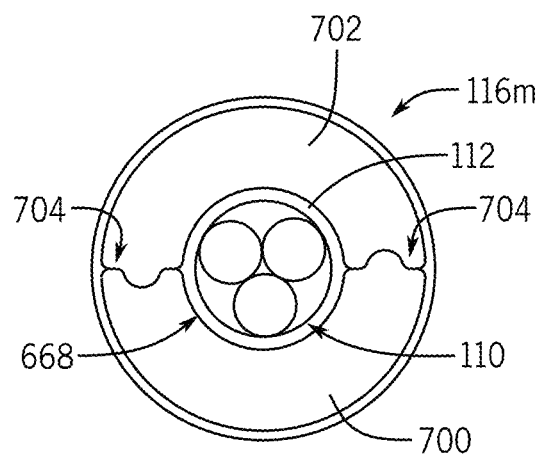
Figure 27D:
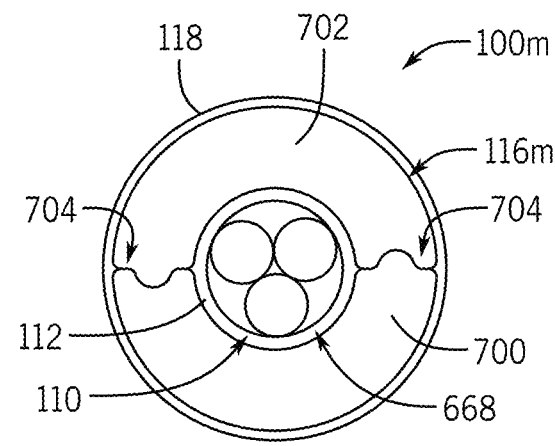

FIGS. 27A-27D depict various steps of manufacturing the opto-electrical cable 100m in accordance with the techniques discussed herein. For example, to assemble the opto-electrical cable 100m, the first base wire 700 and the second base wire 702 may first be extruded or otherwise machined to include the corresponding features discussed above, such as the channels 666, the first and second protrusions 720, 724, and the first and second grooves 722, 726, as shown in FIG. 27A. The one or more optical fibers 110 may be placed between the first and second base wires 700, 702 (e.g., within one of the channels 666), as shown in FIG. 27B. In some embodiments, during engagement of the first base wire 700 with the second base wire 702 (e.g., to form the central tunnel 668), the filler 112 may be injected into the central tunnel 668 to encase the optical fibers 110 within the central tunnel 668, as shown in FIG. 27C. The first and second base wires 700, 702 may encapsulate the optical fibers 110 and the filler 112 within the central tunnel 668 to form an opto-electrical cable core 116m. For clarity, it should be understood that the opto-electrical cable core 116m may include the first base wire 700, the second base wire 702, the one or more optical fibers 110, and the filler 112. The one or more polymer layers 118 may be wrapped around or extruded over the opto-electrical cable core 116m, thereby encasing the opto-electrical cable core 116 m and forming the opto-electrical cable 100m, as shown in FIG. 27D.

Figure 28:
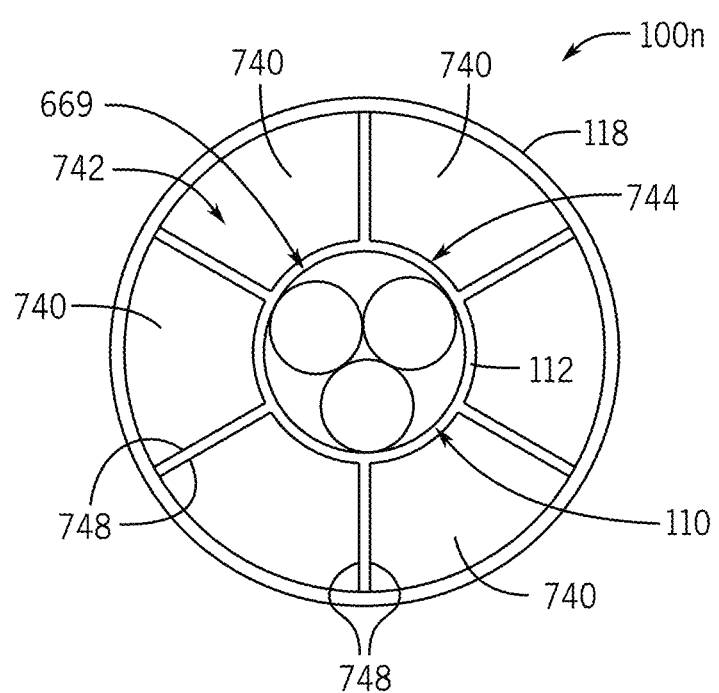
FIG. 28 depicts a cross-sectional view of an opto-electrical cable including an annular wire member having a plurality of arch-profile wires in accordance with certain embodiments of the present disclosure.

FIG. 28 depicts another embodiment of an opto-electrical cable consistent with the present disclosure, referred to herein as an opto-electrical cable 100n. The opto-electrical cable 100n includes a plurality of arch-profile wires 740 that are engageable with one another to form an annular wire member 742. In particular, the arch-profile wires 740 may be cabled helically along a length of the opto-electrical cable 100n. However, in other embodiments, the arch-profile wires 740 may extend longitudinally along the length of the opto-electrical cable 100n (e.g., substantially parallel to a central axis of the opto-electrical cable 100n) or may extend along the length of the opto-electrical cable 100n in any other suitable manner. Each of the arch-profile wires may be formed from the same material as the first and second base wires 700, 702 of the opto-electrical cable 100m discussed above.

As shown in the illustrated embodiment, in an assembled configuration of the arch-profile wires 740, such as when the arch-profile wires 740 are helically cabled together to form the annular wire member 742, the arch-profile wires 740 define a tunnel 744 that may extend along a length of the annular wire member 742. Indeed, it should be understood that, during manufacture of the annular wire member 742, the arch-profile wires 740 may be helically cabled about the one or more optical fibers 110 (e.g., the optical microbundle 669) to encase the optical fibers 110 within the tunnel 744. The filler 112 may be inserted (e.g., injected) into the tunnel 744 during or subsequent to helical cabling of the arch-profile wires 740. Accordingly, the filler 112 may encase the optical fibers 110 within the tunnel 744. As such, the filler 112 may provide protective cushioning for the optical fibers 110 and may isolate the optical fibers 110 from direct, physical contact with the arch-profile wires 740. In certain embodiments, the filler 112 may enable the optical fibers 110 to contact the arch-profile wires 740 while occupying interstitial spaces (e.g., voids) that may be formed between the optical fibers 110 and the arch-profile wires 740. In other embodiments, the filler 112 may be omitted from the tunnel 744.

In some embodiments, suitable adhesives (e.g., bonding glue) and/or metallurgical processes (e.g., welding, brazing) may be used to couple the arch-profile wires 740 to one another to form the annular wire member 742. In certain embodiments, respective lateral surfaces 748 of the arch-profile wires 740 may engage with one another, in the assembled configuration of the annular wire member 742, to form a fluid seal between the tunnel 744 and an ambient environment surrounding the opto-electrical cable 100n. In some embodiments, a layer of the filler 112 may be disposed between adjacent ones of the lateral surfaces 748. As such, the plurality of arch-profile wire 740 may cooperate to seal the optical fibers 110 and/or the filler 112 within the tunnel 744 and may mitigate or substantially eliminate fluid flow through an interface (e.g., a boundary) between the arch-profile wires 740.

Similar to the embodiments of the opto-electrical cables discussed above, the opto-electrical cable 100n may include the one or more polymer layers 118 (e.g., layers of polymer tape) that may be wrapped around or extruded over the annular wire member 742. In some embodiments, the polymer layer 118 may facilitate retaining the arch-profile wires 740 in an engaged configuration (e.g., an assembled configuration) with one another. Moreover, the polymer layer 118 may facilitate forming a fluid seal between the tunnel 744 and an ambient environment surrounding the opto-electrical cable 100n. To this end, the polymer layer 118 may facilitate blocking intrusion of foreign matter into the tunnel 744.

Figure 28A:
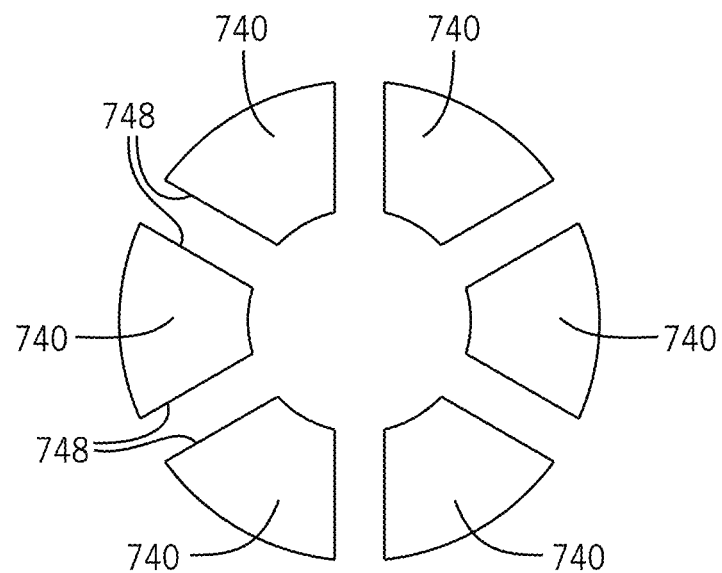
FIGS. 28A-28D depict cross-sectional views showing manufacture of the opto-electrical cable of FIG. 28 in accordance with certain embodiments of the present disclosure.
Figure 28B:
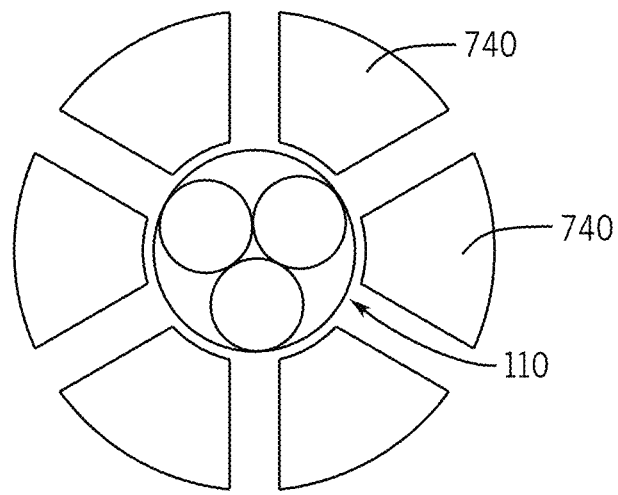
Figure 28C:
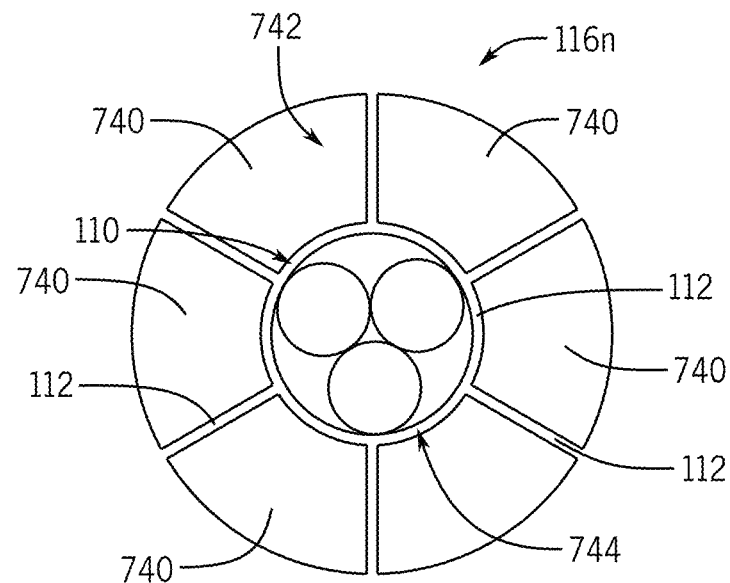
Figure 28D:
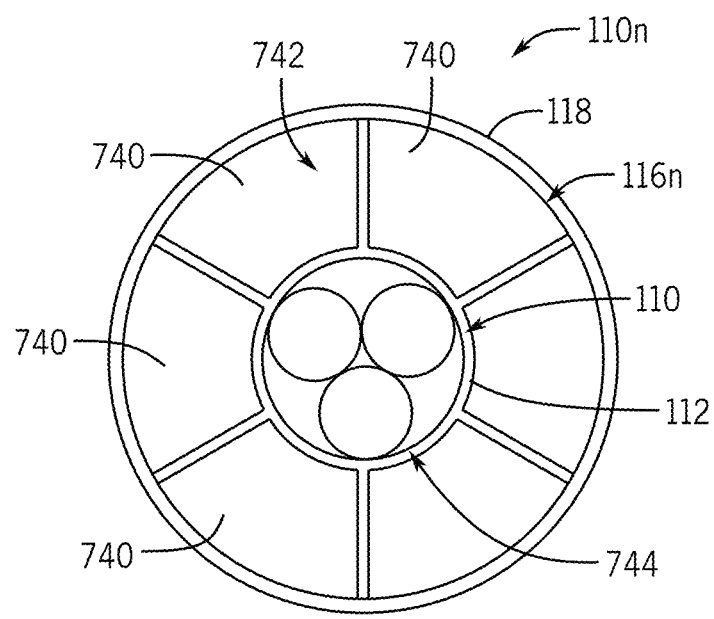

FIGS. 28A-28D depict various steps of manufacturing the opto-electrical cable 100n in accordance with the techniques discussed herein. For example, to assemble the opto-electrical cable 100n, the plurality of arch-profile wires 740 may be extruded or otherwise machined to include a generally arch-like, trapezoidal shape (e.g., a capstone shape), as shown in FIG. 28A. The one or more optical fibers 110 may be placed between each of the arch-profile wires 740, as shown in FIG. 28B. That is, as discussed above, the arch-profile wires 740 may be cabled helically about the optical fibers 110 to form the annular wire member 742, as shown in FIG. 28C, which encapsulates the optical fibers 110. In some embodiments, during or subsequent to the process of helically cabling the arch-profile wires 740 about the optical fibers 110, the filler 112 may be injected into the tunnel 744 to encase the optical fibers 110 within the tunnel 744. The arch-profile wires 740 may encapsulate the optical fibers 110 and the filler 112 within the tunnel 744 to form an opto-electrical cable core 116n. For clarity, it should be understood that the opto-electrical cable core 116n may include the arch-profile wires 740, the one or more optical fibers 110, and the filler 112. In certain embodiments, the filler 112 may flow into and occupy interstitial spaces that may be present between the individual arch-profile wires 740. As such, the filler 112 may seal possible gaps between the arch-profile wires 740. The one or more polymer layers 118 may be wrapped around or extruded over the opto-electrical cable core 116n, thereby encasing the opto-electrical cable core 116n and forming the opto-electrical cable 100n, as shown in FIG. 28D.

As discussed above with respect to the opto-electrical cables 100a, 100b, 100c, 100d, and 100e, each of the opto-electrical cables discussed herein may be encompassed by one or more completion layers that are disposed about an exterior of the opto-electrical cables. For example, each of the opto-electrical cables may be encompassed by one or more layers of the cladding 130 to form completed opto-electrical cables (e.g., such as the completed opto-electrical cables 500a, 500b, 500c, and 500d). As such, it should be understood that one or more layers of the cladding 130 may also be longitudinally, circumferentially, and/or helically disposed about the polymer layers 118 of each of the opto-electrical cables 100f, 100g, 100h, 100i, 100j, 100k, 100m, and 100n to respectively form completed opto-electrical cables 800, 802, 804, 806, 808, 810, 812, and 814, as shown in FIGS. 29A-29H, respectively. That is, the cladding 130 may be disposed about the opto-electrical cable 100f to form the completed opto-electrical cable 800, may be disposed about the opto-electrical cable 100g to form the completed opto-electrical cable 802, may be disposed about the opto-electrical cable 100h to form the completed opto-electrical cable 804, may be disposed about the opto-electrical cable 100i to form the completed opto-electrical cable 806, may be disposed about the opto-electrical cable 100j to form the completed opto-electrical cable 808, may be disposed about the opto-electrical cable 100k to form the completed opto-electrical cable 810, may be disposed about the opto-electrical cable 100m to form the completed opto-electrical cable 812, and may be disposed about the opto-electrical cable 100n to form the completed opto-electrical cable 814. As discussed above, the cladding 130 may be composed of a metal, such as, for example, zinc, nickel, molybdenum, or iron.

In some embodiments, the jacket layer 132 may be disposed about each of the opto-electrical cables 100f, 100g, 100h, 100i, 100j, 100k, 100m, and 100n, as shown in FIGS. 30A-30H, respectively, to form completed opto-electrical cables 816, 818, 820, 822, 824, 226, 828, and 830, respectively. That is, the jacket layer 132 may be disposed about the opto-electrical cable 100f to form the completed opto-electrical cable 816, may be disposed about the opto-electrical cable 100g to form the completed opto-electrical cable 818, may be disposed about the opto-electrical cable 100h to form the completed opto-electrical cable 820, may be disposed about the opto-electrical cable 100i to form the completed opto-electrical cable 822, may be disposed about the opto-electrical cable 100j to form the completed opto-electrical cable 824, may be disposed about the opto-electrical cable 100k to form the completed opto-electrical cable 826, may be disposed about the opto-electrical cable 100m to form the completed opto-electrical cable 828, and may be disposed about the opto-electrical cable 100n to form the completed opto-electrical cable 830. As discussed above, the jacket layer 132 may include the wires 134 that may extend longitudinally, circumferentially, or helically about the polymer layer 118. The wires 134 may be encased by the polymer 136. In some embodiments, the polymer layer 118 and the polymer 136 may include the same layer of polymeric material.

In some embodiments, the arcuate metal wires 138a, 138b and/or the second polymer layer 118a may be disposed about each of the opto-electrical cables 100f, 100g, 100h, 100i, 100j, 100k, 100m, and 100n, as shown in FIGS. 31A-31H, respectively, to form completed opto-electrical cables 832, 834, 836, 838, 840, 842, 844, and 846, respectively. That is, the arcuate metal wires 138a, 138b and/or the second polymer layer 118 may be disposed about the opto-electrical cable 100f to form the completed opto-electrical cable 832, may be disposed about the opto-electrical cable 100g to form the completed opto-electrical cable 834, may be disposed about the opto-electrical cable 100h to form the completed opto-electrical cable 836, may be disposed about the opto-electrical cable 100i to form the completed opto-electrical cable 838, may be disposed about the opto-electrical cable 100j to form the completed opto-electrical cable 840, may be disposed about the opto-electrical cable 100k to form the completed opto-electrical cable 842, may be disposed about the opto-electrical cable 100m to form the completed opto-electrical cable 844, and may be disposed about the opto-electrical cable 100n to form the completed opto-electrical cable 846.

In some embodiments, the metallic tape 142 and/or the second polymer layer 118a may be disposed about each of the opto-electrical cables 100f, 100g, 100h, 100i, 100j, 100k, 100m, and 100n, as shown in FIGS. 32A-32H, respectively, to form completed opto-electrical cables 848, 850, 852, 854, 856, 858, 860, and 862, respectively. That is, the metallic tape 142 and/or the second polymer layer 118a may be disposed about the opto-electrical cable 100f to form the completed opto-electrical cable 848, may be disposed about the opto-electrical cable 100g to form the completed opto-electrical cable 850, may be disposed about the opto-electrical cable 100h to form the completed opto-electrical cable 852, may be disposed about the opto-electrical cable 100i to form the completed opto-electrical cable 854, may be disposed about the opto-electrical cable 100j to form the completed opto-electrical cable 856, may be disposed about the opto-electrical cable 100k to form the completed opto-electrical cable 858, may be disposed about the opto-electrical cable 100m to form the completed opto-electrical cable 860, and may be disposed about the opto-electrical cable 100n to form the completed opto-electrical cable 862. In some embodiments, the metallic tape 142 may be wrapped helically about any of the opto-electrical cables 100f, 100g, 100h, 100i, 100j, 100k, 100m, and 100n. In certain embodiments, the metallic tape 142 may include the corrugated metallic tape 302.

It should be appreciated that each of the opto-electrical cable cores 116f, 116g, 116h, 116i, 116j, 116k, 116m, and 116n may be encompassed by the soft polymer layer 200, the plurality of arch-profile wires 210, the layer of stranded wires 220, and/or the one or more additional layers of polymer 230 in accordance with the techniques discussed above. For example, as respectively shown in FIGS. 33A-33H, the soft polymer layer 200, the plurality of arch-profile wires 210, the layer of stranded wires 220, and the one or more additional layers of polymer 230 may be disposed about the opto-electrical cable core 116f to form the completed opto-electrical cable 864, may be disposed about the opto-electrical cable core 116g to form the completed opto-electrical cable 866, may be disposed about the opto-electrical cable core 116h to form the completed opto-electrical cable 868, may be disposed about the opto-electrical cable core 116i to form the completed opto-electrical cable 870, may be disposed about the opto-electrical cable core 116j to form the completed opto-electrical cable 872, may be disposed about the opto-electrical cable core 116k to form the completed opto-electrical cable 874, may be disposed about the opto-electrical cable core 116m to form the completed opto-electrical cable 876, and may be disposed about the opto-electrical cable core 116n to form the completed opto-electrical cable 878. It should be appreciated that, in some embodiments, the arch-profile wires 210 may be cabled helically over the soft polymer layer 200 along the length of the opto-electrical cable cores. Moreover, it should be understood that the embodiments of any of the aforementioned completed opto-electrical cables may be implemented in the multi-component cable 300 in accordance with the techniques discussed above.

Depending on the context, all references herein to the "disclosure" may in some cases refer to certain specific embodiments only. In other cases it may refer to subject matter recited in one or more, but not necessarily all, of the claims. While the foregoing is directed to embodiments, versions and examples of the present disclosure, which are included to enable a person of ordinary skill in the art to make and use the disclosures when the information in this patent is combined with available information and technology, the disclosures are not limited to only these particular embodiments, versions and examples. Other and further embodiments, versions and examples of the disclosure may be devised without departing from the basic scope thereof and the scope thereof is determined by the claims that follow.

What is claimed is:

1. A cable, comprising:
    a first arcuate base wire having a first set of mating interfaces;
    a second arcuate base wire having a second set of mating interfaces, wherein the first and second arcuate base wires are configured to engage with one another at the first and second sets of mating interfaces to define an annular wire member having a tunnel;
    one or more optical fibers disposed within the tunnel; and
    a plurality of arch-profile wires cabled helically about the annular wire member.

2. The cable of claim 1, wherein the first set of mating interfaces comprise protrusions and the second set of mating interfaces comprise notches configured to engage with corresponding protrusions of the first set of mating interfaces.

3. The cable of claim 1, wherein the first set of mating interfaces comprise inclined protrusions and the second set of mating interfaces comprise declined protrusions configured to engage with corresponding inclined protrusions of the first set of mating interfaces.

4. The cable of claim 1, wherein the first set of mating interfaces comprise a first key and a first groove, wherein the second set of mating interfaces comprise a second key and a second groove, wherein the first key is configured to engage with the second groove and the second key is configured to engage with the first groove to couple the first arcuate base wire to the second arcuate base wire.

5. The cable of claim 1, wherein the first arcuate base wire and the second arcuate base wire are self-similar.

6. A cable, comprising:
    an annular wire member having a plurality of arch-profile wires cabled helically along a length of the cable;
    a polymer layer disposed between the cable and the annular wire member,
        wherein the annular wire is embedded into the polymer layer, wherein a portion of the polymer layer fills interstitial spaces between the arch-profile wires;
    one or more optical fibers disposed within a tunnel of the annular wire member; and
    a polymer jacket disposed about the annular wire member.

7. The cable of claim 6, comprising:
    a filler disposed within the tunnel and encasing the one or more optical fibers;
    a plurality of additional arch-profile wires cabled helically about the annular wire member; and a polymer layer disposed between the annular wire member and the plurality of additional arch-profile wires.

* * * * *